(12) United States Patent
Kosaki et al.

(10) Patent No.: US 11,314,274 B2
(45) Date of Patent: Apr. 26, 2022

(54) OPERATION LEVER FOR WORKING VEHICLE AND WORKING VEHICLE

(71) Applicant: KUBOTA CORPORATION, Osaka (JP)

(72) Inventors: Takashi Kosaki, Osaka (JP); Wataru Sasaki, Osaka (JP)

(73) Assignee: Kubota Corporation, Osaka (JP)

( * ) Notice: Subject to any disclaimer, the term of this patent is extended or adjusted under 35 U.S.C. 154(b) by 31 days.

(21) Appl. No.: 16/700,288

(22) Filed: Dec. 2, 2019

(65) Prior Publication Data

US 2020/0183441 A1 Jun. 11, 2020

(30) Foreign Application Priority Data

Dec. 6, 2018 (JP) .............................. JP2018-229060
Nov. 8, 2019 (JP) .............................. JP2019-202900

(51) Int. Cl.
  *G05G 1/06* (2006.01)
  *B62D 49/06* (2006.01)
  *E02F 9/20* (2006.01)

(52) U.S. Cl.
  CPC ............ *G05G 1/06* (2013.01); *B62D 49/0692* (2013.01); *E02F 9/2004* (2013.01)

(58) Field of Classification Search
  CPC ..... G05G 1/06; B62D 49/0692; E02F 9/2004; B60Y 2200/41; B60K 2026/027; B60K 2026/029; B60K 20/08; B60K 26/02; B60K 26/00; B60K 26/04; A01B 71/02; F16H 59/0278
  See application file for complete search history.

(56) References Cited

U.S. PATENT DOCUMENTS

| | | | |
|---|---|---|---|
| 10,591,948 B1 * | 3/2020 | Culp | G05G 13/00 |
| 2004/0260261 A1 * | 12/2004 | Yoshida | A61F 13/49011 |
| | | | 604/385.3 |
| 2012/0036956 A1 * | 2/2012 | Klein | E02F 9/2004 |
| | | | 74/471 R |

(Continued)

FOREIGN PATENT DOCUMENTS

| | | |
|---|---|---|
| CN | 109045556 A | * 12/2018 |
| CN | 109049014 A | * 12/2018 |

(Continued)

OTHER PUBLICATIONS

Definition of area—MerriamWebster.com, May 1, 2021 (Year: 2021).*

(Continued)

*Primary Examiner* — Vinh Luong
(74) *Attorney, Agent, or Firm* — Greenblum & Bernstein, P.L.C.

(57) ABSTRACT

An operation lever for a working vehicle, the operation lever being arranged to one side of an operator seat of the working vehicle, includes: a swing body configured to be swingable; and a grip arranged on an upper portion of the swing body. The grip includes: a gripping arranged to the one side; an operating portion arranged to another side opposed to the one side and provided with an operation switch; an extending portion extending backward from a lower portion of the gripping portion; and an anti-slip portion arranged between a surface of the gripping portion and a surface of the extending portion.

10 Claims, 30 Drawing Sheets

(56) References Cited

U.S. PATENT DOCUMENTS

| | | | |
|---|---|---|---|
| 2016/0009174 A1* | 1/2016 | Yamauchi | G05G 1/62 |
| | | | 74/473.3 |
| 2018/0067513 A1* | 3/2018 | Kure | G05G 1/58 |
| 2020/0180713 A1* | 6/2020 | Kosaki | B62D 49/0692 |
| 2021/0139089 A1* | 5/2021 | Kosaki | B60N 2/797 |

FOREIGN PATENT DOCUMENTS

| | | | | |
|---|---|---|---|---|
| EP | 2302483 A2 | | 3/2011 | |
| EP | 2357288 A1 | | 8/2011 | |
| EP | 2965937 A1 | | 1/2016 | |
| EP | 3132963 A2 | * | 2/2017 | ............ B60K 26/00 |
| JP | 2007104988 A | * | 4/2007 | |
| JP | 2016016739 A | | 2/2016 | |
| WO | WO 2015121884 A1 | * | 8/2015 | |

OTHER PUBLICATIONS

Coefficient of friction, Website Name: Encyclopaedia Britannica, Jun. 24, 2020 (Year: 2020).*
Engineering Tool Box, (2004), Friction—Friction Coefficients and Calculator, www.EngineeringToolBox.com, (Year: 2004).*
Friction, Wikipedia, https://en,wikipedia.org, Oct. 20, 2021 (Year: 2021).*
EPO Machine Translation of JP2007104988 A, Taniguchi et al., Apr. 26, 2007 (Year: 2007).*
Extended European Search Report dated Jun. 2, 2020 in European Patent Application No. 19212941.9.

* cited by examiner

OPERATION LEVER FOR WORKING VEHICLE AND WORKING VEHICLE

CROSS-REFERENCE TO RELATED APPLICATIONS

The present application claims priority under 35 U.S.C. § 119 to Japanese Patent Application No. P2019-202900, filed Nov. 8, 2019, and to Japanese Patent Application No. P2018-229060, filed Dec. 6, 2018. The contents of these applications are incorporated herein by reference in their entirety.

BACKGROUND OF THE INVENTION

Field of the Invention

The present invention relates to an operation lever for a working vehicle and to the working vehicle such as a tractor.

Description of Related Art

An operation lever for a working vehicle disclosed in Japanese Unexamined Patent Application Publication No. 2016-16739 is previously known.

The operation lever disclosed in Japanese Unexamined Patent Application Publication No. 2016-16739 has a swing body that can swing in the front-rear direction, and has a grip arranged on an upper portion of the swing body. The grip includes a gripping portion, an extending portion extending from a left side of the gripping portion, and a hypothenar placement portion that protrudes from the right lower edge of the gripping portion and has a tongue-shape.

SUMMARY OF THE INVENTION

An operation lever for a working vehicle, the operation lever being arranged to one side of an operator seat of the working vehicle, includes: a swing body configured to be swingable; and a grip arranged on an upper portion of the swing body. The grip includes: a gripping arranged to the one side; an operating portion arranged to another side opposed to the one side and provided with an operation switch; an extending portion extending backward from a lower portion of the gripping portion; and an anti-slip portion arranged between a surface of the gripping portion and a surface of the extending portion.

A working vehicle includes: an operator seat mounted on a vehicle body; an arm rest arranged to one side of the operator seat; and an operation lever arranged on the arm rest. The operation lever is the operation lever mentioned above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

A more complete appreciation of the invention and many of the attendant advantages thereof will be readily obtained as the same becomes better understood by reference to the following detailed description when considered in connection with the accompanying drawings, wherein:

Hereinafter, an embodiment of the present invention will be described with reference to the drawings as appropriate.

Figure 29:
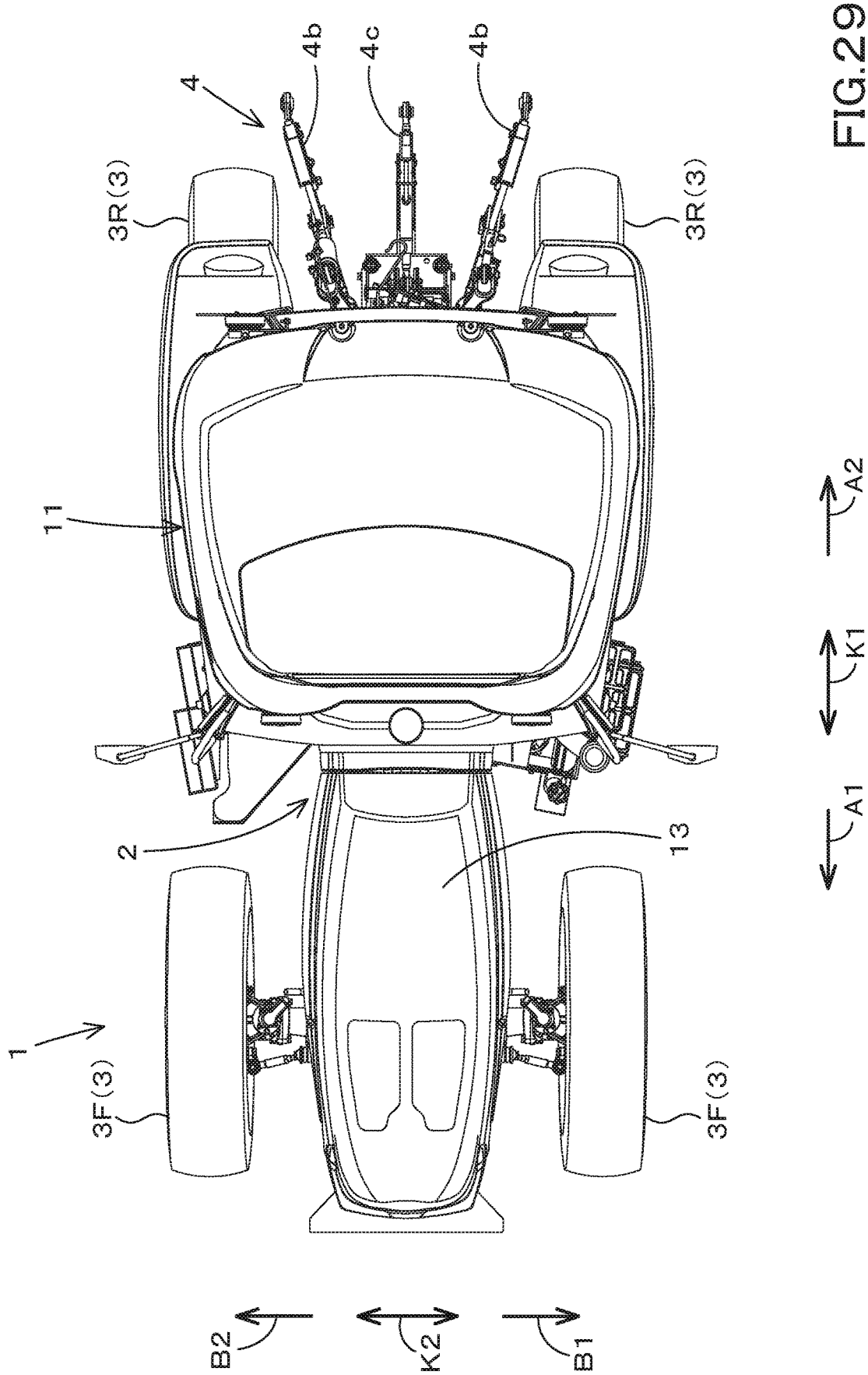
FIG. 29 is a plan view of a working vehicle according to the embodiment.
Figure 30:
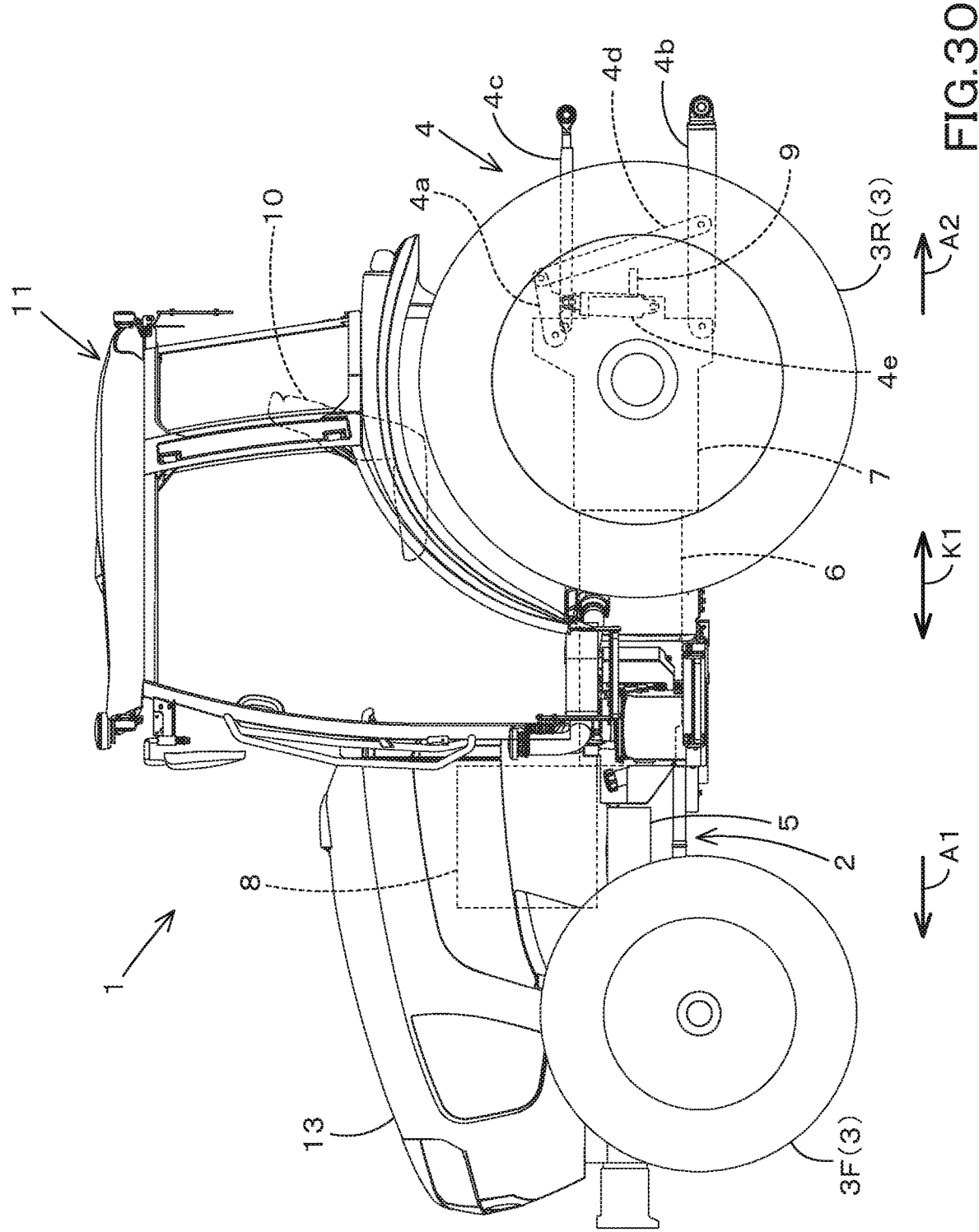
FIG. 30 is a side view of the working vehicle according to the embodiment.

FIG. 29 is a plan view of the working vehicle 1, and FIG. 30 is a side view of the working vehicle 1. The working vehicle 1 is a vehicle for performing the farming operation, and the working vehicle 1 is a tractor in the present embodiment. Hereinafter, description will be made assuming that the working vehicle 1 is the tractor 1. However, the working vehicle 1 is not limited to the tractor.

In the following description, the front side of the operator seated on the operator seat 10 of the tractor 1 (the direction indicated by an arrowed line A1 in FIG. 29 and FIG. 30) is referred to as the front, the rear side of the operator (the direction indicated by an arrowed line A2 in FIG. 29 and FIG. 30) is referred to as the rear, the left side of the operator (the direction indicated by an arrowed line B1 in FIG. 29) is referred to as the left, and the right side of the operator (the direction indicated by an arrowed line B2 in FIG. 29) is referred to as the right. In addition, the direction indicated by an arrowed line K1 in FIG. 29 and FIG. 30 will be described as the front-rear direction. In addition, a horizontal direction orthogonal to the front-rear direction (the direction indicated by an arrowed line K2 in FIG. 30) is referred to as a machine width direction.

<Overall Configuration of Working Vehicle>

As shown in FIG. 29 and FIG. 30, the tractor 1 includes a vehicle body 2, a traveling device 3, and a coupling portion 4.

As shown in FIG. 30, the vehicle body 2 includes a vehicle body frame 5, a clutch housing 6, and a transmission case 7. The vehicle body frame 5 extends in the front-rear direction of the vehicle body 2. A prime mover 8 is mounted on the body frame 5. In this embodiment, the prime mover 8 is an engine 8. The upper portion of the engine 8 is covered with a bonnet 13. The clutch housing 6 is connected to the rear portion of the engine 8 and houses a clutch.

The transmission case 7 is coupled to the rear portion of the clutch housing 6 and accommodates a transmission, a rear wheel differential device, and the like. The transmission includes a main transmission device and a sub-transmission device. A PTO shaft (a rear PTO) 9 protrudes behind the vehicle body 2 (behind the mission case 7). Although not shown in the drawings, a PTO shaft (a front PTO) protrudes also in front of the vehicle body 2. The rear PTO and the front PTO rotate or stop when the PTO clutch (not shown in the drawings) is connected or disconnected.

The traveling device 3 includes a front wheel 3F arranged at the front portion of the vehicle body 2 and includes a rear wheel 3R arranged at the rear portion of the vehicle body 2. The front wheel 3F is supported by the vehicle body frame 5. The rear wheel 3R is supported on the output shaft of the rear wheel differential device. The rear wheel 3R may be a tire or a crawler.

The coupling portion 4 is provided at the rear portion of the vehicle body 2. The coupling portion 4 is a portion for connecting a working device (a ground working machine) for performing the working on a farm field (an agricultural field) or the like to the rear portion of the tractor 1. The working device is driven by a driving force transmitted from the PTO shaft 9, for example. In particular, the working device is a cultivator, a spreader, a seeder, or the like, but is not limited thereto.

The coupling portion 4 is an elevating device that is driven by an actuator such as a hydraulic cylinder to lift or lower the working device (hereinafter also referred to as "lifting device 4"). In the present embodiment, the lifting device 4 is a three-point link mechanism, and includes a lift arm 4a, a lower link 4b, a top link 4c, a lift rod 4d, and a lift cylinder 4e. In addition, a horizontal control device (a monroe) configured to keep the working device horizontal is provided at the rear portion of the vehicle body 2.

Figure 1:
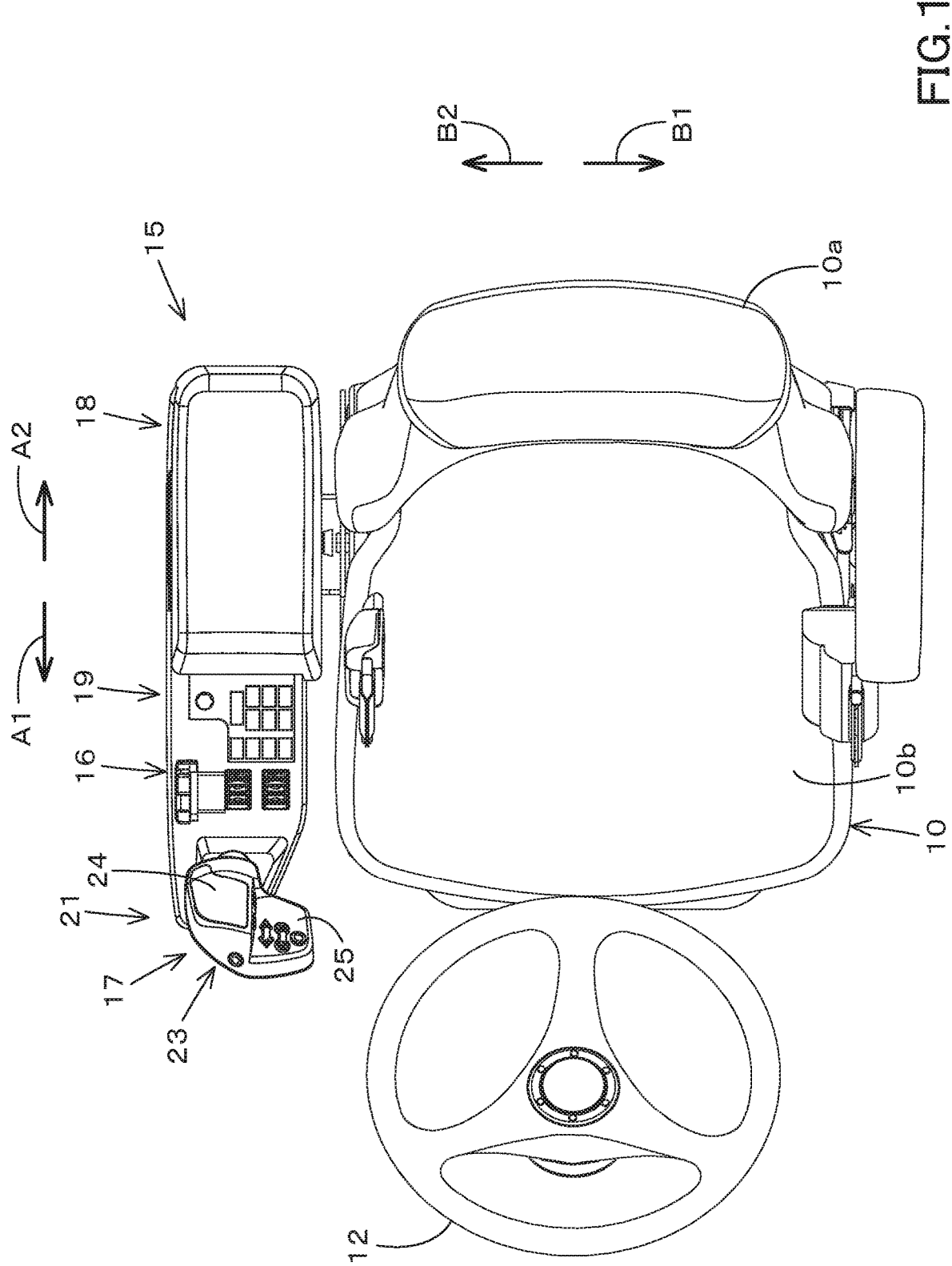
FIG. 1 is a plan view illustrating an operator seat, an armrest, and a steering wheel according to an embodiment of the present invention.

The vehicle body 2 is provided with an operator seat 10 and a cabin 11 that surrounds the operator seat 10. As shown in FIG. 1, the operator seat 10 has a backrest portion 10a and a seat portion 10b. A steering wheel 12 is provided in front of the operator seat 10.

The tractor 1 includes a control device (not shown in the drawings) that controls the traveling system and the working system. The control device includes a calculation unit (a CPU or the like), a storage portion (a memory), or the like, and executes a predetermined control based on a computer program stored in the storage portion. More in particular, the control device controls the traveling system and the working system of the tractor 1 based on the operation signals outputted when operating operation tools (lever, switch, dial, and the like) installed around the operator seat 10 and on the detection signals outputted from various sensors mounted on the vehicle body 2. For example, the control device executes the control relating to the lifting and lowering of the lifting device 4 based on the operation signal outputted from the operation tool, the control of the revolving speed of the engine 8 based on the detection signal outputted from an accelerator pedal sensor, and the like.

<Armrest>

As shown in FIG. 1, an armrest 15 is provided on one side of the operator seat 10. The armrest 15 is arranged such that the longitudinal direction faces in the front-rear direction and the shorter side direction faces in the machine width direction. Hereinafter, the shorter side direction of the armrest 15 is referred to as a width direction of the armrest 15. The width direction of the armrest 15 is a direction orthogonal to the longitudinal direction of the armrest 15 and is the same direction as the machine width direction.

In the present embodiment, one side corresponds to the right side, and the other side opposite to the one side corresponds to the left side. Thus, one side of the armrest 15 is opposite to the operator seat 10 side, and the other side of the armrest 15 corresponds to the operator seat 10 side.

As shown in FIG. 2 to FIG. 6, the armrest 15 includes a main body 16, a swing operating portion 17 provided on the main body 16, an elbow rest portion 18, and an operation tool arrangement portion 19. The main body 16 has an upper surface 16a, a lower surface 16b, a left side surface 16c, a right side surface 16d, a front surface 16e, and a rear surface 16f.

Figure 4:
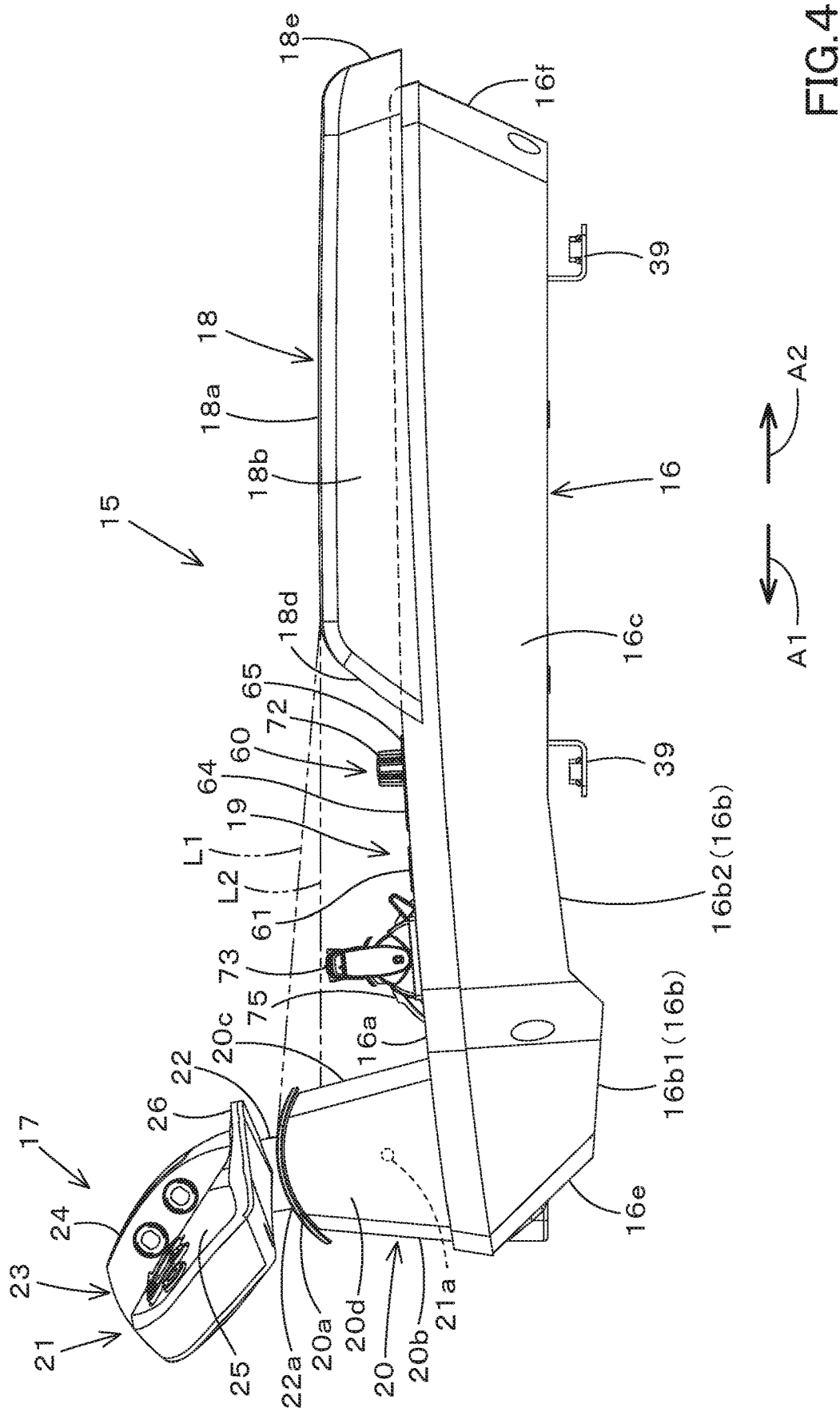
FIG. 4 is a side view of the armrest seen from an operator seat side (from a left side) according to the embodiment.
Figure 5:
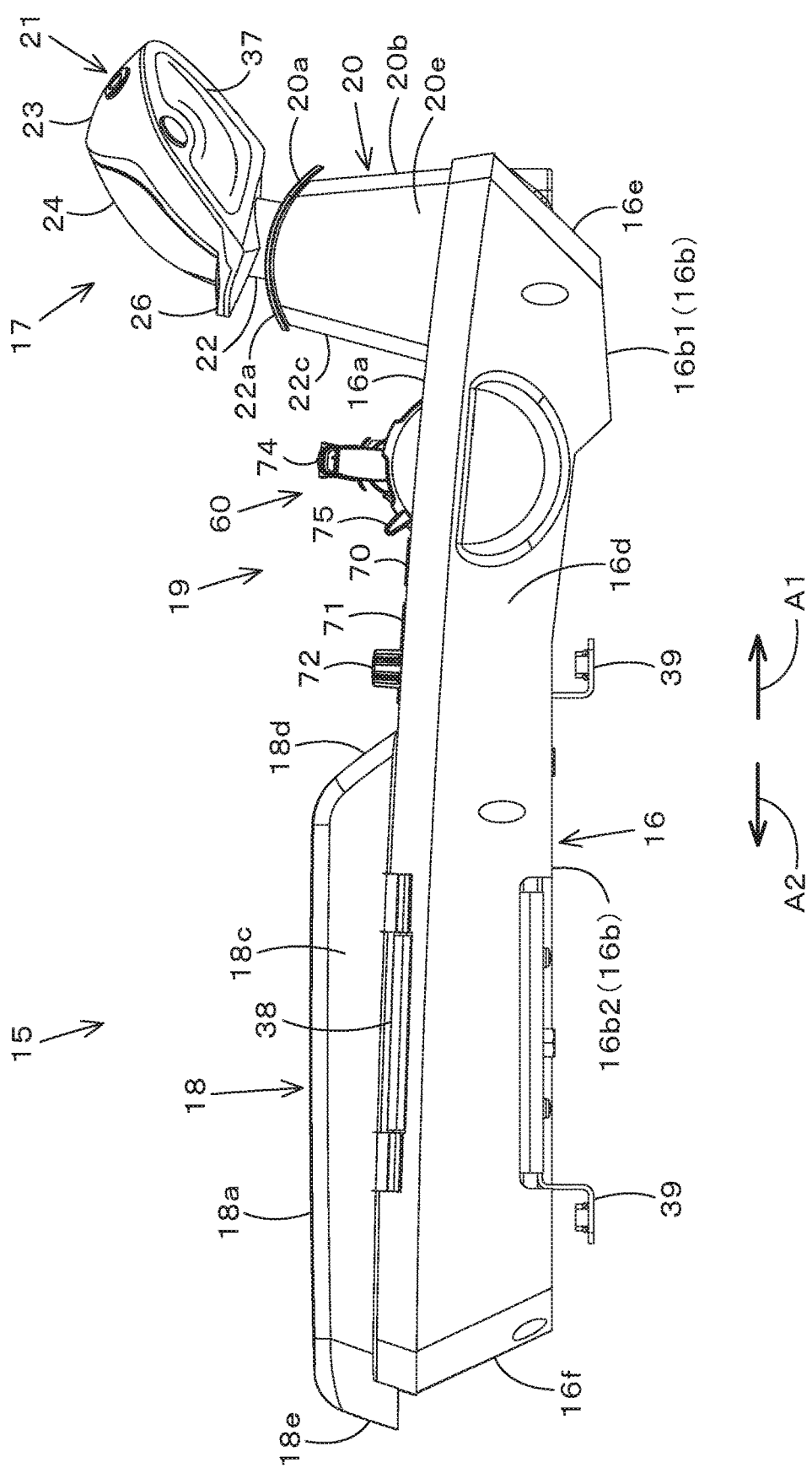
FIG. 5 is a side view of the armrest seen from a side opposed to the operator seat (from a right side) according to the embodiment.

As shown in FIG. 4 and FIG. 5, the upper surface 16a is gently curved upward in a convex shape. The upper surface 16a is inclined so as to shift downward as it extends forward. As for the lower surface 16b, the rear portion 16b2 is dented upwards in comparison with front portion 16b1.

This prevents the lower surface 16b of the armrest 15 from coming into contact with the knee (the right knee) of the operator who is seated on the operator seat 10. The rear portion 16b2 of the lower surface 16b is provided with an attachment 39 for attaching the armrest 15 to the side of the operator seat 10.

The left side surface 16c connects between the left portion of the upper surface 16a and the left portion of the lower surface 16b. The right side surface 16d connects between the right portion of the upper surface 16a and the right portion of the lower surface 16b. The front surface 16e connects between the front portion of the upper surface 16a, the front portion of the lower surface 16b, the front portion of the left side surface 16c, and the front portion of the right side surface 16d. The rear surface 16f connects between the rear portion of the upper surface 16a, the rear portion of the lower surface 16b, the rear portion of the left side surface 16c, and the rear portion of the right side surface 16d.

Figure 6:
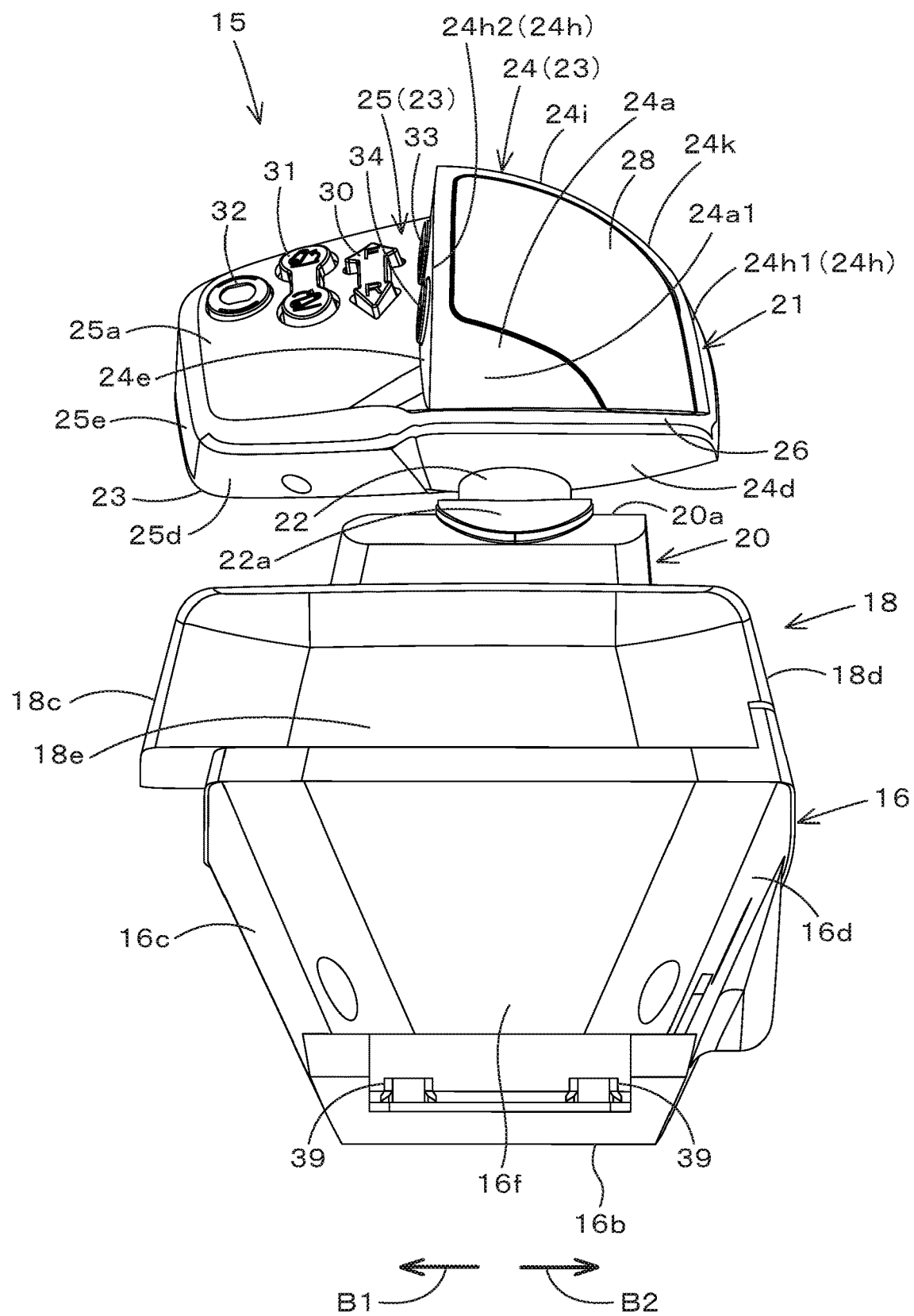
FIG. 6 is a back view of the armrest according to the embodiment.

As shown in FIG. 6, the left side surface 16c is inclined so as to shift to the right as it extends downward. The right side surface 16d is inclined so as to shift to the left as it extends downward. As shown in FIG. 4 and FIG. 5, the front surface 16e is inclined so as to shift backward as it extends downward. The rear surface 16f is inclined so as to shift forward as it extends downward.

<Swing Operating Portion>

As shown in FIG. 2 to FIG. 5, the swing operating portion 17 is provided at the front portion of the armrest 15. The swing operating portion 17 includes a pedestal 20 and an operation lever 21.

The pedestal 20 is provided protruding from the front portion of the armrest 15. The pedestal 20 protrudes upward from the upper surface 16a of the main body 16. The pedestal 20 protrudes higher than the upper surface 18a of the elbow rest portion 18. In other words, the height of the upper end portion of the pedestal 20 (the height from the upper surface 16a) is higher than the height of the upper surface 18a of the elbow rest portion 18. The pedestal 20 is formed in a substantially quadrangular pyramid shape, and becomes thinner as it extends upward.

The pedestal 20 has an upper surface 20a, a front surface 20b, a rear surface 20c, a left surface 20d, and a right surface 20e. The distance between the front surface 20b and the rear surface 20c and the distance between the left surface 20d and the right surface 20e each become narrower as it extends upward. As shown in FIG. 4 and FIG. 5, the upper surface 20a of the pedestal 20 is curved upward in a convex arc shape.

Figure 7:
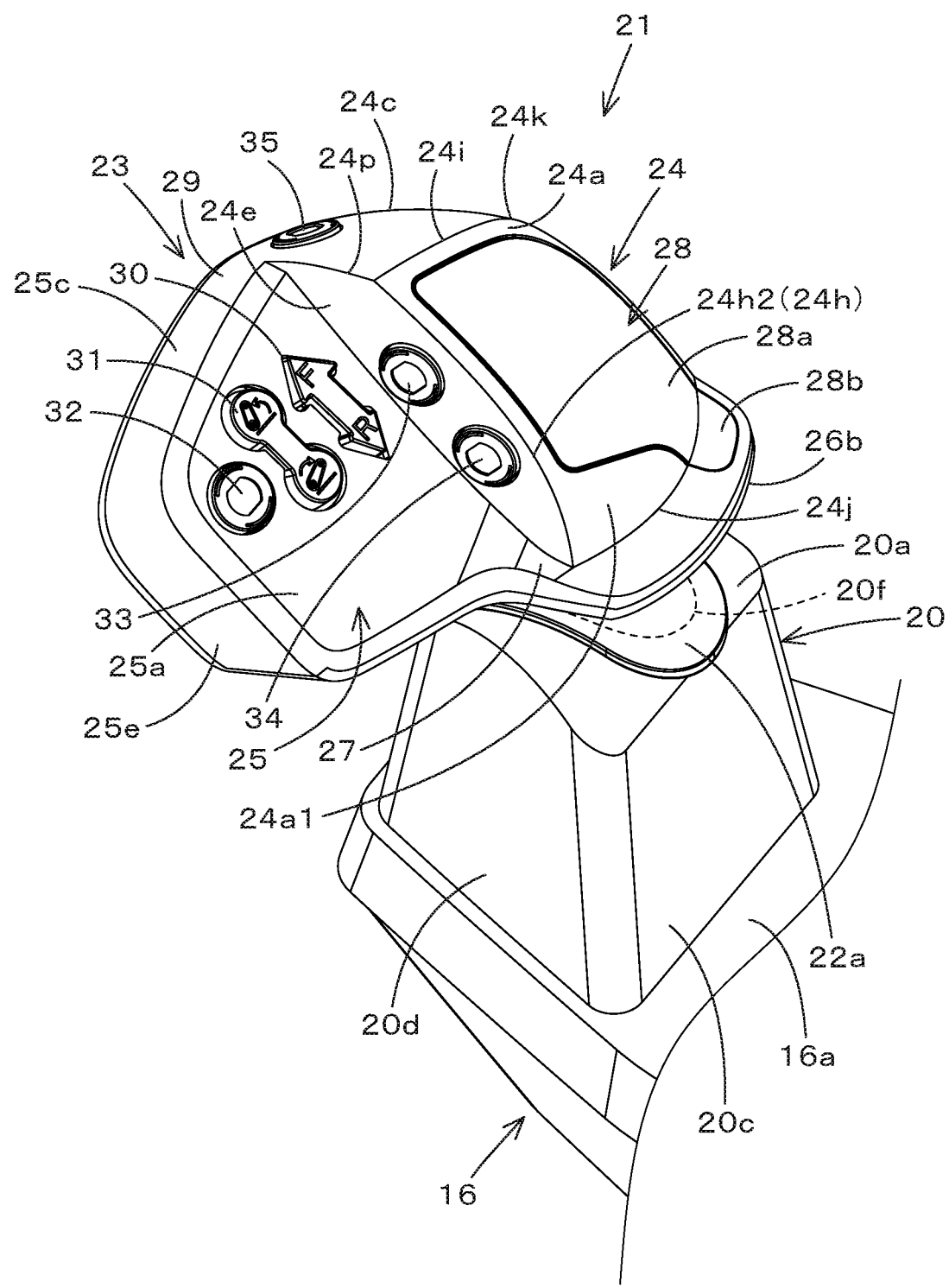
FIG. 7 is a perspective view of an area in the vicinity of a grip of the armrest seen downward from the left back side according to the embodiment.
Figure 11:
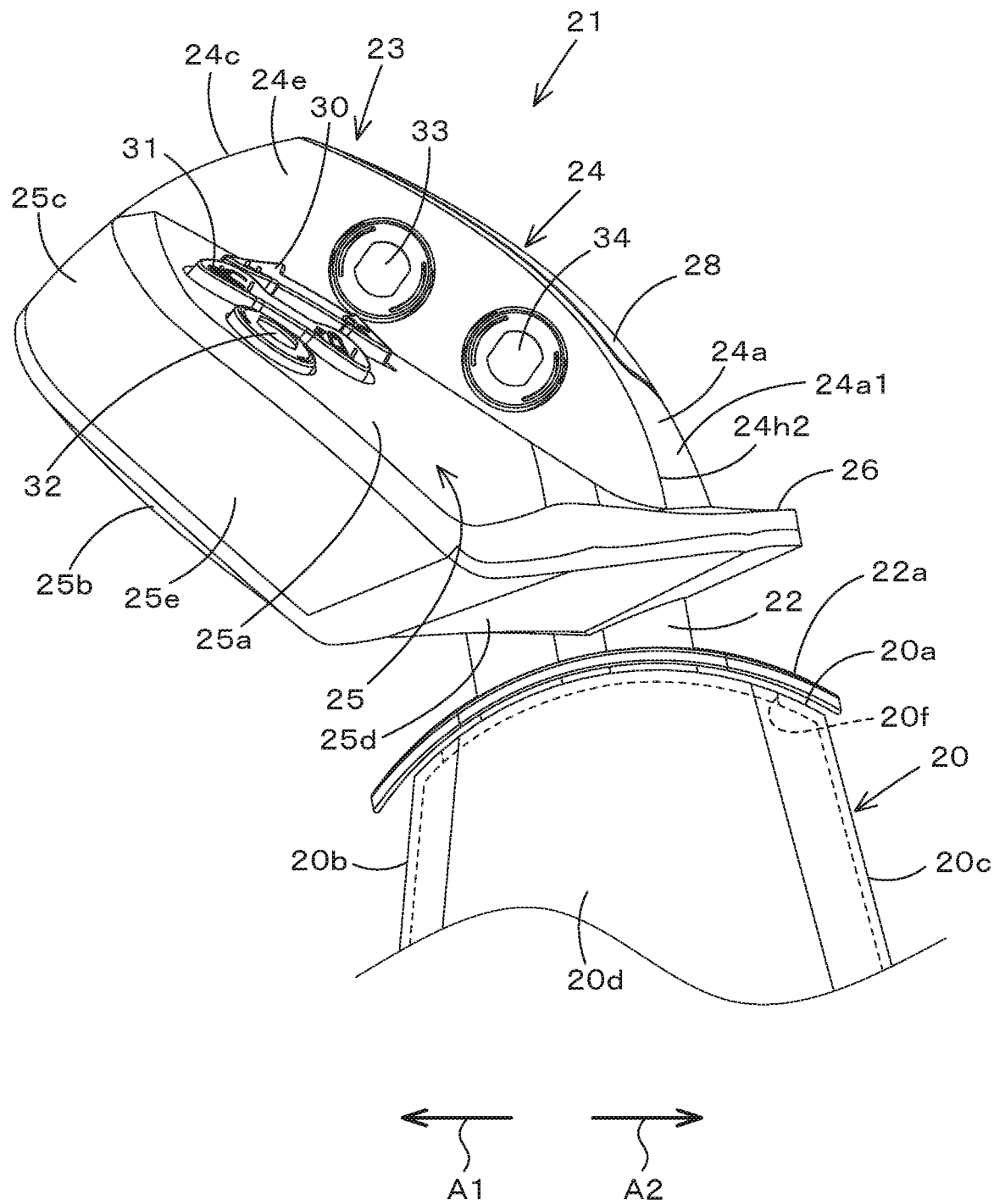
FIG. 11 is a side view of the area in the vicinity of the grip of the armrest seen from the operator seat side (from the left side) according to the embodiment.

The pedestal 20 is made of a hard material, and does not deform even when the operation lever 21 is swung. As shown in FIG. 7 and FIG. 11, an opening portion 20f is formed in the upper surface 20a of the pedestal 20. The opening portion 20f is formed in an oval shape extending in the front-rear direction.

As shown in FIG. 4 to FIG. 6, the operation lever 21 has a swing body 22 and a grip 23.

The swing body 22 is a shaft body inserted through the pedestal 20. The swing body 22 protrudes upward from the upper surface 20a of the pedestal 20. A skirt 22a is provided at the lower portion of the swing body 22. The skirt 22a is curved along the upper surface 20a of the pedestal. The skirt 22a moves along the upper surface 20a of the pedestal as the operation lever 21 swings.

As shown in FIG. 4 and FIG. 5, the swing body 22 extends in an inclined manner so as to shift from the lower side to the upper side as it extends from the rear to the front. The swing body 22 is capable of swinging in the front-rear direction. The lower portion of the swing body 22 is swingably supported by a horizontal axis (an axis extending in the machine width direction) 21a provided inside the armrest 15.

In this manner, the operation lever 21 (the swing body 22 and the grip 23) is capable of being swung around the horizontal axis in the front-rear direction. By operating the operating lever 21 to swing in the front-rear direction, it is possible to operate the transmission to perform the shifting operation.

When the control lever 21 swings forward, the swinging body 22 stops by hitting the front edge of the opening portion 20f, and when swinging backward, the swinging body 22 stops by hitting the rear edge of the opening portion 20f. That is, the swing of the operation lever 21 in the front-rear direction is restricted by the opening portion 20f.

As shown in FIG. 4, a swing fulcrum (a horizontal axis that supports the lower portion of the swing body 22) 21a of the operation lever 21 is provided inside the pedestal 20 that protrudes upward from the upper surface 16a of the main body 16. In this manner, the swing fulcrum 21a of the operation lever 21 is located above the upper surface 16a of the main body 16.

Thereby, the stroke of swinging of the operation lever 21 can be made small in the front-back direction in comparison with the case where the swing fulcrum is provided inside the main body 16 (below the upper surface 16a).

The grip 23 is provided on the upper portion of the swing body 22. As shown in FIG. 7 to FIG. 13, the grip 23 includes a gripping portion 24, an operating portion 25, and an extending portion 26. The gripping portion 24 is a portion that an operator who sits on the operator seat 10 grips with one hand (a right hand). The operating portion 25 is a portion for an operator who holds the gripping portion 24 to perform an operation by stretching the thumb.

The extending portion 26 is a portion for an operator who grips the gripping portion 24 to place the little finger side (hypothenar) of the palm, and supports the palm gripping the gripping portion 24 so that the palm does not slip downward. The gripping portion 24, the operating portion 25, and the extending portion 26 are integrally formed.

First, the shape of the gripping portion 24 of the grip 23 will be described.

The gripping portion 24 is provided on one side (the right side) of the grip 23. In other words, the gripping portion 24 is provided on a side opposite to the operator seat 10 side of the grip 23. As shown in FIG. 7 to FIG. 13, the gripping portion 24 has a front surface 24a, a back surface 24b, an upper surface 24c, a lower surface 24d, a left side surface 24e, a right side surface 24f, and a corner edge surface 24g.

Figure 10:
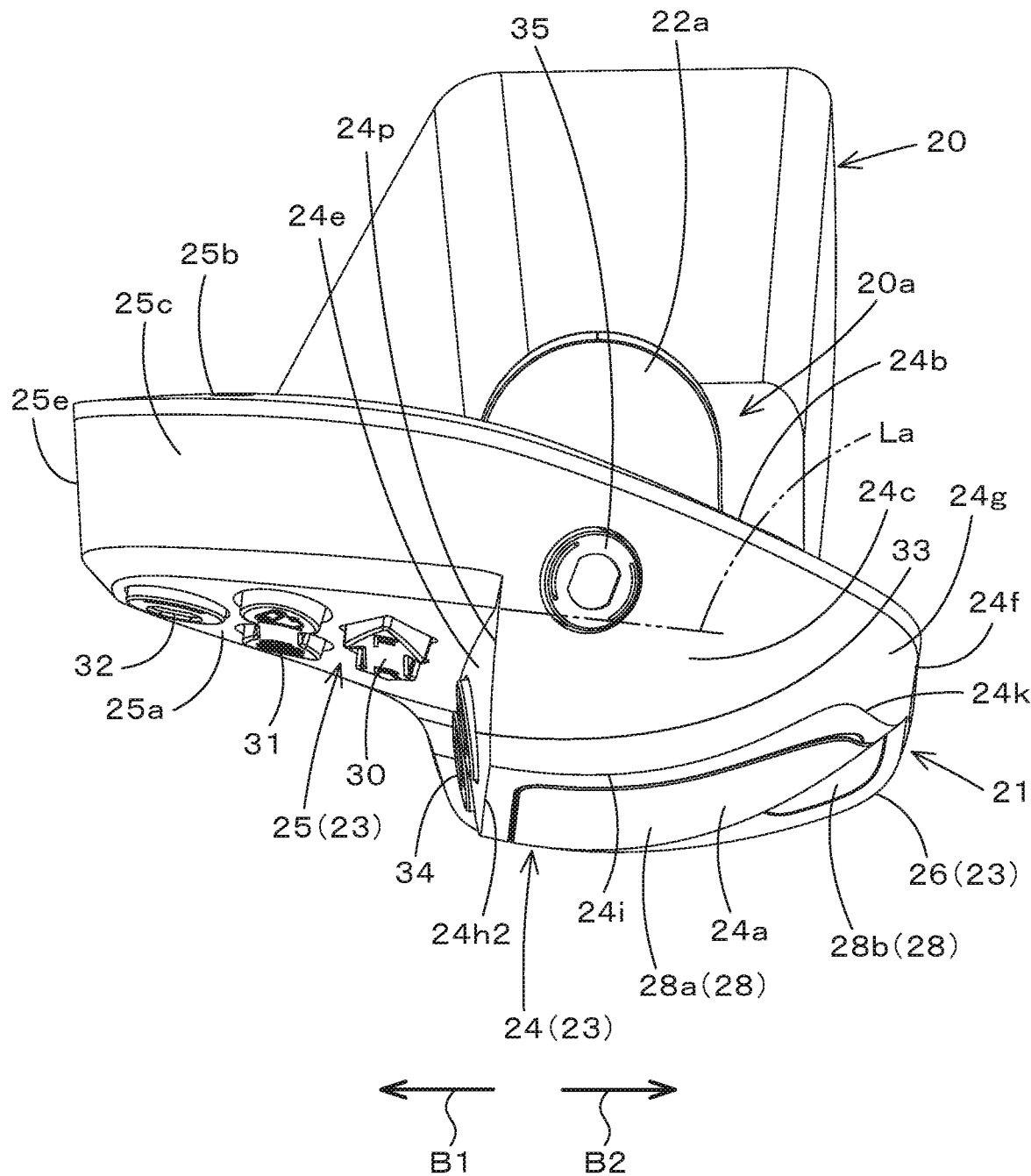
FIG. 10 is a view of the area in the vicinity of the grip of the armrest seen in a direction where a back surface of a gripping portion is arranged to be a substantially-vertical surface according to the embodiment.

The front surface 24a of the gripping portion 24 constitutes the right portion of the surface of the grip 23 (the surface facing the operator seated on the operator seat 10). The front surface 24a is a portion that a palm touches when gripping the gripping portion 24. As shown in FIG. 10, the front surface 24a is a curved surface that curves and extends from the other side (the left side) toward the one side (the right side). Hereinafter, the front surface 24a of the gripping portion 24 is referred to as a "curved surface 24a".

Figure 12:
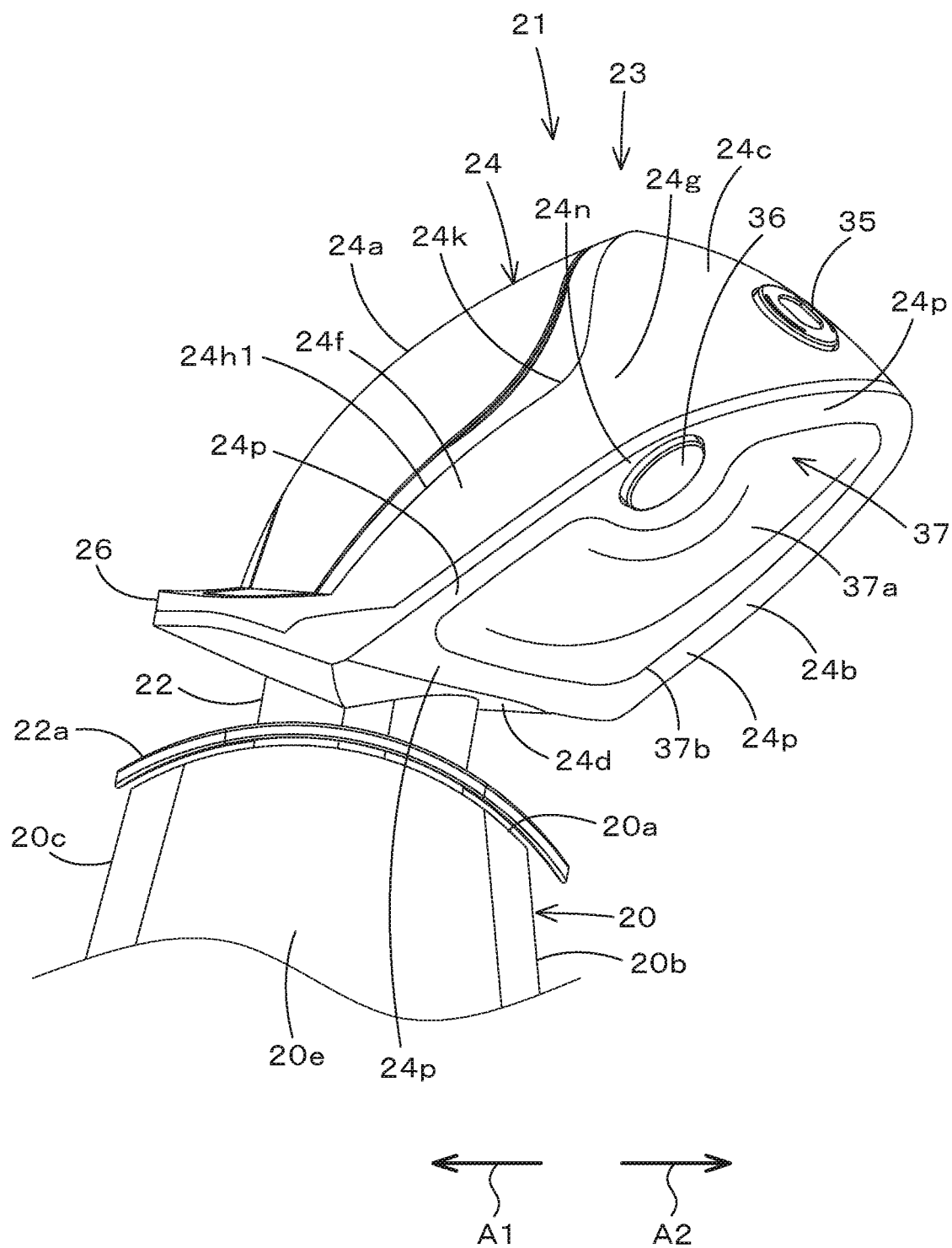
FIG. 12 is a side view of the area in the vicinity of the grip of the armrest seen from the side opposed to the operator seat side (from the right side) according to the embodiment.

As shown in FIG. 10, the curved surface 24a is curved in a convex shape so as to bulge toward the rear. The right portion of the curved surface 24a shifts from the rear to the front as it extends from the left side to the right side. In addition, as shown in FIG. 11 and FIG. 12, the curved surface 24a is curved being inclined so as to shift from the lower side to the upper side as it extends from the rear side toward the front side.

Figure 8:
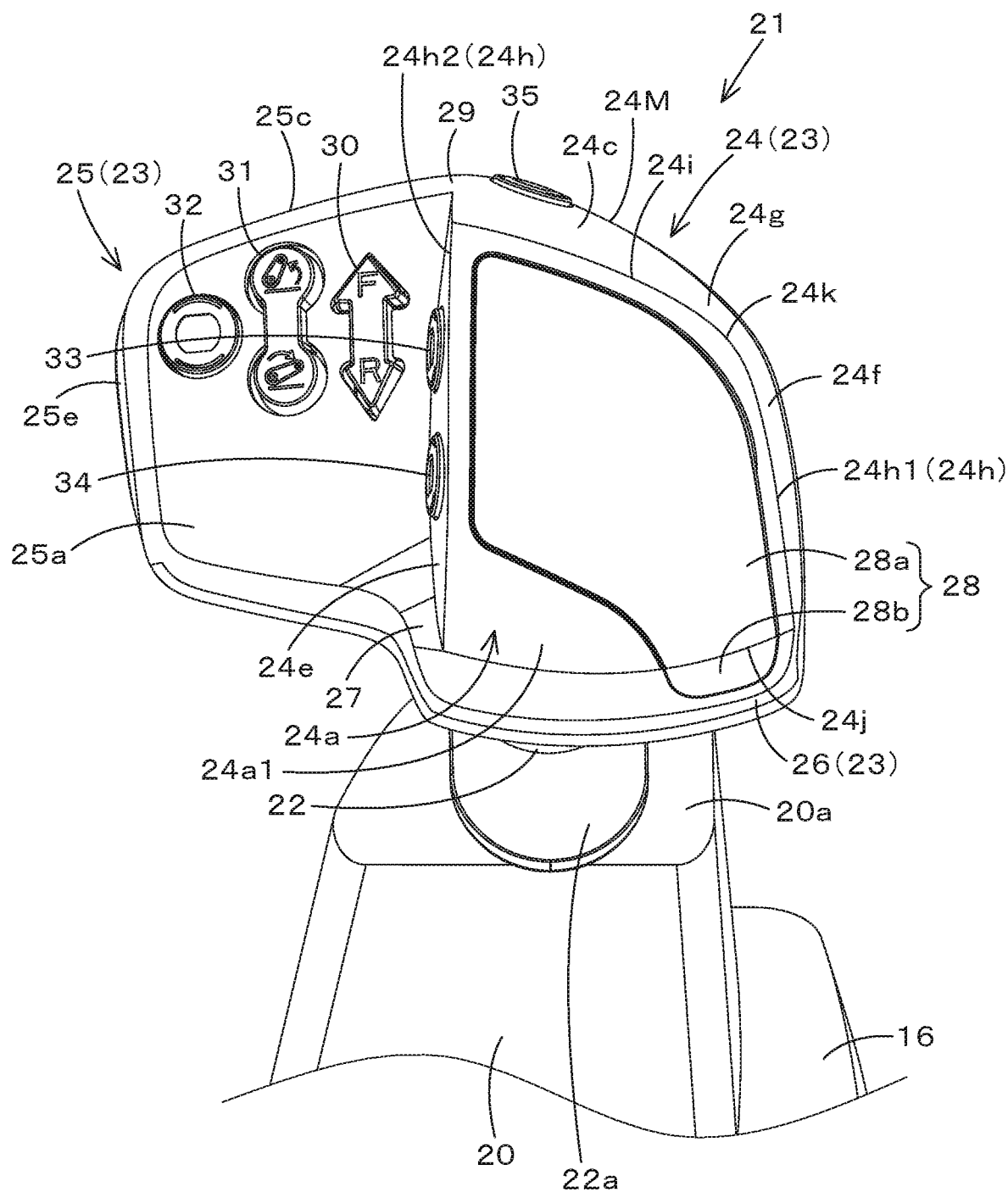
FIG. 8 is a perspective view of the area in the vicinity of the grip of the armrest seen downward from the back side according to the embodiment.

As shown in FIG. 8 and the like, the curved surface 24*a* has a side edge portion 24*h*, an upper edge portion 24*i*, a lower edge portion 24*j*, and a corner edge portion 24*k*. The side edge portion 24*h*, the upper edge portion 24*i*, the lower edge portion 24*j*, and the corner edge portion 24*k* constitute an outer edge portion of the curved surface 24*a*.

The side edge portion 24*h* includes a first side edge portion 24*h*1 and a second side edge portion 24*h*2. The first side edge portion 24*h*1 constitutes an edge portion on one side (the right side) of the curved surface 24*a*. The second side edge portion 24*h*2 constitutes an edge portion on the other side (the left side) of the curved surface 24*a*. The upper edge portion 24*i* constitutes an edge portion on an upper side of the curved surface 24*a*.

The lower edge portion 24*j* constitutes an edge portion on the lower side of the curved surface 24*a*. The corner edge portion 24*k* connects the side edge portion (the first side edge portion) 24*h*1 and the upper edge portion 24*i*, and constitutes the edge portion of the upper corner of one side (the right side) of the curved surface 24*a*.

The first side edge portion 24*h*1, the second side edge portion 24*h*2, the upper edge portion 24*i*, the lower edge portion 24*j*, and the corner edge portion 24*k* are curved.

The first side edge portion 24*h*1 extends downward from above. As shown in FIG. 8 and the like, the first side edge portion 24*h*1 is curved in a convex shape so as to bulge slightly to one side (the right side) in the middle portion from the upper side to the lower side. In addition, the first side edge portion 24*h*1 shifts from the other side (the left side) to one side (the right side) as it extends downward from above. As shown in FIG. 12 and the like, the first side edge portion 24*h*1 shifts from the front side to the rear side as it extends downward from above.

The second side edge portion 24*h*2 extends downward from above. As shown in FIG. 8 and the like, the second side edge portion 24*h*2 shifts from one side (the right side) to the other side (the left side) as it extends downward from above. The distance between the first side edge portion 24*h*1 and the second side edge portion 24*h*2 gradually increases from the upper side to the lower side.

As shown in FIG. 11 and the like, the second side edge portion 24*h*1 shifts from the front side to the rear side as it extends downward from above. The second side edge portion 24*h*2 is curved in a convex shape so as to bulge upward and rearward at a middle portion extending downward from above. The curving becomes sharper as it extends from the top to the bottom.

As shown in FIG. 8 and the like, the upper edge portion 24*i* extends from the other side (the left side) to one side (the right side), and is curved and inclined shifting from the upper side to the lower side as it extends from the other side to one side. As shown in FIG. 10 and the like, the upper edge portion 24*i* is curved in a convex shape so as to bulge rearward at a middle portion from one side (the right side) to the other side (the left side).

Figure 9:
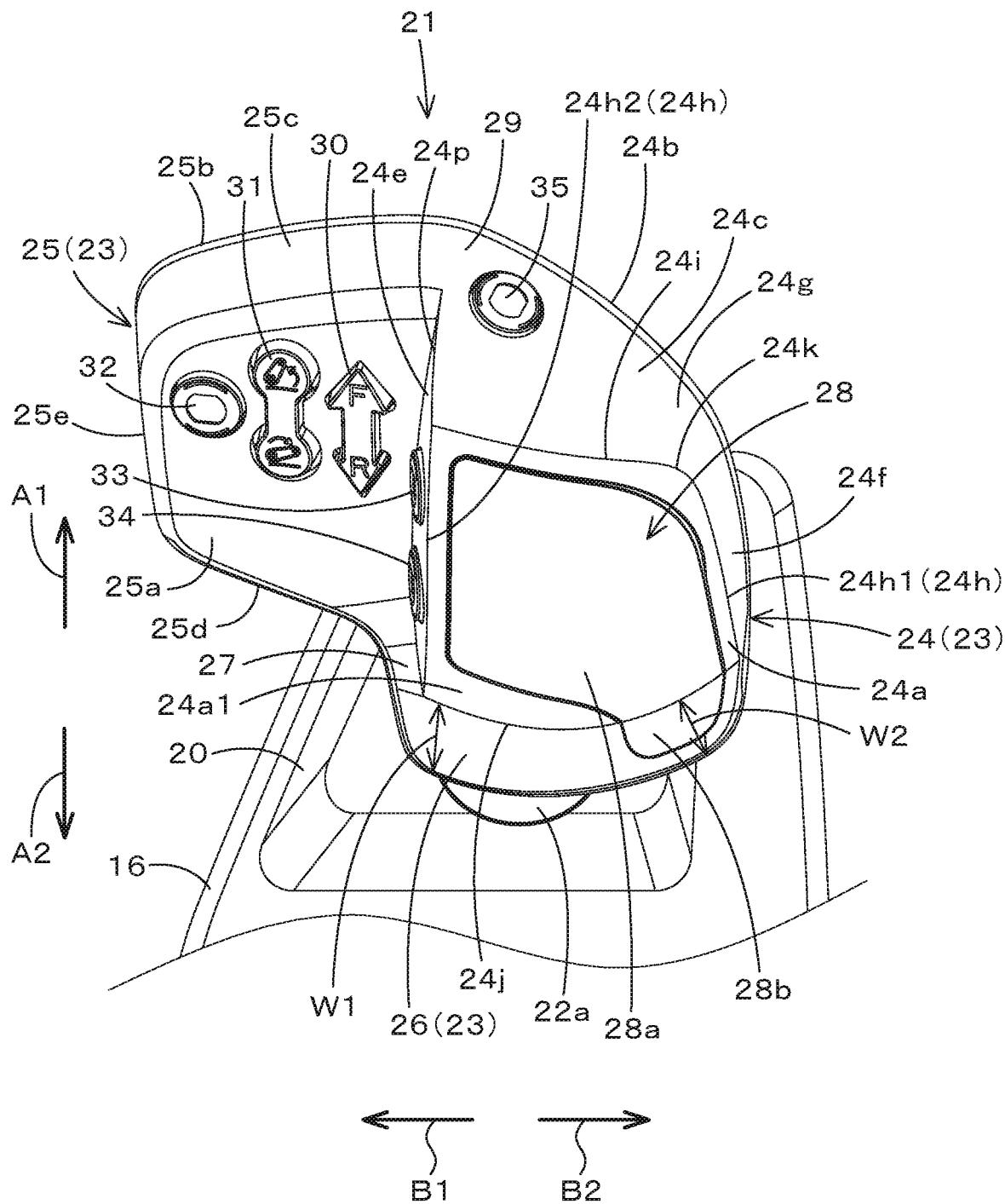
FIG. 9 is a plan view of the area in the vicinity of the grip of the armrest according to the embodiment.

As shown in FIG. 9 and the like, the lower edge portion 24*j* extends from the other side (the left side) to one side (the right side), and is curved in a convex shape so as to bulge rearward at a middle portion from the other side to the one side.

As shown in FIG. 8 and the like, the corner edge portion 24*k* is curved so as to connect the first side edge portion 24*h*1 and the upper edge portion 24*i* with a smooth curve. The corner edge portion 24*k* is curved with a smaller radius of curvature than those of the first side edge portion 24*h*1 and the upper edge portion 24*i*. In other words, the corner edge portion 24*k* is sharply curved as compared with the first side edge portion 24*h*1 and the upper edge portion 24*i*.

As shown in FIGS. 7 to 11, the left side surface 24*e* of the gripping portion 24 stands from the operating portion 25 toward the curved surface 24*a* of the gripping portion 24. Hereinafter, the left side surface 24*e* of the gripping portion 24 is referred to as a "standing surface 24*e*". The standing surface 24*e* is a portion that can be touched with the thumb when the palm 24 touches the curved surface 24*a* and grips the gripping portion 24. The standing surface 24*e* connects between the operating portion 25 and the second side edge portion 24*h*2 of the curved surface 24*a*.

As shown in FIG. 10, the standing surface 24*e* is slightly inclined so as to be directed from the other side (the left side) to one side (the right side) as it stands from the operating portion 25 toward the curved surface 24*a*. The lower edge portion of the standing surface 24*e* is connected to the front surface 25*a* of the operating portion 25. The upper edge portion of the standing surface 24*e* is connected to the upper surface 24*c* of the gripping portion 24. The right edge portion of the standing surface 24*e* is connected to the second side edge portion 24*h*2 of the curved surface 24*a*.

The upper surface 24*c* of the gripping portion 24 constitutes the right portion of the upper surface of the grip 23. As shown in FIG. 8 and the like, the upper surface 24*c* of the gripping portion 24 is inclined so as to extend from the upper side to the lower side as it extends from the other side (the left side) to one side (the right side). In addition, the upper surface 24*c* is curved along the curvature of the upper edge portion 24*i* of the curved surface 24*a*.

As shown in FIG. 11 and FIG. 12, the upper surface 24*c* shifts from the lower side to the upper side as it extends from the front side toward the rear side, and is curved in a convex shape so as to bulge upward and forward in the middle portion extending from the upper side to the lower side. The front edge portion of the upper surface 24*c* is connected to the upper edge portion 24*i* of the curved surface 24*a*. The rear edge portion of the upper surface 24*c* is connected to the rear surface 24*b*. The left edge portion of the upper surface 24*c* is connected to the upper edge portion of the standing surface 24*e*.

The left edge portion of the upper surface 24*c* is also connected to the upper surface 25*c* of the operating portion 25. As shown in FIG. 8 to FIG. 10 and the like, an operation switch 35 described later is provided on the upper surface 24*c*.

The right side surface 24*f* of the gripping portion 24 constitutes the right side surface of the grip 23. As shown in FIG. 8 and the like, the right side surface 24*f* of the gripping portion 24 is curved along the curvature of the first side edge portion 24*h*1 of the curved surface 24*a*. In particular, the right side surface 24*f* extends from the upper side to the lower side, and is curved in a convex shape so as to bulge slightly to one side (the right side) in the middle portion extending from the upper side to the lower side.

In addition, the right side surface 24*f* shifts to one side (the right side) as it extends from the top to the bottom. The distance between the standing surface 24*e* and the right side surface 24*f* gradually increases as it extends from the top to the bottom.

As shown in FIG. 8, FIG. 9, and the like, the corner edge surface 24*g* of the gripping portion 24 connects between the upper surface 24*c* and the right side surface 24*f*. The corner edge surface 24*g* is curved along the curvature of the corner edge portion 24*k* of the curved surface 24*a*. The corner edge surface 24*g* is curved so as to connect between the upper surface 24*c* and the right side surface 24*f* with a smooth curved surface. The corner edge surface 24g is curved with a smaller radius of curvature than those of the upper surface 24c and the right side surface 24f. In other words, the upper surface 24c and the right side surface 24f are gently curved, whereas the corner edge surface 24g is sharply curved.

The back surface 24b of the gripping portion 24 constitutes the right portion of the back surface of the grip 23. The back surface 24b is a portion where the fingertips other than the thumb touch when the gripping portion 24 is gripped by touching the palm to the curved surface 24a. As shown in FIG. 12, the back surface 24b of the gripping portion 24 is inclined so as to shift from the lower side to the upper side as it extends from the rear side toward the front side.

In addition, as shown in FIG. 10, the back surface 24b is inclined so as to shift from the front side to the rear side as it extends from one side (the left side) to the other side (the right side). The upper edge portion of the back surface 24b is connected to the upper surface 24c. The lower edge portion of the back surface 24b is connected to the lower surface 24d. The left edge portion of the back surface 24b is connected to the back surface 25b of the operating portion 25. The right edge portion of the back surface 24b is connected to the right side surface 24f. The corner edge portion of the back surface 24b is connected to the corner edge surface 24g.

Figure 13:
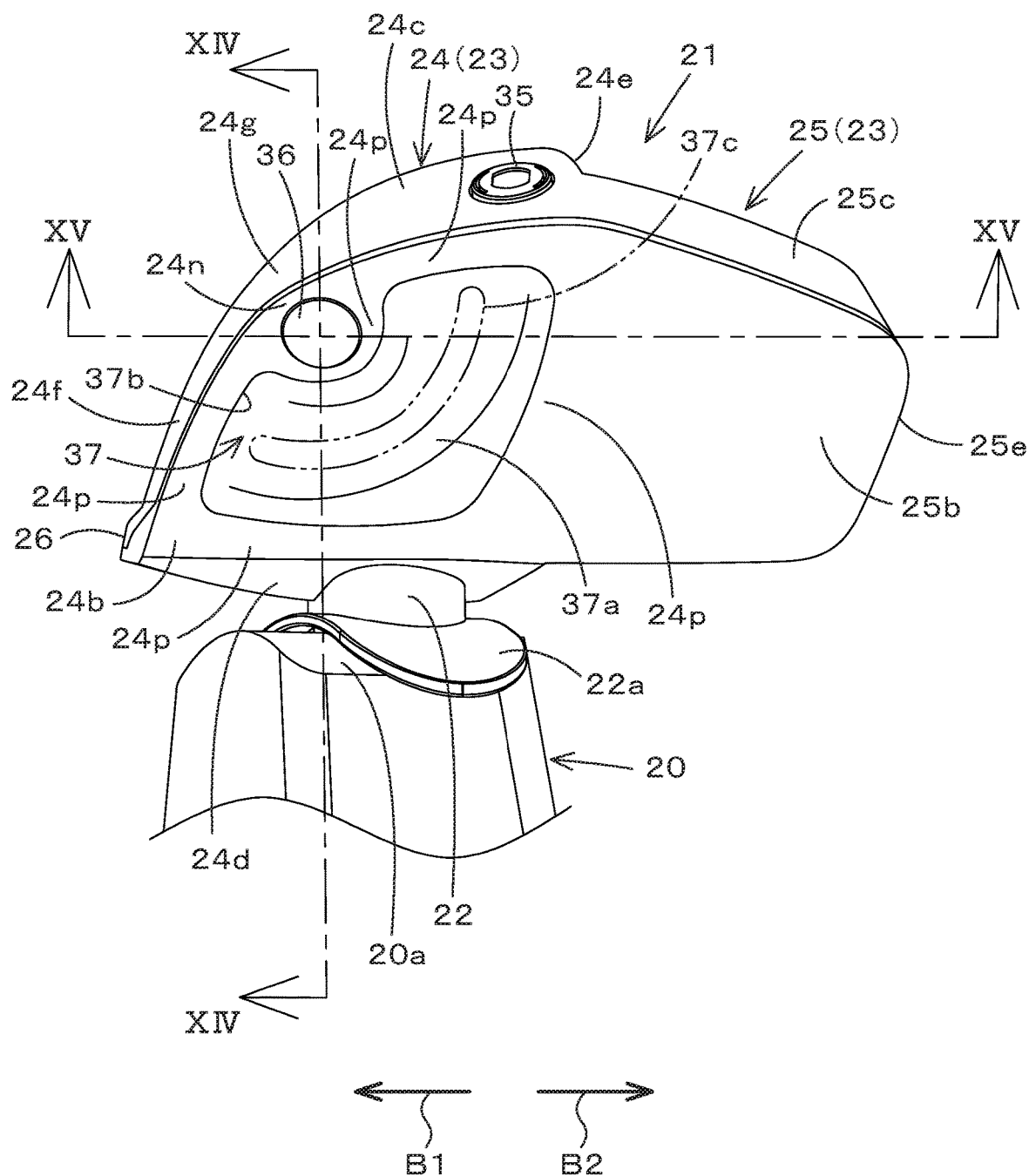
FIG. 13 is a back view of the area in the vicinity of the grip of the armrest according to the embodiment.

As shown in FIG. 12 and FIG. 13, a guide concave portion 37 and an operation switch 36, which will be described later, are provided on the back surface 24b.

The lower surface 24d of the gripping portion 24 constitutes the right portion of the lower surface of the grip 23. As shown in FIG. 12 and FIG. 13, the upper end portion of the swing body 22 is connected to the lower surface 24d of the gripping portion 24. The front edge portion of the lower surface 24d is connected to the back surface 24b. The rear edge portion of the lower surface 24d is connected to the lower surface of the extending portion 26. The left edge portion of the lower surface 24d is connected to the lower surface 25d of the operating portion 25. The right edge portion of the lower surface 24d is connected to the right side surface 24f.

Next, the shape of the operating portion 25 of the grip 23 will be described.

The operating portion 25 is provided on the other side (the left side) of the grip 23. In other words, the operating portion 25 is provided on the operator seat 10 side of the grip 23.

As shown in FIG. 7 to FIG. 13, the operating portion 25 has a front surface 25a, a back surface 25b, an upper surface 25c, a lower surface 25d, and a left side surface 25e. Hereinafter, in order to clarify the distinction from the front surface 24a and the like of the gripping portion 24, the front surface 25a of the operating portion 25 may be referred to as a "second surface 25a", the back surface 25b may be referred to as a "second back surface 25b", the upper surface 25c may be referred to as a "second upper surface 25c", the lower surface 25d may be referred to as a "second lower surface 25d", and the left side surface 25e may be referred to as a "second left side surface 25e".

The second surface 25a constitutes the left portion of the surface of the grip 23. The second surface 25a is a portion that can be touched by the thumb stretched when the palm 24 is touched to the curved surface 24a and grips the gripping portion 24. As shown in FIG. 11 and the like, the second surface 25a is inclined so as to shift from the lower side to the upper side as it extends from the rear to the front.

As shown in FIG. 6, FIG. 10, and the like, the second surface 25a is inclined so as to extend from the front to the rear as it extends from the other side (the left side) to one side (the right side). As shown in FIG. 10 and the like, the second surface 25a is located forward from the curved surface 24a which is the surface of the gripping portion 24. A plurality of operation switches 30, 31, and 32, which will be described later, are provided on the second surface 25a.

The second upper surface 25c constitutes the left portion of the upper surface of the grip 23. As shown in FIG. 8 and the like, the second upper surface 25c is inclined so as to shift from the lower side to the upper side as it extends from the other side (the left side) to one side (the right side). The upper surface 24c of the gripping portion 24 and the upper surface (the second upper surface) 25c of the operating portion 25 are continued in a mountain shape with a vertex 29 formed in the vicinity of the boundary between the gripping portion 24 and the operating portion 25.

The second lower surface 25d constitutes the left portion of the lower surface of the grip 23. As shown in FIG. 9 and the like, the second lower surface 25d is inclined from the upper side to the lower side as it extends from the other side (the left side) to one side (the right side). The distance between the second upper surface 25c and the second lower surface 25d gradually increases from the other side toward one side. The second lower surface 25d is connected to the lower surface 24d of the gripping portion 24 and to the lower surface of the extending portion 26.

The second left side surface 25e constitutes the left side surface of the grip 23. The upper portion of the second left side surface 25e is connected to the left portion of the second upper surface 25c. The lower portion of the second left side surface 25e is connected to the left portion of the second lower surface 25d. The boundary between the second left side 25e and the second upper surface 25c and the boundary between the second left side 25e and the second lower surface 25d are both curved.

The second back surface 25b constitutes the left portion of the back surface of the grip 23. As shown in FIG. 10 and FIG. 13, the second back surface 25b is a substantially flat surface curving very gently. The upper edge portion of the second back surface 25b is connected to the second upper surface 25c. The lower edge portion of the second back surface 25b is connected to the second lower surface 25d. The left edge portion of the second back surface 25b is connected to the second left side surface 25e. The right edge portion of the second back surface 25b is connected to the back surface 24b of the gripping portion 24.

As shown in FIG. 7 to FIG. 9 and the like, the extending portion 26 extends backward from the lower portion 24j of the gripping portion 24 (the lower edge portion 24j of the curved surface 24a). The extending portion 26 extends from the other side (the left side) toward one side (the right side), and is curved in a convex shape so as to bulge rearward at a middle portion extending from the other side toward the one side.

A portion (a left portion) on the other side of the extending portion 26 extends to the other side (the left side) further from the curved surface 24a and the standing surface 24e, and is connected to the surface (the second surface) 25a of the operating portion 25 by a communication surface 27. As shown in FIG. 9, the extending portion 26 extended from the lower portion of the gripping portion 26 has an extension width W1 on the other side (the left side) larger than an extension width W2 on one side (the right side) (W1>W2).

As shown in FIG. 7 to FIG. 9 and the like, the grip 23 has an anti-slip portion 28.

The anti-slip portion 28 is made of a material having an anti-slip function such as rubber. The friction coefficient of the surface of the anti-slip portion 28 is larger than the friction coefficient of the surface of the gripping portion 24 (the surface of the portion P1 where the anti-slip portion 28 is not provided). The anti-slip portion 28 is, for example, attached to the surface of the gripping portion 24 with a anti-slip member such as a rubber plate.

The anti-slip portion 28 is configured in a method to embed the anti-slip member into the surface of the gripping portion 24. By providing the anti-slip portion 28, the hand is prevented from slipping off in gripping the gripping portion 24 to operate the operation lever 21. In this manner, the operation lever 21 can be reliably operated, and it is not necessary to strongly grip the gripping portion 24, thereby preventing the fatigue of hands.

The anti-slip portion 28 is provided extending across (stranding) from the gripping portion 24 to the surface of the extending portion 26. In particular, the anti-slip portion 28 is provided from the curved surface 24a of the gripping portion 24 to the surface of the extending portion 26. Hereinafter, in the anti-slip portion 28, a portion provided on the curved surface 24a of the gripping portion 24 is referred to as a "anti-slip portion 28a", and a portion provided on the surface of the extending portion 26 is referred to as an "anti-slip portion 28b".

The anti-slip portion 28b is provided only on a portion located on one side (the right side) of the surface of the extending portion 26, and is not provided on a portion located on the other side (the left side). In other words, the anti-slip portion 28b is provided only on a side opposite to the operating portion 25 side in the surface of the extending portion 26, and is not provided on the operating portion 25 side.

In addition, the anti-slip portion 28a is not provided at the lower portion of the curved surface 24a of the gripping portion 24 on the operating portion 25 side. That is, the curved surface 24a of the gripping portion 24 includes a area 24a1 where the anti-slip portion 28b is not provided on the extending portion 26 side and the operating portion 25 side (the lower portion on the operating portion 25 side).

In other words, the anti-slip portion 28 is not provided on the thumb side under the state where the gripping portion 24 is gripped with the right hand. In particular, the anti-slip portion 28a is not provided in the portion where the vicinity of the root of the thumb (the thumb ball) touches under the state where the gripping portion 24 is gripped with the right hand.

In this manner, the movement of the thumb that operates the operation switch provided in the operating portion 25 is not interfered by the anti-slip portion 28.

Next, operation switches provided on the grip 23 will be described.

The grip 23 is provided with a plurality of operation switches. The plurality of operation switches are respectively provided in the gripping portion 24 and in the operating portion 25.

As shown in FIG. 7 to FIG. 9 and the like, the operating portion 25 is provided with a plurality of operation switches 30, 31 and 32. The plurality of operation switches 30, 31, and 32 are provided on the surface (the second surface) 25a of the operating portion 25.

In particular, the plurality of operation switches 30, 31, and 32 are provided on the upper portion of the surface (the second surface) 25a of the operating portion 25. Although no operation switch is provided on the lower portion of the second surface 25a, other operation switches may be provided as necessary.

The plurality of operation switches 30, 31, and 32 are arranged in an area where the operator who holds the gripping portion 24 with the right hand can operate by stretching the thumb. The operation switches 30 and 31 are constituted of seesaw switches. The operation switch 32 is constituted of a push button switch.

In particular, the operation switch 30 is a shuttle switch (a changeover switch for switching forward and backward traveling of the traveling vehicle 1) for operating the transmission device. By pressing the upper portion (a portion indicated by "F") of the operation switch 30, the operation switch 30 is switched to the forward traveling, and by pressing the lower portion (a portion indicated by "R") of the operation switch 30, the operation switch 30 is switched to the backward traveling.

The operation switch 31 is a one-touch switch configured to drive the lifting device 4 to lift and lower the working device. When the upper portion of the operation switch 31 is pushed, the working device is lifted, and when the lower portion of the operation switch 31 is pushed, the working device is lowered.

The operation switch 32 is a switch for switching between an automatic mode and a manual mode of the automatic shifting. By pressing the operation switch 32, the switching between the automatic transmission mode and the manual transmission mode are performed. In the automatic transmission mode, the optimum vehicle speed step is automatically selected under the electronic control within the range of the vehicle speed step set in advance by the operator. In the manual shift mode, the operator can manually change the vehicle speed step.

As shown in FIG. 7 to FIG. 11 and the like, other operation switches 33 and 34 different from the operation switches 30, 31, and 32 provided on the operating portion 25 are provided on the standing surface 24e of the gripping portion 24. The other operation switches 33 and 34 provided on the standing surface 24e are push button switches. The operation switches 33 and 34 are main transmission switches for switching the transmission ratio.

Pressing the operation switch 33 increases the transmission ratio, and pressing the operation switch 34 decreases the transmission ratio. The operation switch 33 and the operation switch 34 are arranged side by side in the vertical direction.

In particular, the operation switch 34 is arranged below and behind the operation switch 33. As shown in FIG. 8 and the like, the anti-slip portion 28 is provided over an area which overlaps with at least the operation switches 33 and 34 in the vertical direction.

As shown in FIG. 8, FIG. 11, and the like, the area 24a1 where the anti-slip portion 28b is not provided is arranged below the operation switches 30, 31, and 32 in the vertical direction. In this manner, in selecting the operation switches 30, 31, and 32, the bulge of the root of the thumb can be slid on the surface of the area 24a1, so that the fingertip position of the thumb can be easily put on the operation switch to be operated.

In addition, in operating (pressing) the selected operation switch, the bulge of the root of the thumb is positioned on the surface of the anti-slip portion 28b, and thus the slipping is suppressed, so that the operation switch can be pressed surely.

As shown in FIG. 7 to FIG. 10 and the like, another operation switch 35 other than the operation switches 30, 31, and 32 is provided on the surface constituting a periphery around the gripping portion 24, that is, a periphery around the grip 23. The operation switch 35 is provided on at least one of the upper surface 24c, the lower surface 24d, the right side surface 24f, and the corner edge surface 24g of the gripping portion 24.

In the case of the present embodiment, another operation switch 35 other than the operation switches 30, 31, and 32 provided on the operating portion 25 is provided on the upper surface 24c of the gripping portion 24. The other operation switch 35 provided on the upper surface 24c of the gripping portion 24 is a push button switch and is provided protruding from the upper surface 24c.

The operation switch 35 is a switch for switching between permission and inhibition of the swinging performed by the swing body 22, and more in particular, is an sub-transmission check switch. By pushing the operation switch 35, the swing body 22 can be swung. When the swing body 22 is swung forward while pressing the operation switch 35, the step of the sub-shifting is shifted up, and when swung backward, the step is shifted down. That is, the operation switch 35 is a switch for switching between permission and inhibition of the shift-changing operation by swinging the swing body 22.

The operation switch 35 is provided on the upper surface 24c of the gripping portion 24. Since the upper surface 24c of the gripping portion 24 is arranged above the curved surface 24a, it can be said that the operation switch 35 is arranged above the curved surface 24a. The operation switch 35 is arranged at a position near the operating portion 25 on the upper surface 24c.

In particular, as shown in FIG. 8, the operation switch 35 is arranged on a position (a position closer to the left) closer to the operating portion 25 from a middle position 24M between a side edge (the first side edge portion 24h1) on one side of the gripping portion 24 and a side edge (the second side edge portion 24h2) on the other side of the gripping portion 24. The middle position 24M between the side edge on one side and the side edge on the other side is a middle position in the broadest portion (the lower edge portion 24j of the curved surface 24a) of the distance between the first side edge portion 24h1 and the second side edge portion 24h2 in the width direction of the armrest 15.

As described above, the upper surface 24c of the gripping portion 24 and the upper surface (the second upper surface) 25c of the operating portion 25 are continued forming a mountain shape with a vertex 29 formed in the vicinity of the boundary between the gripping portion 24 and the operating portion 25. As shown in FIG. 8, the operation switch 35 is arranged on a position (a position closer to the left) closer to the vertex 29 from the middle position 24M between the side edge (the first side edge portion 24h1) on one side of the gripping portion 24 and the side edge (the second side edge portion 24h2) on the other side of the gripping portion 24.

As shown in FIG. 10, the operation switch 35 is arranged on an extension line La obtained by extending the front surface 25a (the second surface 25a) of the operating portion 25 toward the gripping portion 24 side. In this manner, the operator can intuitively know the position of the operation switch 35 while holding the gripping portion 24.

As shown in FIG. 12 and FIG. 13, another operation switch 36 different from the operation switches 30, 31, and 32 provided on the operating portion 25 is also provided on the back surface 24b of the gripping portion 24. The operation switch 36 provided on the back surface 24b of the gripping portion 24 is a push button switch.

The operation switch 36 is a shuttle check switch for switching between permission and inhibition of operation of the operation switch 30 which is a shuttle switch. By operating the operation switch (the shuttle switch) 30 while pressing the operation switch (the shuttle check switch) 36, the switching between the forward traveling and the reverse traveling is possible.

Figure 14:
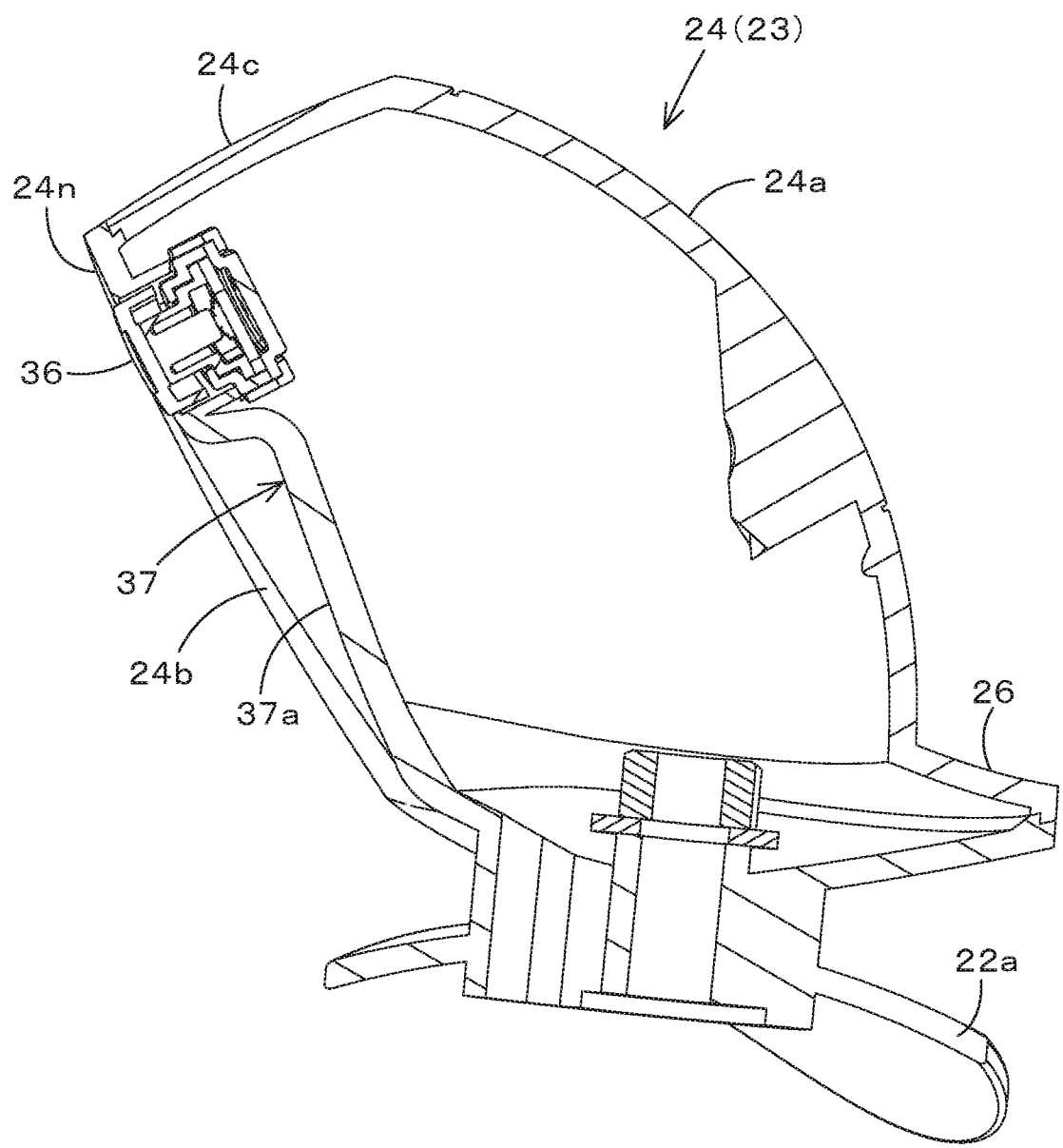
FIG. 14 is a XIV-XIV cross-section view of FIG. 13.
Figure 15:
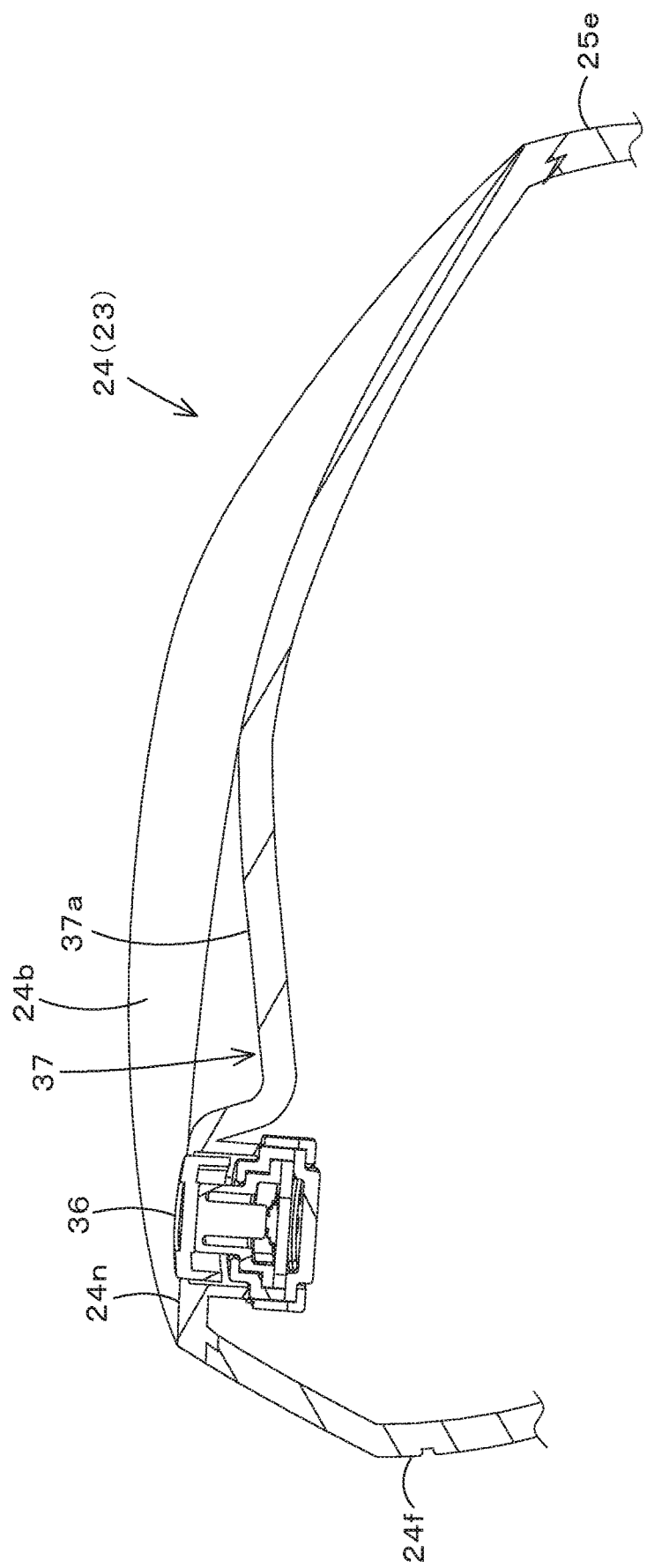
FIG. 15 is a XV-XV cross-section view of FIG. 13.

As shown in FIG. 14 and FIG. 15, the operation switch 36 does not protrude from the back surface 24b. Thus, it is possible to prevent the operation switch 36 from damaging the operational feeling in gripping the gripping portion 24 to operate the operation lever 21.

As shown in FIG. 12 to FIG. 15, a guide concave portion 37 for guiding a finger toward the operation switch 36 is provided on the back surface 24b of the gripping portion 24. The operation switch 36 is operated by the index finger of the right hand under the state where the gripping portion 24 is gripped by the right hand. Thus, the guide concave portion 37 guides, toward the operation switch 36, the index finger of the right hand that grips the gripping portion 24.

The guide concave portion 37 is formed to be recessed from the back surface 24b of the gripping portion 24. The guide recessed portion 37 has an inclined surface 37a in which the depth of the recess changes as the guide recessed portion 37 approaches the operation switch 36. As shown in FIG. 14 and FIG. 15, the inclined surface 37a gradually increases in depth as it approaches the operation switch 36.

Thus, the finger is naturally guided to the operation switch 36 by sliding the finger along the inclination of the guide concave portion 37. In addition, as for the inclined surface 37a, the depth of the dent may become gradually shallow as it approaches the operation switch 36.

The outer edge portion of the guide concave portion 37 forms a closed area on the back surface 24b of the gripping portion 24. That is, the outer edge portion 37b of the guide concave portion 37 is inside the outer edge portion (the upper edge portion, the lower edge portion, the left edge portion, the right edge portion) of the back surface 24b and does not reach the outer edge portion.

In this manner, a non-recessed area 24p is formed around the closed area formed of the outer edge portion 37b of the guide concave portion 37 on the back surface 24b of the gripping portion 24. The non-recessed area 24p surrounds the periphery (the outside) of the outer edge portion 37b of the guide concave portion 37.

The operation switch 36 is arranged in the upper corner portion 24n on the side (the right side) opposite to the operator seat 10 on the back surface 24b of the gripping portion 24. The upper corner portion 24n is located on the back side of the corner edge portion 24k of the curved surface 24a of the gripping portion 24, and is connected to the corner edge surface 24g. The inclined surface 37a extends in a fan shape from the vicinity of the upper corner portion 24n.

As indicated by imaginary lines in FIG. 13, the guide concave portion 37 may be provided with a projection or groove 37c extending in an arc shape. The protrusion or groove 37c is provided in a region near the center of the guide concave portion 37 (an area between the outer edge portion on the operation switch 36 side and the outer edge portion on the side opposite to the operation switch 36).

The protrusion or groove 37c is formed in an arc shape with the operation switch 36 as the center. In this manner, when the fingertip is positioned near the center of the guide concave portion 37, the operator can feel that the operation switch 36 exists at the center of the arc and knows the position of the operation switch 36 by touching the protrusion or groove 37c.

<Elbow Rest>

Next, the elbow rest portion 18 will be described.

The elbow holder 18 is a portion where the operator sitting on the operator seat 10 puts his elbow. The elbow rest portion 18 is made of a material having cushioning properties in whole or in portion (at least in the upper surface).

Figure 2:
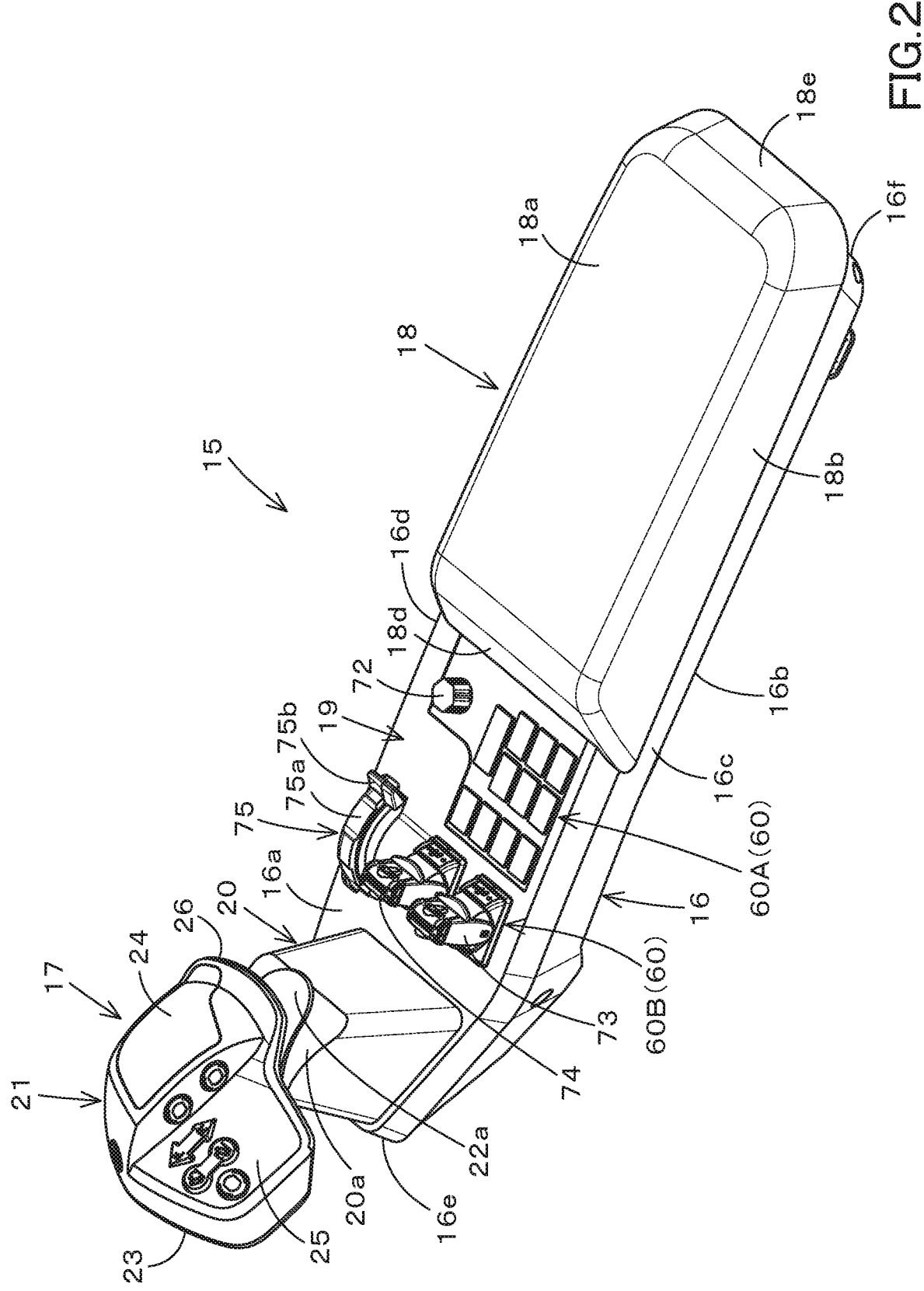
FIG. 2 is a perspective view of the armrest seen downward from a left back side according to the embodiment.
Figure 3:
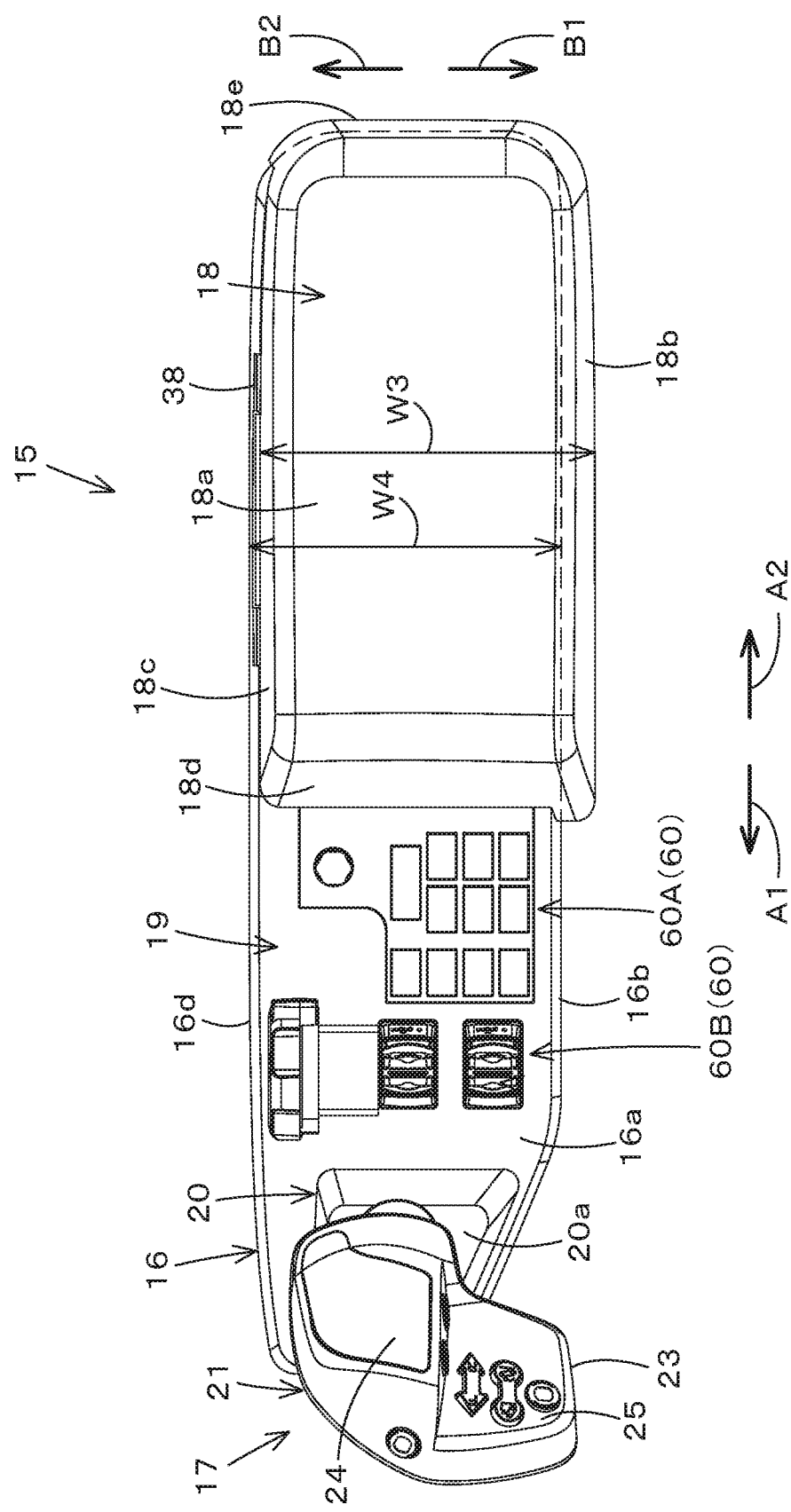
FIG. 3 is a plan view of the armrest according to the embodiment.

As shown in FIG. 2 to FIG. 5, the elbow rest portion 18 is arranged at the rear portion of the armrest 15. The elbow rest portion 18 is attached to the main body 16 of the armrest 15, and covers the rear portion of the upper surface 16a of the main body 16. As shown in FIG. 3, the width W3 of the elbow rest portion 18 (a length of the armrest 15 in the width direction) is larger than the width W4 of the main body 16 (a length in the width direction of the armrest 15) (W3>W4).

The elbow rest portion 18 is arranged behind the operation lever 21. As shown in FIG. 3 and the like, the operation lever 21 is arranged within the width of the elbow rest portion 18 in the machine width direction. In other words, in the machine width direction, the left end portion of the operation lever 21 (the left end portion of the grip 23) is located to the right from the left end portion of the elbow rest portion 18, and the right end portion of the operation lever 21 (the right end portion of the grip 23) is located to the left from the right end of the elbow rest portion 18.

In this manner, the operator seated in the operator seat 10 can operate the operation lever 21 without moving the elbow placed on the elbow rest portion 18 (under the state where the elbow is not separated away from the torso), thereby providing the excellent operability.

The elbow rest portion 18 has an upper surface 18a, a left side surface 18b, a right side surface 18c, a front surface 18d, and a rear surface 18e. The upper surface 18a is arranged above the upper surface 16a of the main body 16. The upper surface 18a is a substantially flat surface and is inclined so as to shift downward as it extends from the front to the rear. The front surface 18d is a surface extending downward from the front portion of the upper surface 18a, and is inclined so as to shift forward as it extends downward.

The rear surface 18e is a surface extending downward from the rear portion of the upper surface 18a, and is inclined so as to shift backward as it extends downward. The left side surface 18b is a surface extending downward from the left portion of the upper surface 18a, and is inclined so as to shift to the left as it extends downward. The left side surface 18b is located to the left from the left side surface 16b of the main body 16. The right side surface 18c is a surface extending downward from the right portion of the upper surface 18a, and is inclined so as to shift to the right as it extends downward.

Figure 16:
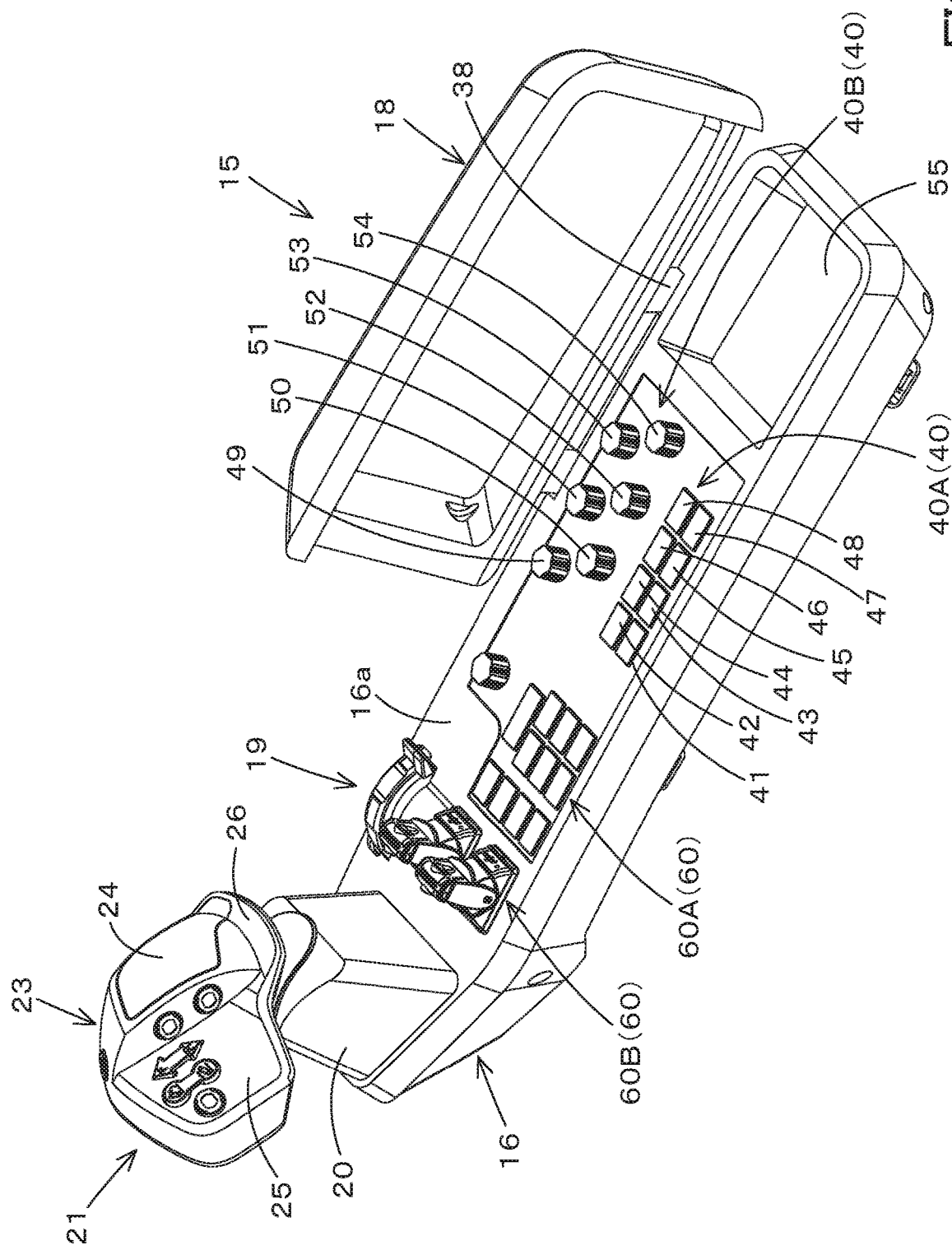
FIG. 16 is a perspective view illustrating a state where an elbow-rest portion of the armrest is opened seen downward from the left back side according to the embodiment.
Figure 17:
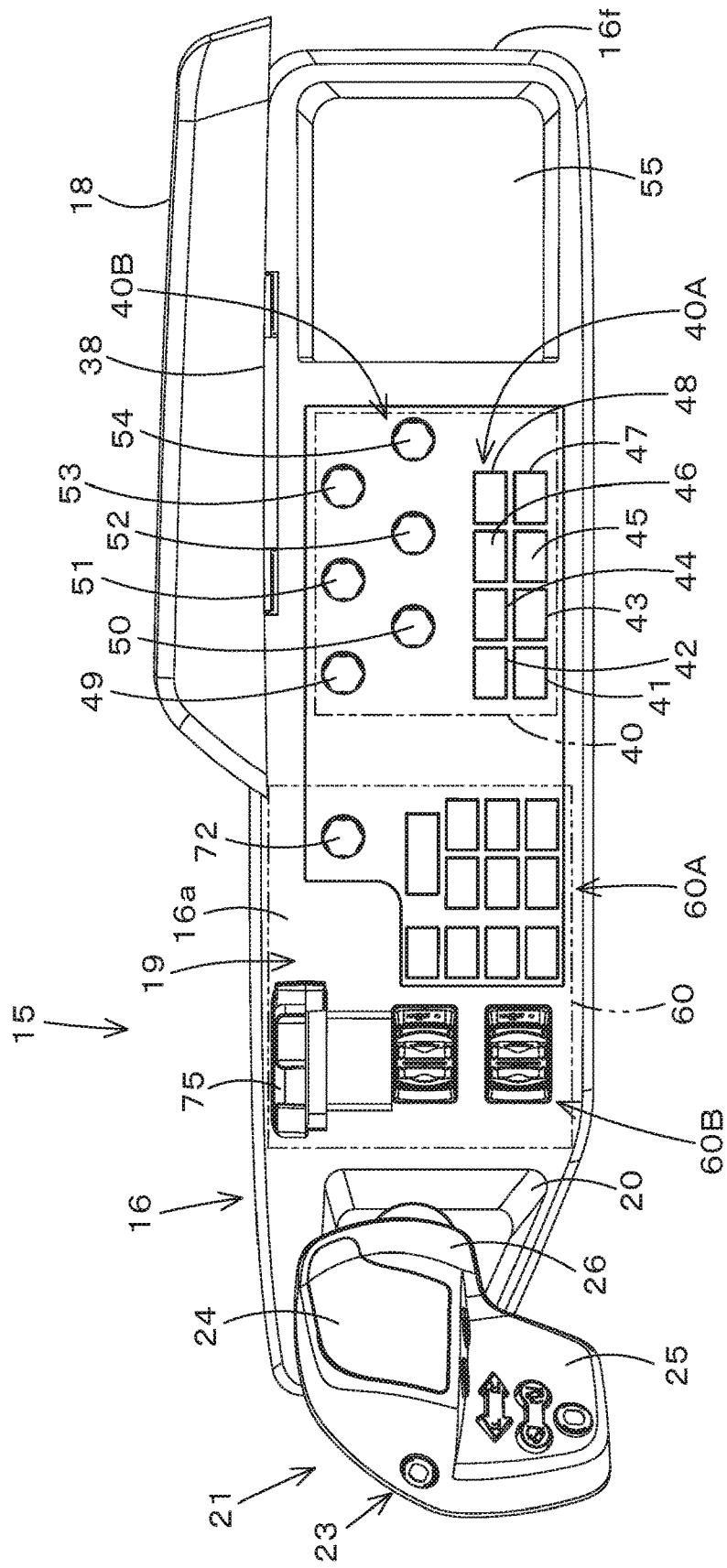
FIG. 17 is a plan view illustrating the state where the elbow-rest portion of the armrest is opened according to the embodiment.

The elbow rest portion 18 has a lower portion of the right side surface 18c connected to the main body 16 by a hinge 38. In this manner, the elbow rest portion 18 is capable of being rotated upward with the hinge 38 as a fulcrum. As shown in FIG. 16 and FIG. 17, the elbow rest portion 18 is capable of being retracted to the upper right of the main body 16 by rotating the elbow rest portion 18 upward. In this manner, the upper surface 16a of the main body 16 covered with the elbow rest portion 18 can be opened.

As shown in FIG. 16 and FIG. 17, a plurality of operation tools are provided on the upper surface 16a of the main body 16 covered with the elbow rest portion 18. Hereinafter, the plurality of operation tools are referred to as a "rear operation tool group 40". In FIG. 17, the rear operation tool group 40 is shown surrounded by an imaginary line (a two-dot chain line) denoted by a reference numeral 40. The rear operation tool group 40 is arranged at the rear portion of the main body 16. The rear operation tool group 40 is covered with the elbow rest portion 18 when the elbow rest portion 18 is used, and is exposed and operable when the elbow rest portion 18 is opened.

The rear operation tool group 40 includes an operation tool group 40A and an operation tool group 40B having different operation manners. Hereinafter, for convenience of the explanation, the operation tool group 40A is referred to as a "third operation tool group 40A", and the operation tool group 40B is referred to as a "fourth operation tool group 40B".

The third operation tool group 40A includes a plurality of operation tools to be operated by the pressing. In particular, the third operation tool group 40A includes a first rear operation tool 41, a second rear operation tool 42, a third rear operation tool 43, a fourth rear operation tool 44, a fifth rear operation tool 45, and a sixth rear operation tool 46, a seventh rear operation tool 47, and an eighth rear operation tool 48. The first rear operation tool 41 to the eighth rear operation tool 48 are push button switches (tactile switches) to be operated by the pressing.

The fourth operation tool group 40B includes a plurality of operation tools to be operated by the rotation around the vertical axis (an axis in the vertical direction). In particular, the fourth operation tool group 40B includes a ninth rear operation tool 49, a tenth rear operation tool 50, an eleventh rear operation tool 51, a twelfth rear operation tool 52, a thirteenth rear operation tool 53, and a fourteenth rear operation tool 54. The ninth rear operation tool 49 to the fourteenth rear operation tool 54 are rotary dials that are operated by rotation around the vertical axis.

The third operation tool group 40A (the first rear operation tool 41 to the eighth rear operation tool 48) is arranged on the left portion (the operator seat 10 side) of the upper surface 16a of the main body 16. The fourth operation tool group 40B (the ninth rear operation tool 49 to the fourteenth rear operation tool 54) is arranged on the right portion (the side opposite to the operator seat 10 side) of the upper surface 16a of the main body 16.

That is, the third operation tool group 40A (the first rear operation tool 41 to the eighth rear operation tool 48) as the push buttons switches is arranged on the left portion of the upper surface 16a (on the operator seat 10 side), and the fourth operation tool group 40B (the ninth rear operation tool 49 to the fourteenth rear operation tool 54) as the rotary dials is arranged on the right portion of the upper surface 16a (on the side opposite to the operator seat 10 side).

In this manner, the operator seated on the operator seat 10 can easily operate the push button switch and the rotary dial in natural movement of the fingers.

The first rear operation tool 41 and the second rear operation tool 42 are automatic transmission mode changeover switches. When the first rear operation tool 41 is pressed, the automatic transmission mode turns into the load mode. When the second rear operation tool 42 is pressed, the automatic transmission mode turns into the field mode. The third rear operation tool 43 is a power assist control switch. By pressing the third rear operation tool 43, it is possible to keep the vehicle speed and the rotational speed of the PTO shaft substantially constant while suppressing fluctuations in the engine revolving speed caused by the load fluctuations in the working device and the like.

The fourth rear operation tool 44 is a mode changeover switch, and is configured to switch between the position control and the draft control. The fifth rear operation tool 45 is a DHC switch, and smoothes the shift-changing operation according to the engine load. The sixth rear operation tool 46 is an auxiliary switch, and a function is added to the sixth rear operation tool 46 as necessary.

The seventh rear operation tool 47 and the eighth rear operation tool 48 are engine memory adjustment switches, which adjusts the revolving speed (a first revolving speed, a second revolving speed) set by the engine speed memory switches (a second front operation tool 62 and a third front operation tool 63) described later. In particular, the seventh rear operation tool 47 decreases the set revolving speed, and the eighth rear operation tool 48 increases the set revolving speed.

As shown in FIG. 17, the first rear operation tool 41 and the second rear operation tool 42, the third rear operation tool 43 and the fourth rear operation tool 44, the fifth rear operation tool 45 and the sixth rear operation tool 46, and the seventh rear operation tool 47 and the eighth rear operation tool 48 are arranged respectively in the width direction of the armrest 15.

The first rear operation tool 41, the third rear operation tool 43, the fifth rear operation tool 45, and the seventh rear operation tool 47 are arranged in the front-rear direction. The second rear operation tool 42, the fourth rear operation tool 44, the sixth rear operation tool 46, and the eighth rear operation tool 48 are arranged in the front-rear direction.

The ninth rear operation tool 49 is a rotary dial for adjusting the automatic transmission mode sensitivity. The tenth rear operation tool 50 is a rotary dial for adjusting the shuttle transmission sensitivity. The eleventh rear operation tool 51 is a rotary dial for setting an upper limit of the engine revolving speed.

The twelfth rear operation tool 52 is a rotary dial for adjusting the draft ratio. The thirteenth rear operation tool 53 is a rotary dial for adjusting an upper limit of the 3P (the lift arm). The fourteenth rear operation tool 54 is a rotary dial for adjusting the falling speed of the working device.

In principle, the plurality of rear operation tools included in the rear operation tool group 40 are operation tools that are not used while the working vehicle travels. Since the rear operation tool group 40 is covered with the elbow rest portion 18 during the traveling of working vehicle 1, it can be prevented from being touched and operated unintentionally during the traveling.

In addition, since the rear operation tool group 40 may be used with the elbow rest portion 18 opened after stopping the traveling of the working vehicle 1, the operability is not deteriorated even if the rear operation tool group 40 is covered with the elbow rest portion 18 during the traveling. However, the specific types and number of the rear operation tools included in the rear operation tool group 40 are not limited to the types and numbers of the rear operation tools described above.

As shown in FIG. 16 and FIG. 17, a storage portion 55 is provided behind the rear operation tool group 40. The storage portion 55 has a space recessed from the upper surface 16*a* of the main body 16, and an article such as a smartphone (a multifunctional mobile phone) can be housed in the space. The storage portion 55 is covered with the elbow rest portion 18 when the elbow rest portion 18 is used, and the article can be taken in and out under the state where the elbow rest portion 18 is opened.

<Operation Tool Arrangement Portion>

As shown in FIG. 2 to FIG. 5 and FIG. 16 to FIG. 18, in the operation tool arrangement portion 19, a plurality of operation tools are arranged. Hereinafter, the plurality of operation tools arranged in the operation tool arrangement portion 19 will be referred to as a "front operation tool group 60". In FIG. 17, the front operation tool group 60 is surrounded by an imaginary line denoted by a reference numeral 60.

The front operation tool group 60 is arranged on the upper surface 16*a* of the main body 16 in front of the rear operation tool group 40. The front operation tool group 60 and the rear operation tool group 40 are arranged on the same surface (the upper surface 16*a*). The operation tools included in the front operation tool group 60 arranged in the operation tool arrangement portion 19 are operation tools frequently operated in comparison with the operation tools included in the rear operation tool group 40 covered by the elbow rest portion 18.

The operation tool arrangement portion 19 is provided at a position closer to the front of the armrest 15. In particular, the operation tool arrangement portion 19 is provided behind the swing operation portion 17 in front of the elbow rest portion 18. In other words, the operation tool arrangement portion 19 is provided between the swing operation portion 17 and the elbow rest portion 18. The operation tool arrangement portion 19 is an upper surface arranged in a portion located between the swing operating portion 17 and the elbow rest portion 18 in the upper surface 16*a* of the main body 16.

As shown in FIG. 4 and FIG. 5, the operation tool arrangement portion 19 is provided at a lower position with respect to the upper surface 20*a* of the pedestal 20 and the upper surface 18*a* of the elbow rest portion 18. That is, the height of the operation tool arrangement portion 19 is lower than the height of the pedestal 20 (the height from the upper surface 16*a*) and lower than the height of the upper surface 18*a* of the elbow rest portion 18.

In other words, the operation tool arrangement portion 19 is provided so as to be recessed with respect to the upper surface 20*a* of the pedestal 20 and the upper surface 18*a* of the elbow rest portion 18. In addition, the upper surface of the operation tool arrangement portion 19 inclines shifting downward as it extends forward.

As shown in FIG. 4, the front operation tool group 60 is arranged below an imaginary straight line L1 that connects the upper end portion of the pedestal 20 and the front end portion of the upper surface 18*a* of the elbow rest portion 18. That is, the front operation tool group 60 does not protrude upward from the imaginary straight line L1.

In addition, the front operation tool group 60 is arranged below an extension line L2 that extends the upper surface 18*a* of the elbow rest portion 18 to the pedestal 20. That is, the front operation tool group 60 does not protrude upward from the extension line L2.

The upper end portion of the pedestal 20 is higher than the upper surface 18*a* of the elbow rest portion 18. Thus, the imaginary straight line L1 is inclined so as to shift upward as it extends forward. In addition, since the upper surface 18*a* of the elbow rest portion 18 is inclined shifting downward as it extends from the front to the rear, the extension line L2 is also inclined shifting upward as it extends forward. In addition, the distance in the vertical direction between the upper surface of the operation tool arrangement portion 19 and the imaginary straight line L1 increases toward the front.

Figure 18:
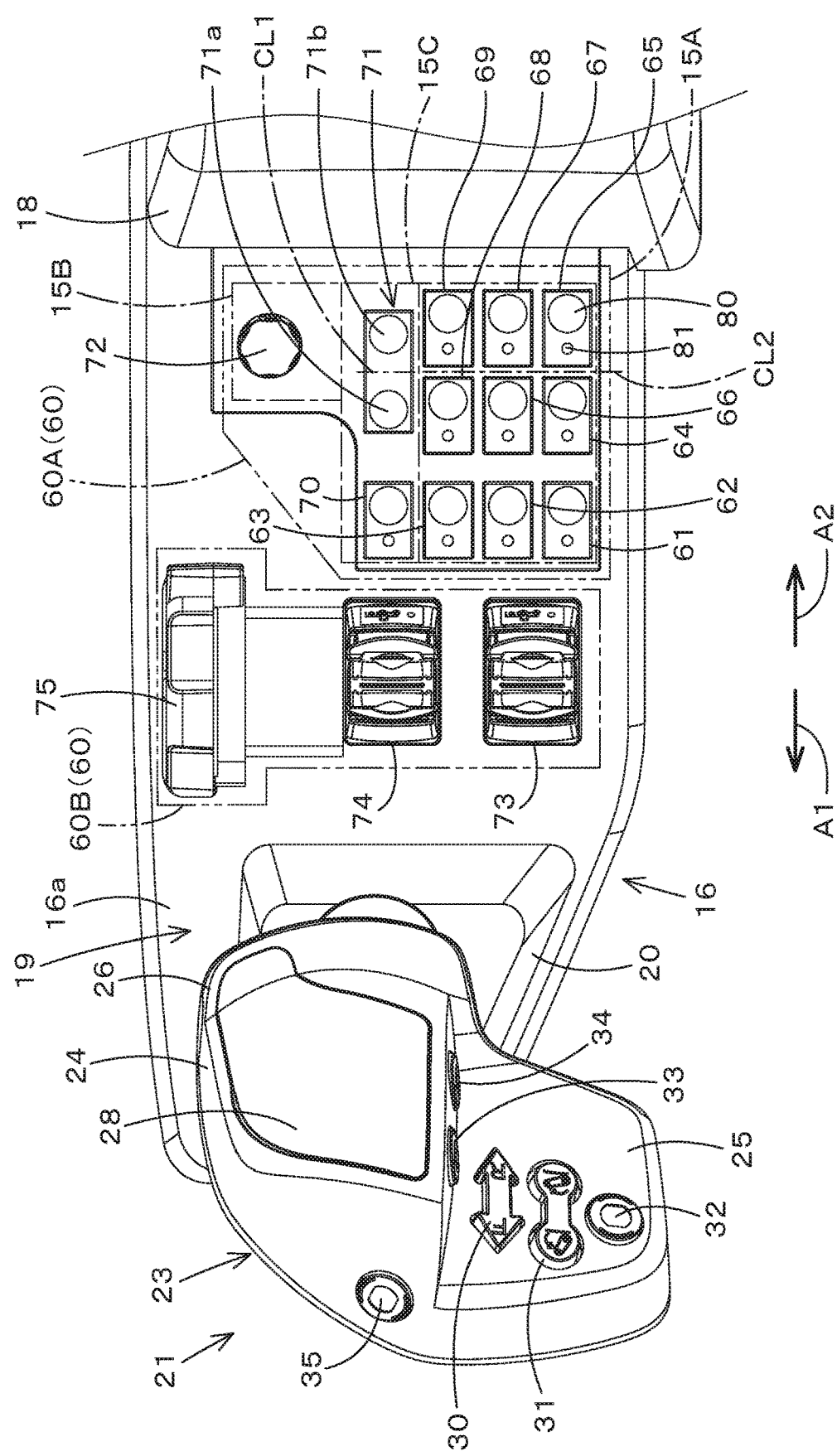
FIG. 18 is a plan view illustrating a front portion of the armrest according to the embodiment.

The front operation tool group 60 includes a first operation tool group 60A and a second operation tool group 60B. In FIG. 18, the first operation tool group 60A is surrounded by an imaginary line labeled by a reference numeral "60A", and the second operation tool group 60B is surrounded by an imaginary line labeled by a reference numeral "60B".

The first operation tool group 60A is arranged at the rear portion of the operation tool arrangement portion 19. The second operation tool group 60B is arranged at the front portion of the operation tool arrangement portion 19. That is, in the operation tool arrangement portion 19, the second operation tool group 60B is arranged in front of the first operation tool group 60A.

First, the first operation tool group 60A will be described.

As shown in FIG. 18, the first operation tool group 60A is constituted of a first front operation tool 61, a second front operation tool 62, a third front operation tool 63, a fourth front operation tool 64, a fifth front operation tool 65, a sixth front operation tool 66, a seventh front operation tool 67, an eighth front operation tool 68, a ninth front operation tool 69, a tenth front operation tool 70, an eleventh front operation tool 71, and a twelfth front operation tool 72.

The first front operation tool 61 to the eleventh front operation tool 71 are push button switches (the tactile switches) serving as pressing operation tools. That is, the first operation tool group 60A includes a plurality of operation tools operated by the pressing. In particular, the first front operation tool 61 to the ninth front operation tool 69 are traveling pressing operation tools that perform the traveling operation through the pressing. The tenth front operation tool 70 and the eleventh front operation tool 71 are working pressing operation tools that perform operations related to the working through the pressing.

The first front operation tool 61 is a shuttle-shifting neutral switch, and can return the shift of transmission device to the neutral by being pressed. The second front operation tool 62 and the third front operation tool 63 are engine revolving speed memory switches, and are configured to set the revolving speed of the engine 8 to the engine revolving speed stored in advance in the storage portion of the control device.

By being pressed, the second front operation tool 62 is capable of setting the revolving speed of the engine 8 to a first revolving speed set in advance. By being pressed, the third front operation tool 63 is capable of setting the revolving speed of the engine 8 to a second revolving speed different from the first rotation speed set in advance.

The fourth front operation tool 64 is a differential lock switch (a manual switch). The fifth front operation tool 65 is a differential lock switch (an automatic switch). The sixth front operation tool 66 is a 4WD switch (a manual switch), and is pressed to drive the front wheel and the rear wheel constantly. The seventh front operation tool 67 is a 4WD switch (an automatic switch), and is pressed to automatically switch the driving between the 2WD and the 4WD depending on the vehicle speed and the steering angle of the front wheel.

The eighth front operation tool 68 is a double speed switch, and is pressed to increase the traveling speed of the front wheel in turning, thereby making a small turn. The ninth front operation tool 69 is a turn switch, and is pressed to reduce the engine revolving speed when the working device is lifted and thereby turns the working vehicle 1 at a low speed. The tenth front operation tool 70 is a 3P link lock switch, and can lock the lifting device 4 by being pressed so that the working device is prevented from lowering.

The eleventh front operation tool 71 is a one-touch switch that drives the lifting device 4 to lift and lower the working device. The eleventh front operation tool 71 is a small operation tool having an area smaller than the area of the traveling pressing operation tool (the first front operation tool 61 to the ninth front operation tool 69). In the case of the present embodiment, regarding the eleventh front operation tool (a small operation tool) 71, the plurality (two) of the pressing operation portions 71a and 71b are integrally formed. However, the plurality (two) of pressing operation portions 71a and 71b may be arranged close to each other.

The pressing operating portions 71a and 71b are portions that are pressed in the operation. The eleventh front working tool 71 is a seesaw switch in which two pressing operation portions 71a and 71b are selectively pressed. The pressing operation portion 71a is a front half area of the eleventh front working tool 71. The pressing operation portion 71b is a rear half area of the eleventh front working tool 71. The surface area of each of the two pressing operating portions 71a and 71b is smaller than the surface area of the traveling pressing operation tool (the first front operation tool 61 to the ninth front operation tool 69).

The traveling pressing operation tools (the first front operation tool 61 to the ninth front operation tool 69) each include a pressing operation portion 80 and a indicating portion 81. In FIG. 18, for convenience of the illustration space, only the sixth front operation tool 65 is denoted by reference numerals "80" and "81". Another traveling pressing operation tool also has the pressing operation portion 80 and the indicating portion 81 at the positions similar to those of the sixth front operation tool 65.

The pressing operation portion 80 is a portion that is pressed for operating the traveling pressing operation tool (the first front operation tool 61 to the ninth front operation tool 69). The indicating portion 81 indicates whether the traveling pressing operation tool is in the operation state or in the non-operation state. The operation state is a state where the pressing operation portion 80 is pressed. The non-operation state is a state where the pressing operation portion 80 is not pressed. The indicating portion 81 is constituted of lamps, such as the LED for lighting.

The lamps constituting the indicating portion 81 are turned on in the operation state and is turned off (extinguished) in the non-operation state. That is, the indicating portion 81 is an indicator that indicates whether the traveling pressing operation tool is in the operation state or in the non-operation state by being switched between lighting and extinguished. The operator can know whether the traveling pressing operation tool is in the operating state or in the non-operating state by observing whether the indicating portion 81 is in the lighting state or in the extinguished state.

The eleventh front operation tool (a small operation tool) 71 has the pressing operating portions 71a and 71b, but does not have an indicating portion (an indicator) that indicates whether the operation state is in the non-operation state or in the non-operation state. That configuration eliminates the need for a space for providing the indicating portion. As the result, the surface area of the eleventh front operation tool (the small operation tool) 71 having a plurality (two) of the press operating portions 71a and 71b is configured to be smaller than a total of the surface areas of the same number (two) of the traveling pressing operation tool.

In particular, the eleventh front operation tool 71 has the two pressing operating portions 71a and 71b. However, the surface area of the eleventh front operation tool 71 is smaller than a total of the surface areas of the two traveling pressing operation tools (for example, the eighth front operation tool 68 and the ninth traveling operation tool 69).

That is, the eleventh front operation tool 71 has the plurality of pressing operating portions 71a and 71b that are intensively arranged and have areas smaller than the area of the traveling pressing operation tool (the first front operation tool 61 to the ninth front operation tool 69) having the indicating portion 81.

A center line CL1 of the eleventh front operation tool 71 in the front-rear direction coincide with a center line CL2 between the eleventh front operation tool 71 and the traveling pressing operation tool (the fourth front operation tool 64 and the fifth front operation tool 65, the sixth front operation tool 66 and the seventh front operation tool 67, the eighth front operation tool 68 and the ninth front operation tool 69) in the front-rear direction.

The pressing operating portions 71a and 71b of the eleventh front operation tool 71 are arranged on a position shifting, in the front-rear direction, from the pressing operation portion 80 of the traveling pressing operation tools (the fourth front operation tool 64 to the ninth front operation tool 69) arranged side by side with the eleventh front operation tool 71 in the machine width direction.

The length of the eleventh front operation tool 71 in the front-rear direction is shorter than a length obtained by combining, in the front-rear direction, the lengths of two traveling pressing operation tools (for example, the eighth front operation tool 68 and the ninth travel operation tool 69). The length of the eleventh front operation tool 71 in the machine width direction is equal to the length of the traveling pressing operation tool (for example, the eighth front operation tool 68) in the machine width direction.

The twelfth front operation tool 72 is a rotary operation tool configured to be rotated around the vertical axis to perform the operations related to the working. That is, the front operation tool group 60 includes a rotary operation tool (the twelfth front operation tool) 72 configured to be rotated around the vertical axis to perform the operations related to the working. The rotary operation tool 72 is arranged at the right rear portion of the operation tool arrangement portion 19. The rotary operation tool 72 is a tilling depth adjustment dial for driving the lifting device 4 to adjust the working depth by the working device (a plowing depth by the tiller).

As shown in FIG. 18, the surface (the upper surface 16a) of the armrest 15 includes a first area 15A, a second area 15B, and a third area 15C. The first area 15A, the second area 15B, and the third area 15C are provided in the operation tool arrangement portion 19. The first area 15A is provided on the operator seat 10 side. The second area 15B is provided on the side opposite to the operator seat 10 side. The third area 15C is provided between the first area 15A and the second area 15B.

The traveling pressing operation tools (the first front operation tool 61 to the ninth front operation tool 69) are arranged in the first area 15A. The twelfth operation tool (a rotary operation tool) 72 is arranged in the second area 15B. The tenth operation tool 70 and the eleventh front operation tool (a small operation tool) 71 are arranged in the third area 15C.

In this manner, the eleventh front operation tool (a small operation tool) 71 and the twelfth front operation tool (a rotary operation tool) 72 are arranged at positions adjacent to each other in the width direction of the armrest 15. In particular, the twelfth front operation tool (a rotary operation tool) 72 is arranged on one side of the armrest 15 (on the side opposite to the operator seat 10 side). The eleventh front operation tool (a small operation tool) 71 is arranged closer to the other side (a operator seat 10 side) than the twelfth front operation tool (a rotary operation tool) 72.

Here, the eleventh front operation tool (a small operation tool) 71 and the twelfth rotary operation tool (a rotary operation tool) 72 are both operation tools for operating the lifting device 4.

Thus, the eleventh front operation tool (a small operation tool) 71 and the twelfth rotary operation tool (a rotary operation tool) 72 are arranged at positions adjacent to each other in the width direction of the armrest 15, thereby improving the operability of the lifting device 4.

In addition, the tenth front operation tool 70 and the eleventh front operation tool 71 are arranged at positions adjacent to each other in the front-rear direction. In this manner, the tenth front operation tool 70, the eleventh front operation tool 71, and the twelfth rotary operation tool (a rotary operation tool) 72 that perform operations related to the lifting device 4 are arranged adjacent intensively, thereby improving the operability of operations related to 4.

Next, the second operation tool group 60B will be described.

As shown in FIG. 18, the second operation tool group 60B includes a thirteenth front operation tool 73, a fourteenth front operation tool 74, and a fifteenth front operation tool 75. The thirteenth front operation tool 73 and the fourteenth front operation tool 74 are operation tools to be operated to swing around the horizontal axis (an axis extending in the machine width direction). The fifteenth front operation tool 75 is an operation tool that is rotated around the horizontal axis (an axis extending in the machine width direction). That is, the second operation tool group 60B includes a plurality of operation tools to be operated by rotation or swinging around the horizontal axis.

The thirteenth front operation tool 73 and the fourteenth front operation tool 74 are PTO clutch control switches for performing an operation of connecting or disconnecting the PTO clutch. The thirteenth front operation tool 73 is a rear PTO clutch control switch. The fourteenth front operation tool 74 is a front PTO clutch control switch.

The fifteenth front operation tool 75 is a rotary dial that performs an operation related to traveling by being rotated around the horizontal axis. In the case of this embodiment, the fifteenth front operation tool 75 is an accelerator dial that increases or decreases the revolving speed of the engine 8.

As shown in FIG. 2, the fifteenth front operation tool (the accelerator dial) 75 includes a rotating body 75a and a knob 75b. The rotating body 75a protrudes upward from the upper surface of the armrest 15 in a convex arc shape in a side view.

The knob portion 75b protrudes from the upper surface of the rotating body 75a. The rotating body 75a is attached so as to be rotated around a lateral support shaft (around a horizontal direction) arranged inside the armrest 15.

By picking the knob 75b and moving the knob 75b forward or backward, the rotating body 75a rotates around the support shaft. When the knob 75b is moved forward, the revolving speed of the engine 8 is increased. When the knob 75b is moved backward, the revolving speed of the engine 8 is reduced.

As shown in FIG. 18, the thirteenth front operation tool 73, the fourteenth front operation tool 74, and the fifteenth front operation tool 75 are arranged side by side in the width direction of the armrest 15. The thirteenth front operation tool 73 and the fourteenth front operation tool 74 are arranged on the operator seat 10 side of the armrest 15. The fifteenth front operation tool 75 is arranged on the side opposite to the operator seat 10 side of the armrest 15.

As shown in FIG. 18, no other operation tool is arranged behind the fifteenth front operation tool 75 (in the direction of an arrowed line A2). Thus, in operating the fifteenth front operation tool (the accelerator dial) 75, other operation tools do not interfere the operation, thereby providing good operability.

As shown in FIG. 4 and FIG. 5, the height (the height from the surface 16a) of the operation tools (the thirteenth front operation tool 73 to the fifteenth front operation tool 75) to be operated by being rotated or swung around the horizontal axis is higher than the height of the operation tools (the first front operation tool 61 to the eleventh front operation tool 71) to be operated by being pressed. In addition, the heights of the operation tools (the thirteenth front operation tool 73 and the fourteenth front operation tool 74) to be operated by being swung around the horizontal axis are higher than the heights of the other operation tools.

In the operation tool arrangement portion 19, the operation tools (the 13th front operation tool 73 to the 15th front operation tool 75) that are operated by rotation or swinging around the horizontal axis are operated by pressing (the first operation tool 75). The front operation tool 61 to the eleventh front operation tool 71) are arranged in front of each other.

That is, in the operation tool arrangement portion 19, the high operation tools are arranged ahead of the low operation tools. The imaginary straight line L1 connecting the upper end portion of the pedestal 20 and the front end portion of the upper surface 18a of the elbow rest portion 18 is inclined so as to shift upward as it extends forward. Thus, it can avoid that an operation tool protrudes upwards from the imaginary straight line L1.

In this manner, it is possible to reliably prevent the arm of the operator who operates the operation lever 21 with the elbow placed on the elbow rest portion 18 from coming into contact with the operation switch arranged on the operation tool arrangement portion 19.

The front operation tool group 60 and the rear operation tool group 40 can be arranged on one base plate. In particular, the whole of the front operation tool group 60 and the whole of the rear operation tool group 40 can be arranged on one base plate. In addition, a part of the front operation tool group 60 and the whole of the rear operation tool group 40 can be arranged on one base plate.

In addition, the whole of the front operation tool group 60 and a part of the rear operation tool group 40 can be arranged on one base plate. In addition, a part of the front operation tool group 60 and a part of the rear operation tool group 40 can be arranged on one base plate. In the case of this embodiment, among the operation tools included in the front operation tool group 60 and the rear operation tool group 40, the operation tool other than the thirteenth front operation tool 73 and the fourteenth front operation tool 74 are arranged on one base plate.

Among the operation tools included in the front operation tool group 60, the rotary operation tool (the twelfth front operation tool 72) to be operated by being rotated around the vertical axis is arranged in an area on one side of the upper surface 16a of the main body 16 of the armrest 15 (on a side opposite to the operator seat 10 side). In addition, among the operation tools included in the rear operation tool group 40, the rotary operation tools (the ninth rear operation tool 49 to the fourteenth rear operation tool 54) to be operated by being rotated around the vertical axis are also arranged in the area on one side of the upper surface 16a of the main body 16.

That is, the rotary operation tool to be operated by being rotated about the vertical axis is arranged in the area on one side of the upper surface 16a of the main body 16 of the armrest 15. In this manner, the movement of the fingers of the right hand for the rotational operation around the vertical axis (the movement of picking and turning with the thumb and other fingers) can be performed naturally and smoothly.

Among the operation tools included in the front operation tool group 60, the pressing operation tools to be operated by being pressed (the first front operation tool 61 to the eleventh front operation tool 71) are arranged in an area on the other side (the operator seat 10 side) of the upper surface 16a of the main body 16 of the armrest 15. Among the operation tools included in the rear operation tool group 40, the pressing operation tools to be operated by being pressed (the first rear operation tool 41 to the eighth rear operation tool 48) are also arranged in the area on the other side (the operator seat 10 side) of the upper surface 16a.

That is, the pressing operation tool is arranged in an area on the other side of the upper surface 16a of the main body 16 of the armrest 15. In this manner, since the pressing operation tool is arranged on the side close to the thumb or the index finger, the pressing operation tool can be operated smoothly.

However, the particular types and number of front operation tools included in the front operation tool group 60 are not limited to the types and numbers of the front operation tools described above.

First Modification

Figure 19:
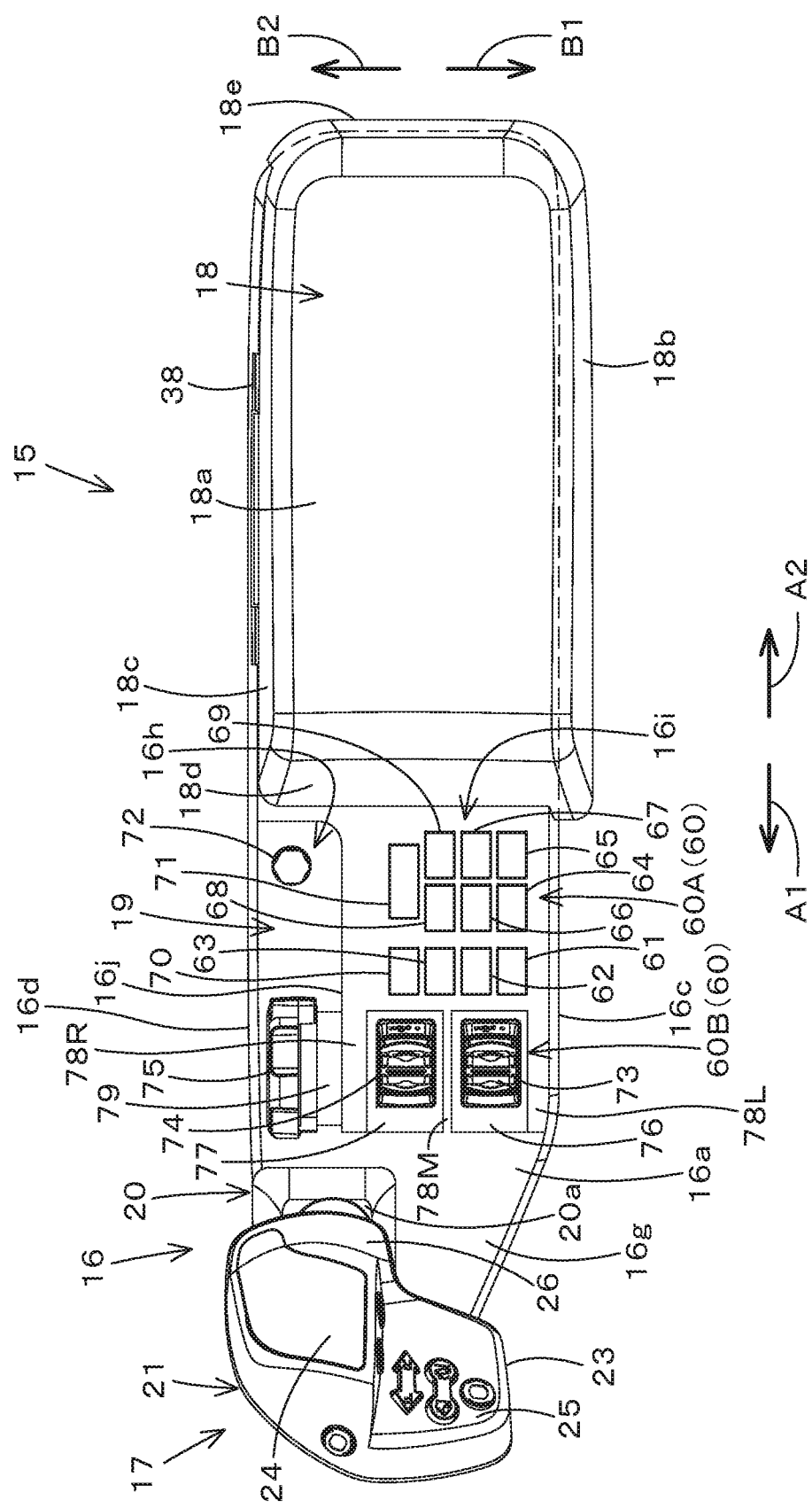
FIG. 19 is a plan view illustrating an armrest according to a first modification example of the embodiment.
Figure 20:
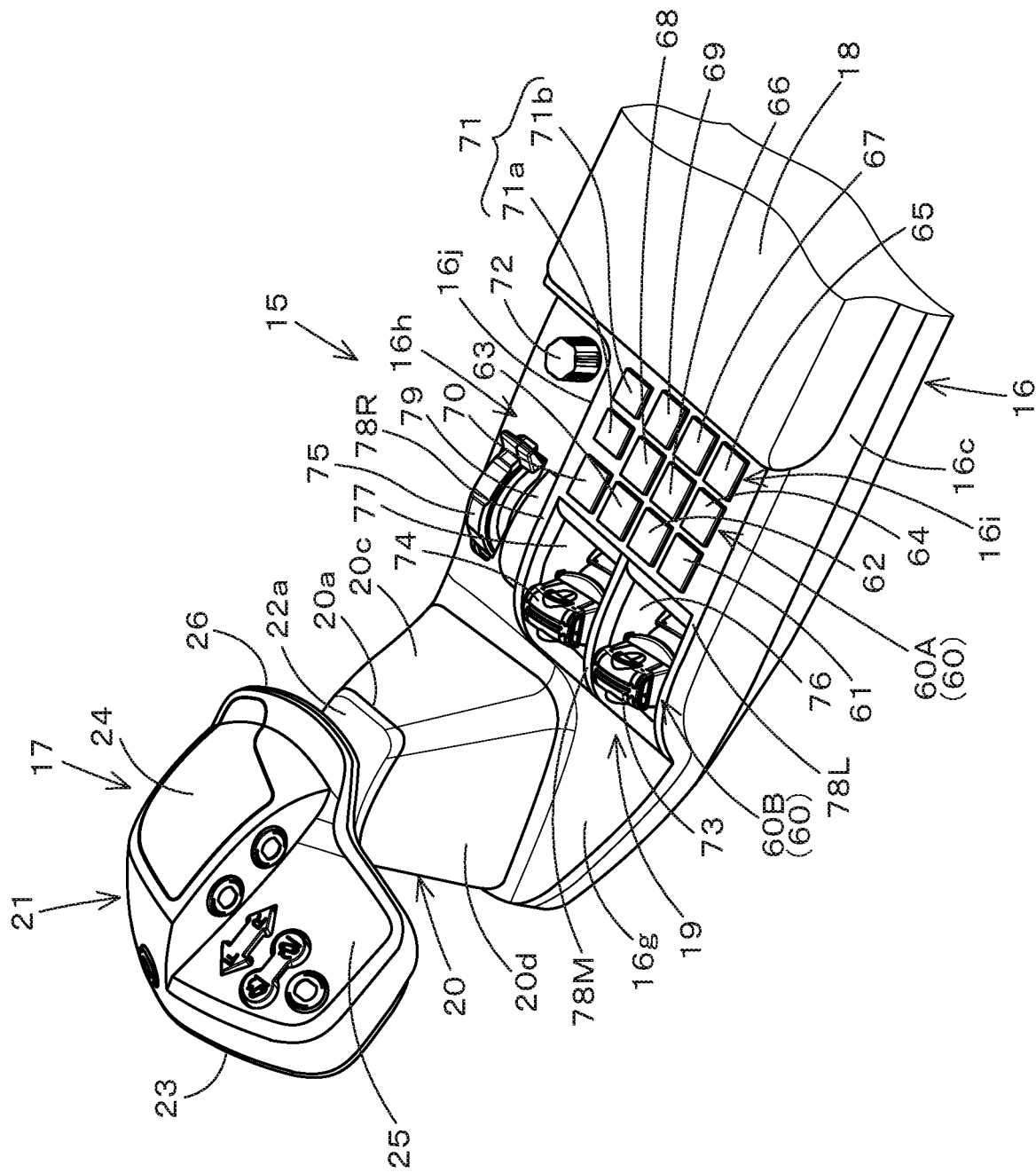
FIG. 20 is a perspective view of a front portion of the armrest seen downward from the left back side according to the first modification example.
Figure 21:
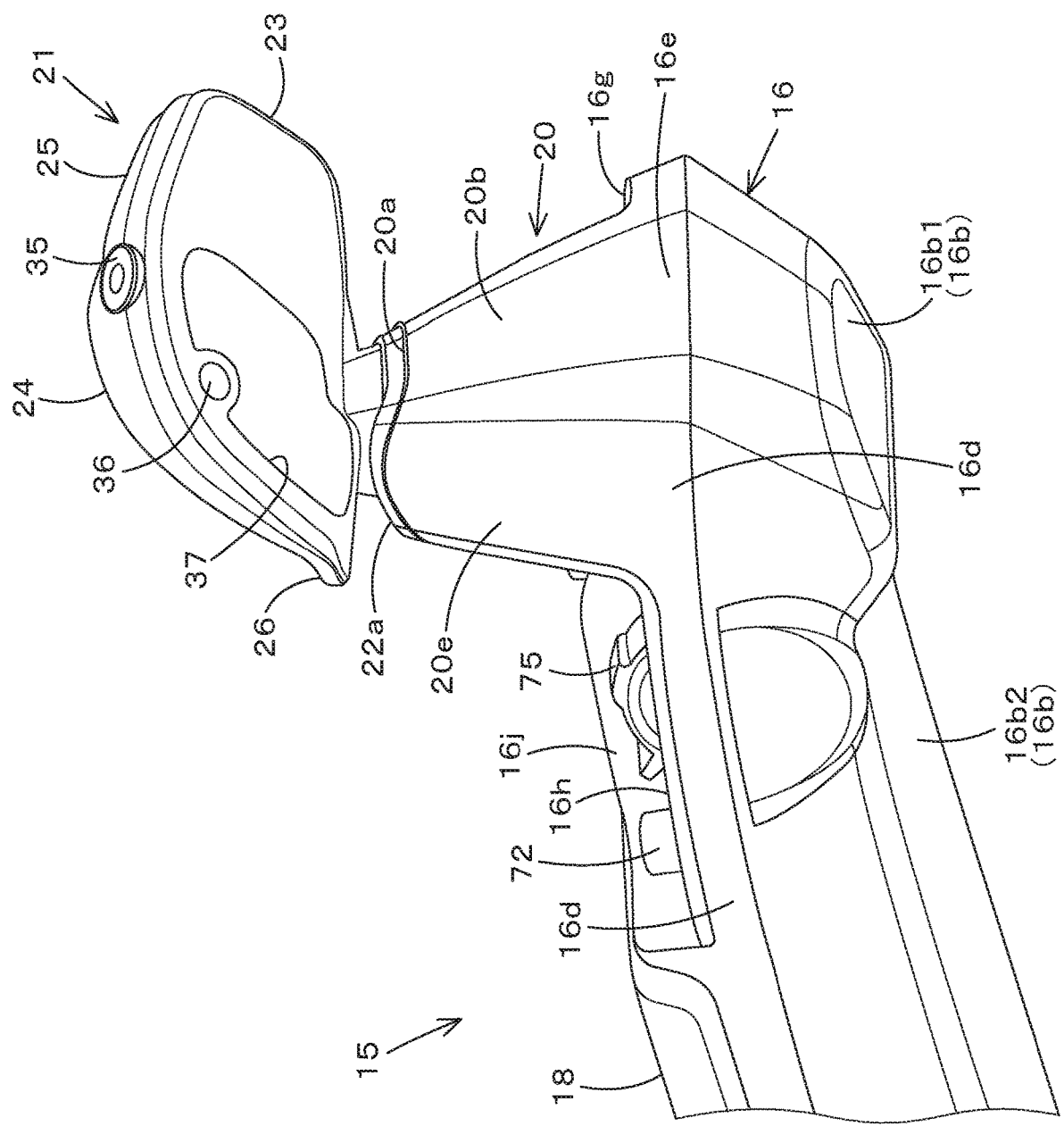
FIG. 21 is a perspective view of the front portion of the armrest seen upward from the right front side according to the first modification example.
Figure 22:
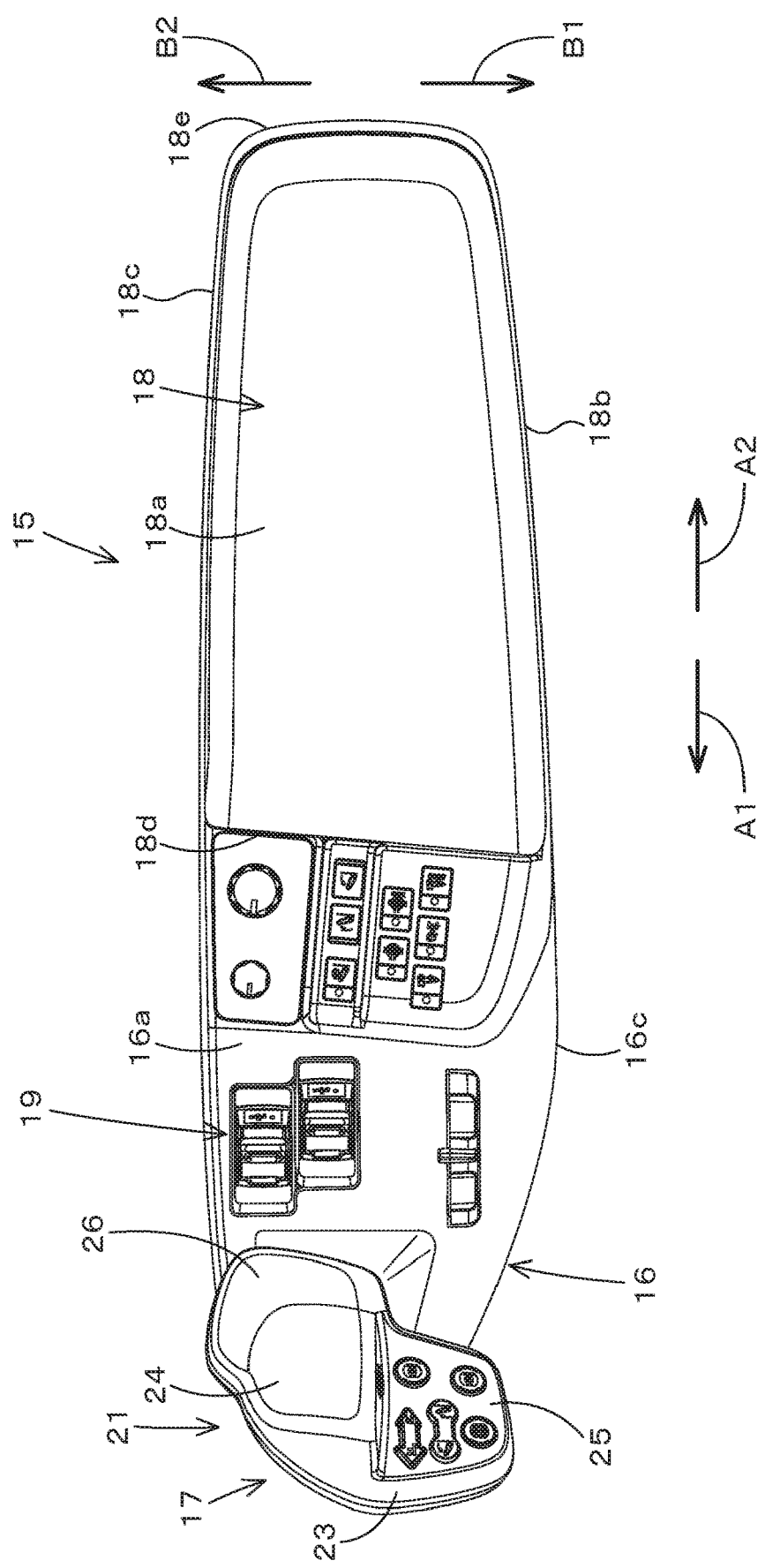
FIG. 22 is a plan view illustrating an armrest according to a second modification example of the embodiment.

FIG. 19 to FIG. 21 show the armrest 15 according to a first modification of the embodiment.

Hereinafter, the armrest 15 according to the first modification will be described with focusing on different configurations from the configurations of the armrest 15 according to the above-described embodiment, and the description of the similar configurations will be omitted.

The armrest 15 according to the first modification is different in the arrangement of the pedestal 20 and the operation lever 21 from those of the above embodiment. In particular, the pedestal 20 and the operation lever 21 are offset to the side (to the right side) opposite to the operator seat 10 side as compared with those of the above embodiment.

As shown in FIG. 19, the center of the pedestal 20 in the width direction (the center in the machine width direction) is offset to the right from the center of the main body 16 of the armrest 15 in the width direction. In this manner, as shown in FIG. 21, the lower end portion of the right surface 20e of the pedestal 20 is flat continuously with the upper end portion of the right side surface 16d of the main body 16.

In addition, the lower end portion of the front surface 20b of the pedestal 20 is flat with the lower end portion of the front surface 16e of the main body 16. In other words, the lower end portion of the right surface 20e of the pedestal 20 is smoothly continued to the upper end portion of the right side surface 16d of the main body 16 without a step. In addition, the lower end portion of the front surface 20b of the pedestal 20 is smoothly continued to the upper end portion of the front surface 16e of the main body 16 without a step.

The upper surface 20a of the pedestal 20 has a width (a length in the machine width direction) smaller than the length in the front-rear direction. The width (the length in the machine width direction) of the upper surface 20a of the pedestal 20 is narrower than the width of the extending portion 26, and is substantially the same as the width of the skirt 22a.

As shown in FIGS. 19 and 20, the pedestal 20 is arranged so as to be offset to the right side, so that an upper surface 16a of the main body 16 is provided with an area 16g on the left side of the pedestal 20 where no operation tool is arranged. The area 16g is located in front of a thirteenth front operation tool (a rear PTO clutch control switch) 73 that is an operation tool that is swung around the horizontal axis.

The area 16g extends from the front of the thirteenth front operation tool 73 to the front end portion of the main body 16. The front end portion of the area 16g is connected to the upper end portion of the front surface 16e of the main body 16. The left end portion of the area 16g is connected to the upper end portion of the left side surface 16c of the main body 16.

As shown in FIG. 19, the center of the operation lever 21 in the width direction (the center in the machine width direction) is offset to the right side from the center of the main body 16 of the armrest 15 in the width direction. In the machine width direction, the left end portion of the operation lever 21 (the left end portion of the grip 23) is positioned to the right from the left side surface 16c of the main body 16, and the right end portion of the operation lever 21 (the right end portion of the grip 23) is positioned to the right from the right side surface 16d of the main body 16.

As shown in FIG. 19 and FIG. 20, a first concave portion 76 is provided around the thirteenth front operation tool 73. A second concave portion 77 is provided around the fourteenth front operation tool (a front PTO clutch control switch) 74. The first concave portion 76 and the second concave portion 77 are recessed downward with respect to the upper surface 16a of the main body 16. The first concave portion 76 and the second concave portion 77 are formed in a rectangular shape that is long in the front-rear direction in plan view.

An intermediate wall 78M is provided between the first concave portion 76 and the second concave portion 77, and thereby partitions between the first concave portion 76 and the second concave portion 77. A left wall 78L is provided on the left side of the first concave portion 76. A right wall 78R is provided on the right side of the second concave portion 77. The intermediate wall 78M, the left wall 78L, and the right wall 78R extend in the front-rear direction in parallel with each other.

As shown in FIG. 20, the intermediate wall 78M, the left wall 78L, and the right wall 78R are curved in an arc shape so as to shift downward as it extends to the front. The front end portion of the intermediate wall 78M and the front end portion of the left wall 78L are connected to an area 16g where no operation tool is arranged.

The height of the upper end portion when the thirteenth front operation tool 73 and the fourteenth front operation tool 74 are in the standing state is set to be equal to or lower than the heights of the upper edge portions of the intermediate wall 78M, the left wall 78L, and the right wall 78R. Thus, the upper end portions of the thirteenth front operation tool 73 and the fourteenth front operation tool 74 do not protrude upward from the upper edge portions of the intermediate wall 78M, the left wall 78L, and the right wall 78R.

As shown in FIG. 19 to FIG. 21, the twelfth front operation tool (a plowing depth adjustment dial) 72 and the fifteenth front operation tool (an accelerator dial) 75 are arranged side by side in the front-rear direction. More in particular, the twelfth front operation tool 72 is arranged on an extension line extending the center line of the fifteenth front operation tool 75 rearward from in the vehicle width direction.

As shown in FIG. 20 and FIG. 21, in the area where the operation tools included in the front operation tool group 60 (the first operation tool group 60A and the second operation tool group 60B), the area 16h where the twelfth front operation tool 72 and the fifteenth front operation tool 75 are arranged is formed recessing downward with respect to the area 16i where the operation tools to be operated by being pressed (the traveling pressing operation tools 61 to 69, the working pressing operation tools 70 and 71).

Thus, among the operation tools included in the front operation tool group 60, the operation tools to be operated by being rotated (the twelfth front operation tool 72, the fifteenth front operation tool 75) are arranged on a position lower than the operation tool to be operated by being pressed (the traveling pressing operation tools 61 to 69 and the working pressing operation tools 70 and 71).

The area 16h in which the twelfth front operation tool 72 and the fifteenth front operation tool 75 are arranged is the same height as the area 16g in which no operation tool is arranged. The heights of the area 16h and the area 16g are lower than the height of the area 16i. The left front portion of the area 16h is connected to the right rear portion of the area 16g. The area 16h reaches the right end portion of the main body 16, and is connected to the upper end portion of the right side surface 18c of the main body 16.

As shown in FIG. 19 to FIG. 21, a standing wall 16j is formed on the boundary between the area 16h and the area 16i. The standing wall 16j stands from the upper surface of the area 16h toward the area 16i. The front portion of the standing wall 16j constitutes a right wall 78R on the right side of the second concave portion 77. The rear portion of the standing wall 16j extends being bent in a plan view so as to extend from the left side to the rear side of the twelfth front portion operation tool 72.

As shown in FIG. 21, the upper end portions of the twelfth front operation tool 72 and the fifteenth front operation tool 75 arranged in the area 16h are lower than the height of the standing wall 16j. Thus, the upper end portions of the twelfth front operation tool 72 and the upper end portion of the fifteenth front operation tool 75 do not protrude upward from the upper end portion of the standing wall 16j.

As shown in FIG. 19 and FIG. 20, a protruding portion 79 projecting from the upper surface of the area 16h is provided between the fifteenth front operation tool 75 and the standing wall 16j. The protruding portion 79 is formed in an arc shape in a side view and extends in the front-rear direction in parallel with the fifteenth front operation tool 75.

In the example shown in FIG. 20, in the eleventh front operation tool (the one-touch switch) 71, the plurality (two) of the pressing operation portions 71a and 71b are independent from each other without being integrated, and is arranged close to each other. The front end of the pressing operation portion 71a is positioned behind the front end portion of the pressing operation tools (the first front operation tool 61, the second front operation tool 62, and the third front operation tool 63) arranged side by side with the pressing operating portion 71a in the vehicle width direction.

The rear end portion of the pressing operation portion 71b is located in front of the rear end portion of the pressing operation tool (the fifth front operation tool 65, the seventh front operation tool 67, and the ninth front operation tool 69) aligned side by side with the pressing operating portion 71b in the vehicle width direction. The surface areas of the pressing operating portions 71a and 71b is smaller than the surface areas of the traveling pressing operation tools (the first front operation tool 61 to the ninth front operation tool 69).

Second Modification

FIG. 22 to FIG. 28 show the armrest 15 according to a second modification of the embodiment.

The configuration of the grip 23 of the operation lever 21 which is a characteristic portion of the present invention in the configurations of the armrest 15 according to the second modification will be described below.

Figure 23:
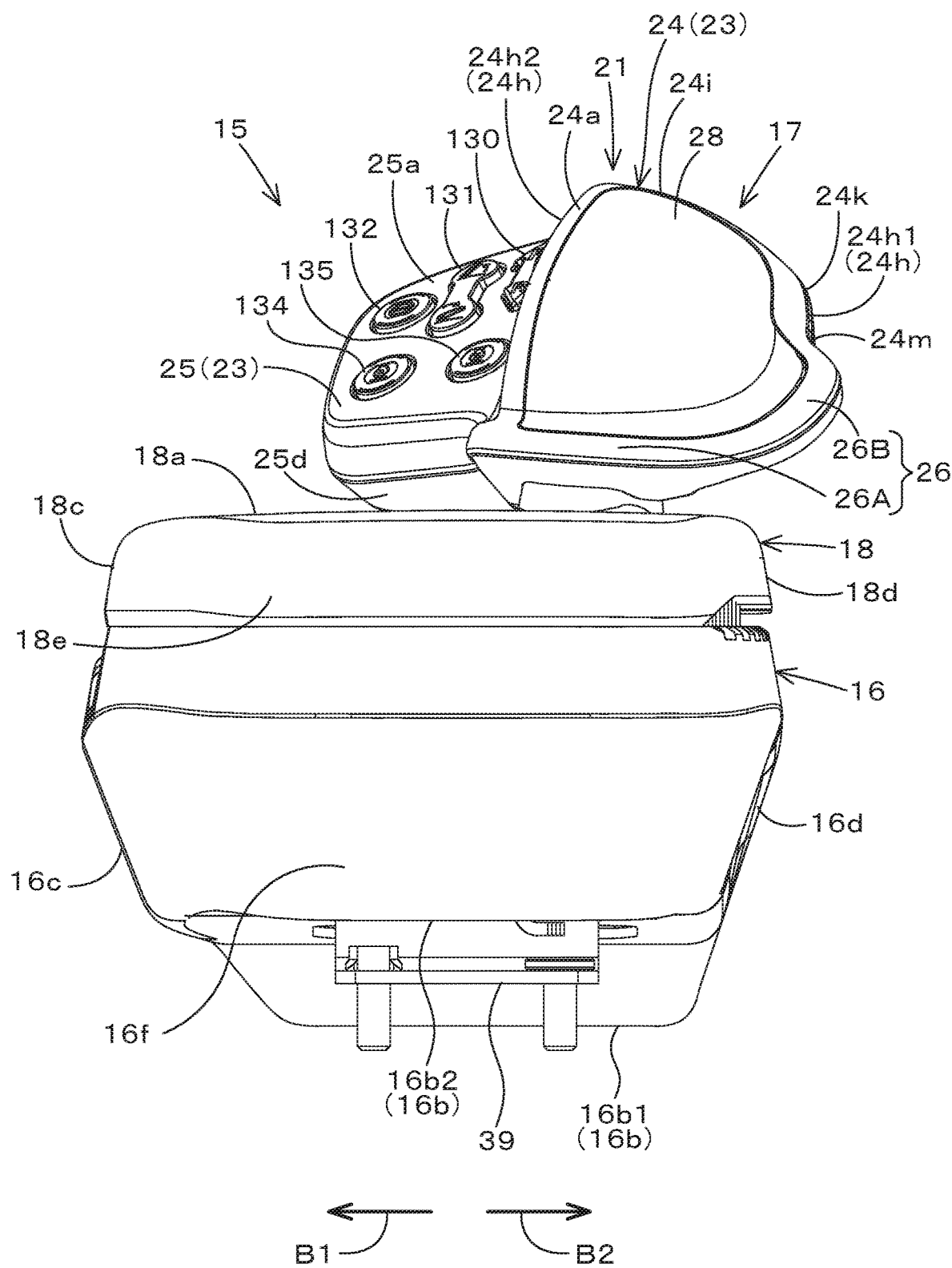
FIG. 23 is a back view of the armrest according to the second modification example.
Figure 25:
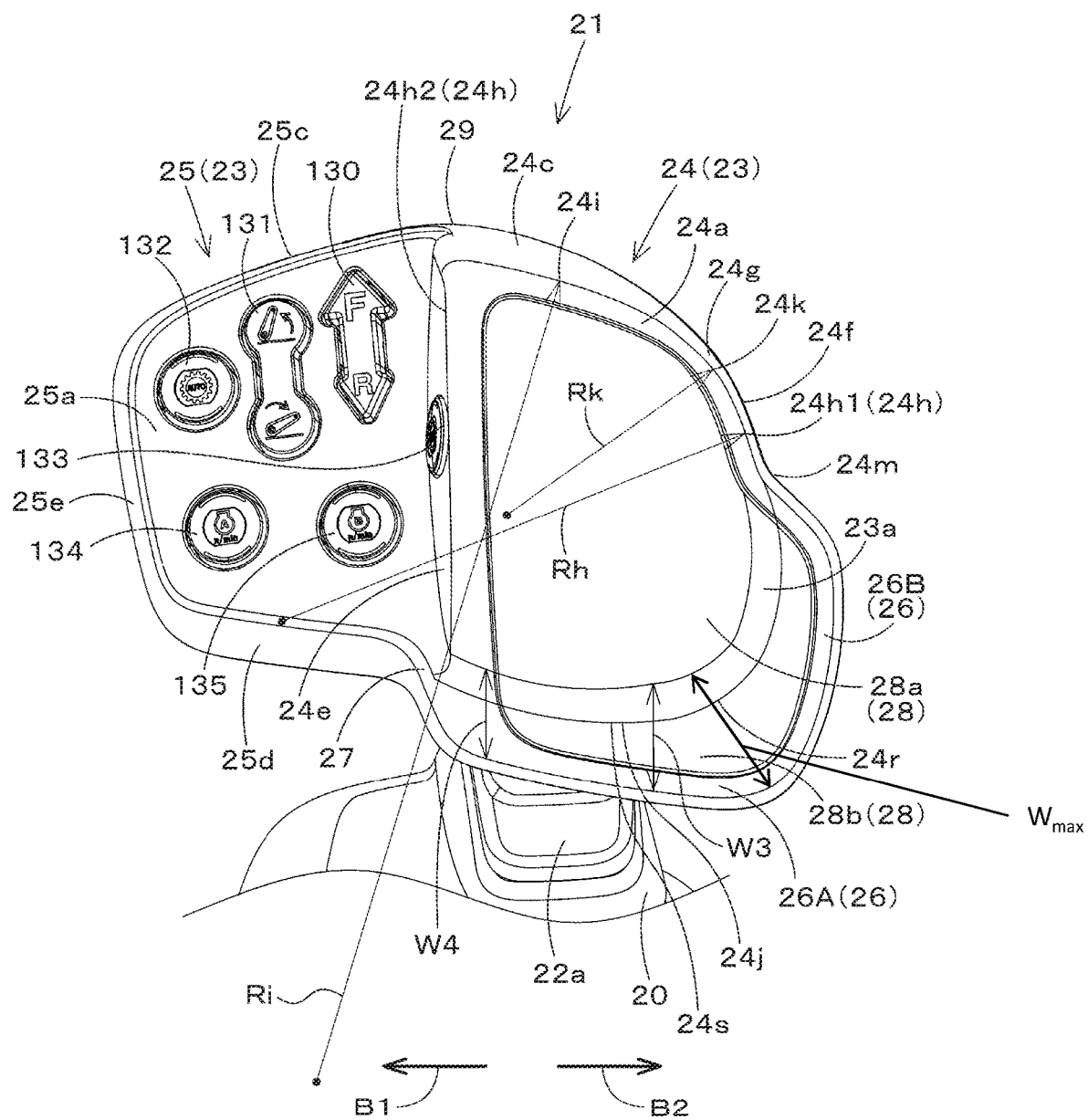
FIG. 25 is a perspective view of an area in the vicinity of a grip of the armrest seen downward from the back side according to the second modification example.
Figure 27:
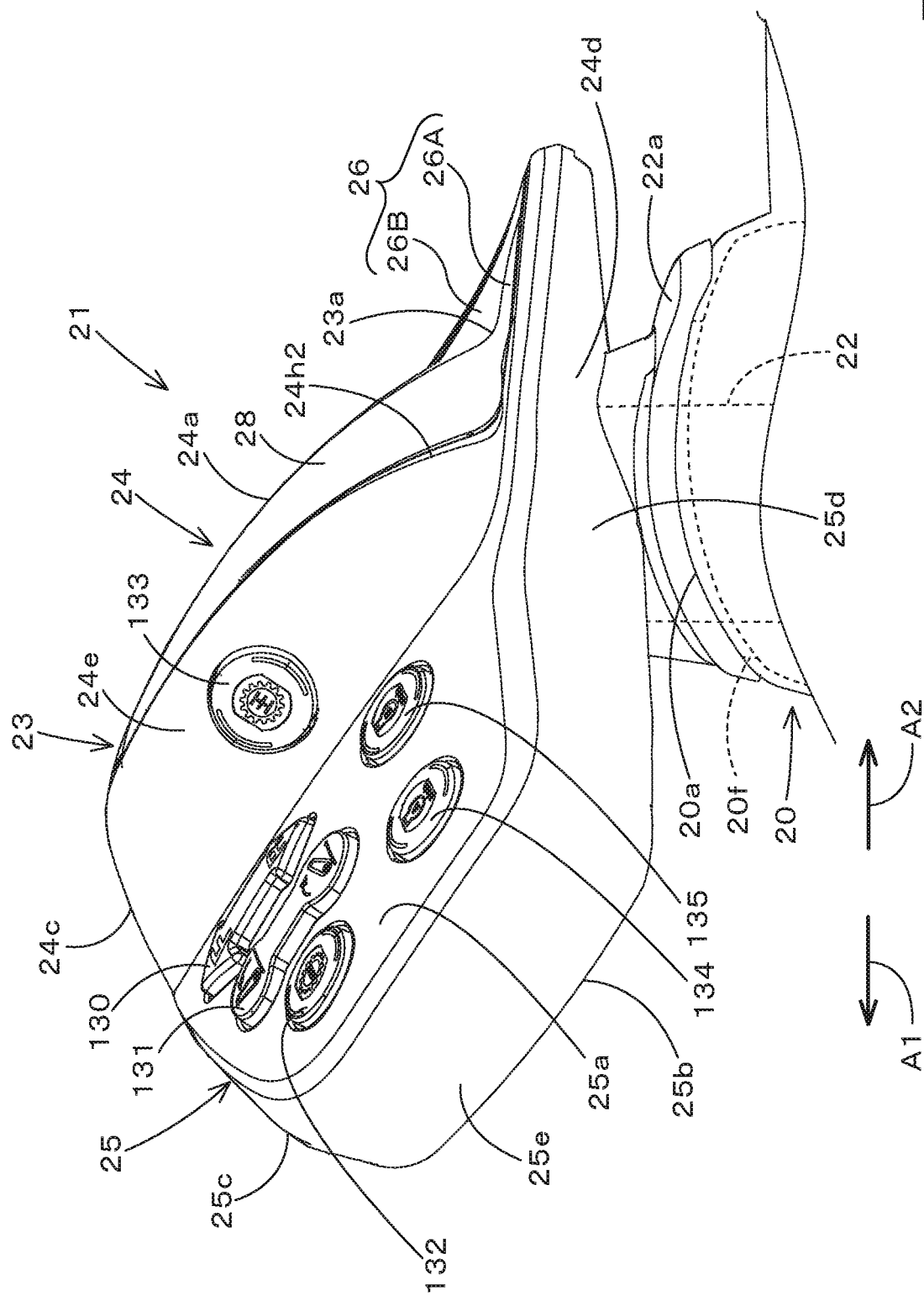
FIG. 27 is a side view of the area in the vicinity of the grip of the armrest seen from the operator seat side (from the left side) according to the second modification example.

As shown in FIG. 23, FIG. 25, and FIG. 27, and the like, the grip 23 includes the gripping portion 24, the operating portion 25, and the extending portion 26. The gripping portion 24 is a portion that an operator sitting on the operator seat 10 grips with one hand (the right hand). The operating portion 25 is a portion for the operator gripping the gripping portion 24 to perform the operation by stretching the thumb. The extending portion 26 is a portion on which the operator gripping the gripping portion 24 puts the little finger side (the hypothenar) of the palm. The extending portion 26 supports the palm that grips the gripping portion 24 so as to prevent the palm from slipping downward and laterally. The gripping portion 24, the operating portion 25, and the extending portion 26 are integrally formed.

First, the shape of the gripping portion 24 of the grip 23 will be described.

The gripping portion 24 is provided on one side (the right side) of the grip 23. In other words, the gripping portion 24 is provided on the side of the grip 23 opposite to the operator seat 10 side. As shown in FIG. 23 to FIG. 28, the gripping portion 24 has a front surface 24a, a back surface 24b, an upper surface 24c, a lower surface 24d, a left side surface 24e, a right side surface 24f, and a corner edge surface 24g.

Figure 26:
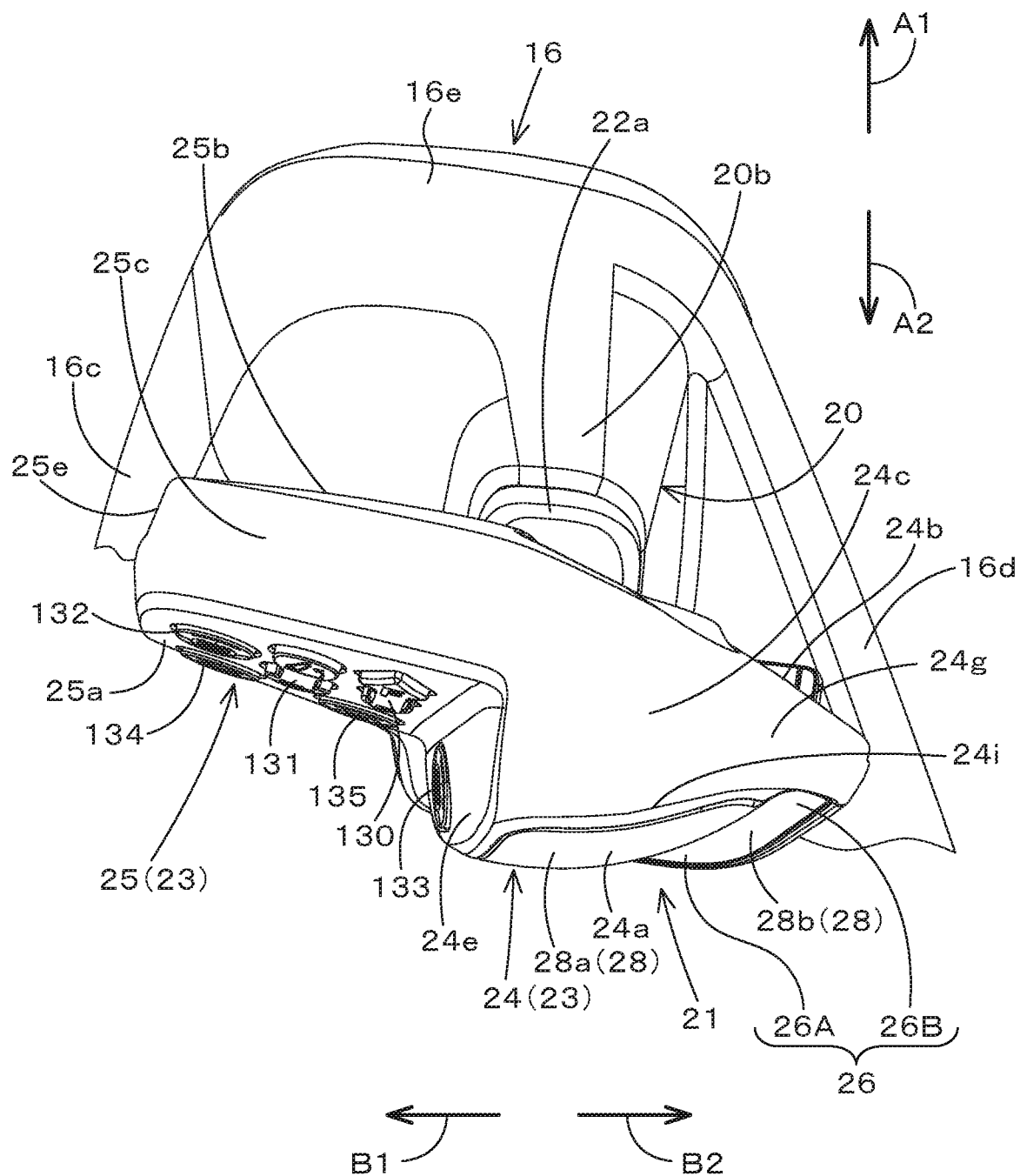
FIG. 26 is a view of the area in the vicinity of the grip of the armrest seen in a direction where a back surface of a gripping portion is arranged to be a substantially-vertical surface according to the second modification example.

The front surface 24a of the gripping portion 24 constitutes the right portion of the front surface of the grip 23 (the surface facing the operator seated on the operator seat 10). The front surface 24a is a portion that a palm hits when gripping the gripping portion 24. As shown in FIG. 26, the front surface 24a is a curved surface extending curvedly from the other side (the left side) toward the one side (the right side). Hereinafter, the front surface 24a of the gripping portion 24 is referred to as a "curved surface 24a".

Figure 28:
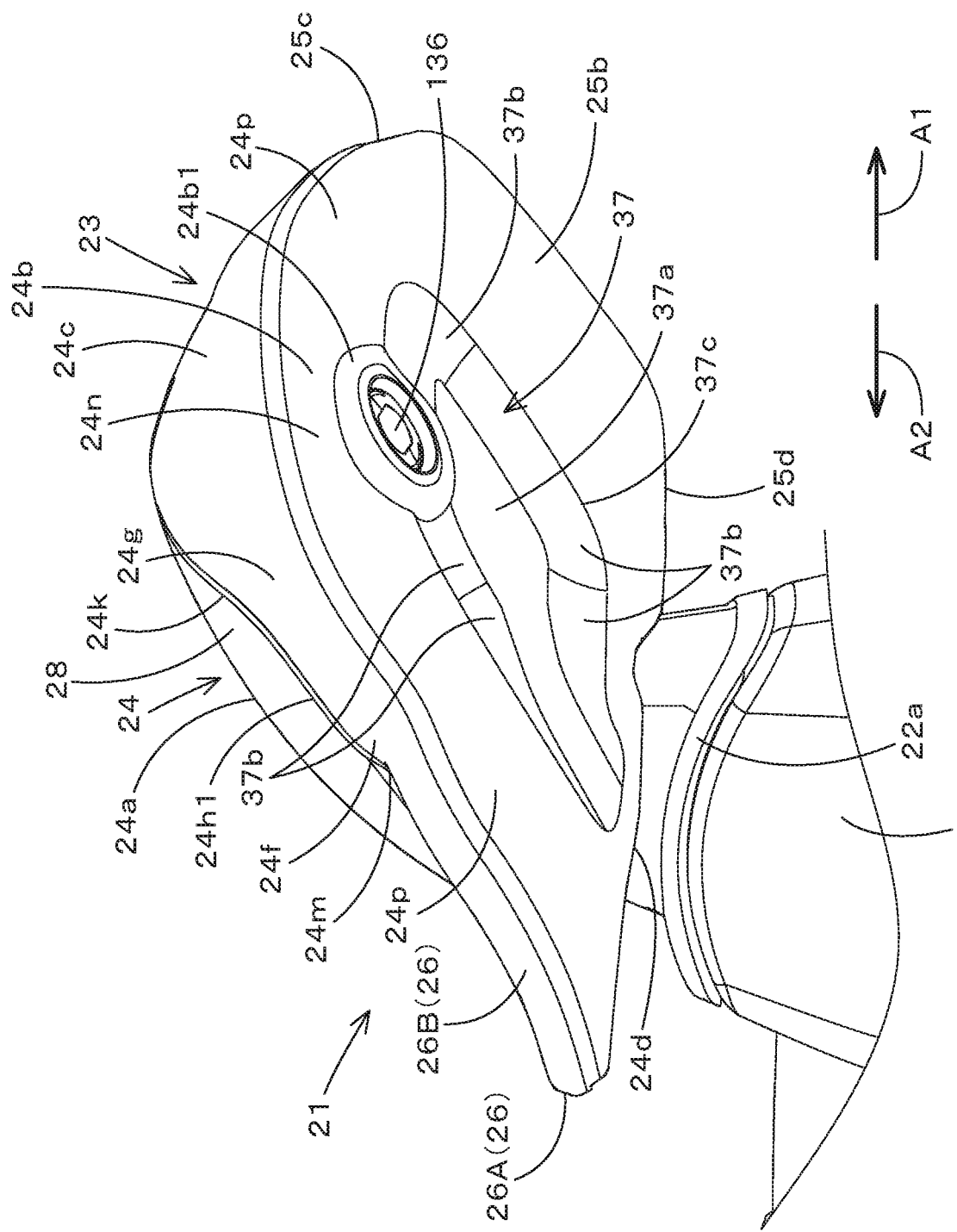
FIG. 28 is a side view of the area in the vicinity of the grip of the armrest seen from the side opposed to the operator seat side (from the right side) according to the second modification example.

As shown in FIG. 26, the curved surface 24a is curved in a convex shape so as to bulge rearward. The right portion of the curved surface 24a shifts from the rear to the front as it extends from the left side to the right side. As shown in FIG. 27 and FIG. 28, the curved surface 24a is curved while being inclined so as to shift from the lower side to the upper side as it extends from the rear side toward the front side.

As shown in FIG. 25 and the like, the curved surface 24a has a side edge portion 24h, an upper edge portion 24i, a lower edge portion 24j, a corner edge portion 24k, and a curved edge portion 24r. The outer edge portion of the curved surface 24a is constituted of the side edge portion 24h, the upper edge portion 24i, the lower edge portion 24j, the corner edge portion 24k, and the curved edge portion 24r.

The side edge portion 24h includes the first side edge portion 24h1 and the second side edge portion 24h2. The first side edge portion 24h1 constitutes an edge portion on one side (the right side) of the curved surface 24a. The second side edge portion 24h2 constitutes an edge portion on the other side (the left side) of the curved surface 24a. The upper edge portion 24i constitutes an upper edge of the curved surface 24a. The lower edge portion 24j constitutes the lower edge portion of the curved surface 24a.

The corner edge portion 24k connects between the side edge portion (the first side edge portion) 24h1 and the upper edge portion 24i, and constitutes the edge portion of the upper corner of one side (the right side) of the curved surface 24a. The curved edge portion 24r connects between the side edge portion (the first side edge portion) 24h1 and the lower edge portion 24j, and constitutes the edge portion of the lower corner on one side (the right side) of the curved surface 24a.

The first side edge portion 24h1, the second side edge portion 24h2, the upper edge portion 24i, the lower edge portion 24j, the corner edge portion 24k, and the curved edge portion 24r are curved.

The first side edge portion 24h1 extends downward from above. As shown in FIG. 25 and the like, the first side edge portion 24h1 is curved convexly so that the first side edge portion 24h1 slightly bulges to one side (the right side) in the middle portion which extends downward from above.

In addition, the first side edge portion 24h1 shifts from the other side (the left side) to one side (the right side) as it extends downward from above. As shown in FIG. 28 and the like, the first side edge portion 24h1 shifts from the front side to the rear side as it extends downward from above.

The second side edge portion 24h2 extends downward from above. As shown in FIG. 25 and the like, the second side edge portion 24h2 shifts from one side (the right side) to the other side (the left side) as it extends downward from above. The distance between the first side edge portion 24h1 and the second side edge portion 24h2 gradually increases from the upper side to the lower side.

As shown in FIG. 27 and the like, the second side edge portion 24h2 shifts from the front to the rear as it extends from the top to the bottom. The second side edge portion 24h2 is curved in a convex shape so as to bulge upward and rearward at a middle portion extending downward from above. The curving is increasingly steeple as it extends from the top to the bottom.

As shown in FIG. 25 and the like, the upper edge portion 24i extends from the other side (the left side) toward one side (the right side), and is curved so as to incline shifting downward from above as it extends from the other side to one side. As shown in FIG. 26 and the like, the upper edge portion 24i is curved in a convex shape so as to bulge rearward at a middle portion extending from one side (the right side) to the other side (the left side).

As shown in FIG. 25 and the like, the lower edge portion 24j extends from the other side (the left side) toward one side (the right side). The lower edge portion 24j is curved in a convex shape so as to bulge rearward at a middle portion extending from the other side toward one side.

As shown in FIG. 25 and the like, the corner edge portion 24k is curved so as to connect between the first side edge portion 24h1 and the upper edge portion 24i with a smooth curve. The corner edge portion 24k is curved with a smaller radius of curvature (Rk) than the radius of curvature (Rh) of the first side edge portion 24h1 and the radius of curvature (Ri) of the upper edge portion 24i. In other words, the corner edge portion 24k is steeply curved as compared with the first side edge portion 24h1 and the upper edge portion 24i.

As shown in FIG. 25 and the like, the curved edge portion 24r connects between the right end of the lower edge portion 24j and the lower edge of the first side edge portion 24h1. The curved edge portion 24r is formed in an arc shape that bulges toward the lower right (the right rear).

As shown in FIGS. 25 to 26, the left side surface 24e of the gripping portion 24 stands from the operating portion 25 toward the curved surface 24a of the gripping portion 24. Hereinafter, the left side surface 24e of the gripping portion 24 is referred to as a "standing surface 24e". The standing surface 24e is a portion that can be touched with the thumb when the palm 24 is applied to the curved surface 24a to grip the gripping portion 24. The standing surface 24e connects between the operating portion 25 and the second side edge portion 24h2 of the curved surface 24a.

As shown in FIG. 26, the standing surface 24e is slightly inclined so as to be directed from the other side (the left side)

to one side (the right side) as it gradually stands from the operating portion 25 toward the curved surface 24a. The lower edge portion of the standing surface 24e is connected to the front surface 25a of the operating portion 25. The upper edge portion of the standing surface 24e is connected to the upper surface 24c of the gripping portion 24. The right edge portion of the standing surface 24e is connected to the second side edge portion 24h2 of the curved surface 24a.

The upper surface 24c of the gripping portion 24 constitutes the right portion of the upper surface of the grip 23. As shown in FIG. 25 and the like, the upper surface 24c of the gripping portion 24 is inclined downward from above as it extends from the other side (the left side) to one side (the right side). In addition, the upper surface 24c is curved along the curvature of the upper edge portion 24i of the curved surface 24a.

As shown in FIG. 27 and FIG. 28, the upper surface 24c is shifted from the lower side to the upper side as it extends from the front to the rear, and is curved in a convex shape so as to bulge upward and forward in the middle portion extending from the upper side to the lower side. The front edge portion of the upper surface 24c is connected to the upper edge portion 24i of the curved surface 24a. The rear edge portion of the upper surface 24c is connected to the rear surface 24b. The left edge portion of the upper surface 24c is connected to the upper edge portion of the standing surface 24e. The left edge portion of the upper surface 24c is also connected to the upper surface 25c of the operating portion 25.

The right side surface 24f of the gripping portion 24 constitutes the upper portion of the right side surface of the grip 23. As shown in FIG. 25 and the like, the right side surface 24f of the gripping portion 24 is curved along the curvature of the first side edge portion 24h1 of the curved surface 24a.

In particular, the right side surface 24f extends from the upper side to the lower side, and shifts to one side (the right side) as it extends from the upper side to the lower side. The distance between the standing surface 24e and the right side surface 24f gradually increases from the top to the bottom. A lower portion of the right side surface 24f is connected to an upper portion of a side surface of a side portion 26B of an extending portion 26 described later.

As shown in FIG. 25 and the like, the corner edge surface 24g of the gripping portion 24 connects between the upper surface 24c and the right side surface 24f. The corner edge surface 24g is curved along the curvature of the corner edge portion 24k of the curved surface 24a. The corner edge surface 24g is curved so as to connect between the upper surface 24c and the right side surface 24f with a smooth curved surface. The corner edge surface 24g is curved with a smaller radius of curvature in compared with those of the upper surface 24c and the right side surface 24f. In other words, the upper surface 24c and the right side surface 24f are gently curved, whereas the corner edge surface 24g is sharply curved.

The back surface 24b of the gripping portion 24 constitutes the right portion of the back surface of the grip 23. The back surface 24b is a portion that the fingertips other than the thumb hit when the gripping portion 24 is gripped with a palm applied on the curved surface 24a. As shown in FIG. 28, the back surface 24b of the gripping portion 24 is inclined shifting from the lower side to the upper side as it extends from the rear side toward the front side.

In addition, as shown in FIG. 26, the back surface 24b is inclined shifting from the front side to the rear side as it extends from one side (the left side) to the other side (the right side). The upper edge portion of the back surface 24b is connected to the upper surface 24c. The lower edge portion of the back surface 24b is connected to the lower surface 24d. The left edge portion of the back surface 24b is connected to the back surface 25b of the operating portion 25. The right edge portion of the back surface 24b is connected to the right side surface 24f and the side portion 26B of the extending portion 26. The corner edge portion of the back surface 24b is connected to the corner edge surface 24g. As shown in FIG. 28, the back surface 24b is provided with a guide concave portion 37 and an operation switch 136, which will be described later.

The lower surface 24d of the gripping portion 24 constitutes the right portion of the lower surface of the grip 23. As shown in FIG. 27 and FIG. 28, the upper edge portion of the swing body 22 is connected to the lower surface 24d of the gripping portion 24. The front edge portion of the lower surface 24d is connected to the back surface 24b. The rear edge portion of the lower surface 24d is connected to the lower surface of the extending portion 26. The left edge portion of the lower surface 24d is connected to the lower surface 25d of the operating portion 25. The right edge portion of the lower surface 24d is connected to the side surface of the extending portion 26.

Next, the shape of the operating portion 25 of the grip 23 will be described.

The operating portion 25 is provided on the other side (the left side) of the grip 23. In other words, the operating portion 25 is provided on the operator seat 10 side of the grip 23.

As shown in FIG. 23 to FIG. 28, the operating portion 25 has the front surface 25a, the back surface 25b, the upper surface 25c, the lower surface 25d, and the left side surface 25e. Hereinafter, in order to clarify the distinction from the front surface 24a and the like of the gripping portion 24, the front surface 25a of the operating portion 25 is referred to as a "second surface 25a", the back surface 25b is referred to as a "second back surface 25b", the upper surface 25c is referred to as a "second top surface 25c", the lower surface 25d is referred to as a "second lower surface 25d", and the left side surface 25e is referred to as a "second left side surface 25e".

The second surface 25a constitutes the left portion of the front surface of the grip 23. The second surface 25a is a portion that the thumb can touch by being stretched when the palm is applied to the curved surface 24a to grip the gripping portion 24. As shown in FIG. 27 and the like, the second surface 25a is inclined shifting from the lower side to the upper side as it extends from the rear to the front.

As shown in FIG. 23, FIG. 26, FIG. 27, and the like, the second surface 25a is inclined shifting from the front to the rear as it extends from the other side (the left side) to one side (the right side). As shown in FIG. 26 and the like, the second surface 25a is located ahead of the curved surface 24a that is the front surface of the gripping portion 24. The second surface 25a is provided with a plurality of operation switches 130, 131, 132, 134, and 135, which will be described later.

The second upper surface 25c constitutes the left portion of the upper surface of the grip 23. As shown in FIG. 25 and the like, the second upper surface 25c is inclined shifting from the lower side to the upper side as is extends from the other side (the left side) to one side (the right side). The upper surface 24c of the gripping portion 24 and the upper surface (the second upper surface) 25c of the operating portion 25 are connected in a mountain shape with the vertex 29 formed in the vicinity of the boundary between the gripping portion 24 and the operating portion 25.

The second lower surface 25d constitutes the left portion of the lower surface of the grip 23. As shown in FIG. 25 and the like, the second lower surface 25d is inclined shifting from the upper side to the lower side as it extends from the other side (the left side) to one side (the right side). The distance between the second upper surface 25c and the second lower surface 25d gradually increases from the other side toward one side. The second lower surface 25d is connected to the lower surface 24d of the gripping portion 24 and the lower surface of the extending portion 26 (the rear portion 26A).

The second left side surface 25e constitutes the left side surface of the grip 23. The upper portion of the second left side surface 25e is connected to the left portion of the second upper surface 25c. The lower portion of the second left side surface 25e is connected to the left portion of the second lower surface 25d. The boundary between the second left side 25e and the second upper surface 25c and the boundary between the second left side 25e and the second lower surface 25d are each curved.

The second back surface 25b constitutes the left portion of the back surface of the grip 23. As shown in FIG. 26 and FIG. 28, the second back surface 25b is a substantially flat surface that curves very gently. The upper edge portion of the second back surface 25b is connected to the second upper surface 25c. The lower edge portion of the second back surface 25b is connected to the second lower surface 25d. The left edge portion of the second back surface 25b is connected to the second left side surface 25e. The right edge portion of the second back surface 25b is connected to the back surface 24b of the gripping portion 24.

As shown in FIG. 23, FIG. 25 to FIG. 28, and the like, the extending portion 26 extends from the lower portion and the right portion of the gripping portion 24, and extends rearward (downward to the rear) and rightward. As shown in FIG. 25, a belt-like transition area 23a is formed in a portion that shifts from the gripping portion 24 to the extending portion 26. As shown in FIG. 27, the transition area 23a is curved in an arc shape in a side view.

As shown in FIG. 25 and the like, the extending portion 26 has a rear portion 26A and a side portion 26B.

The rear portion 26A extends rearward from the lower portion of the gripping portion 24 (the lower edge portion 24j of the curved surface 24a). The rear portion 26A extends from the other side (the left side) to one side (the right side), and shifts rearward as it extends from the other side toward the one side. The portion (the left portion) on the other side of the rear portion 26A extends to the other side (left) from the curved surface 24a and the standing surface 24e, and is connected to the surface (the second portion) of the operating portion 25 through the communication surface 27.

As shown in FIG. 25, the extending portion 26 (the rear portion 26A) extending from the lower portion of the gripping portion 24 has an extension width W3' on one side (the right side) wider than the extension width W4' on the other side (the left side) (W3'>W4').

As shown in FIG. 25, the side portion 26B extends from the edge portion (the first side edge portion 24h1) on one side (the right side) of the gripping portion 24 to one side (the right side). The rear portion 26A and the side portion 26B are continuously provided from the lower portion of the gripping portion 24 to one side (the right side). The width of the extending portion 26 is the widest ($W_{max}$) at the lower portion (the lower right portion) on one side of the gripping portion 24.

In other words, the width of the extending portion 26 is the widest ($W_{max}$) at the boundary between the rear portion 26A and the side portion 26B. The side portion 26B is provided in an area from the lower end portion to the middle portion in the vertical direction on one side (on the right side) of the gripping portion 24. That is, the side portion 26B is not provided on the upper portion on one side (on the right side) of the gripping portion 24.

As shown in FIG. 25, a side surface of upper portion of the side portion 26B is connected to the right side surface 24f of the gripping portion 24. A bent portion 24m bending in a substantially V-shape (a valley shape) is formed at a portion shifting from the right side surface 24f of the gripping portion 24 to the side portion 26B of the extending portion 26. The bent portion 24m is recessed in an obtuse V-shape. The position of the hand can be determined by applying a finger to the bent portion 24m when the gripping portion 24 is gripped.

In this manner, it becomes difficult for the hand gripping the gripping portion 24 to slip off. In addition, since the position of hand gripping the gripping portion 24 is stabilized, the operation switches 130 to 135 provided on the operating portion 25 and the standing surface 24e can be easily operated with the thumb stretched.

As shown in FIG. 23 and FIG. 25 to FIG. 28, the grip 23 has an anti-slip portion 28.

The anti-slip portion 28 is made of a material having an anti-slip function such as rubber. The friction coefficient of the surface of the anti-slip portion 28 is larger than the friction coefficient of the surface of the gripping portion 24 (the surface of the portion P1 where the anti-slip portion 28 is not provided). The anti-slip portion 28 is, for example, attached to the surface of the gripping portion 24 with an anti-slip member such as a rubber plate. The anti-slip portion 28 is constituted by a method for embedding the anti-slip member into the surface of the gripping portion 24.

By providing the anti-slip portion 28, the hand is prevented from slipping under the state where the gripping portion 24 is gripped to operate the operation lever 21. In this manner, the operation lever 21 can be reliably operated, and it is not necessary to grip the gripping portion 24 strongly, thereby preventing fatigue in the hand.

The anti-slip portion 28 is provided across (stranding) from the gripping portion 24 to the surface of the extending portion 26. In particular, the anti-slip portion 28 is provided from the curved surface 24a of the gripping portion 24 to the surface of the extending portion 26 (the rear portion 26A and the side portion 26B).

Hereinafter, of the anti-slip portion 28, a portion provided on the curved surface 24a of the gripping portion 24 is referred to as a "anti-slip portion 28a", and a portion provided on the surface of the extending portion 26 is referred to as a "anti-slip portion 28b".

The anti-slip portion 28a is provided over most of the surface of the curved surface 24a of the gripping portion 24. In particular, the upper edge portion of the anti-slip portion 28a is located in the vicinity of the upper edge portion 24i of the curved surface 24a. The upper right edge portion of the anti-slip portion 28a is located in the vicinity of the corner edge portion 24k and the first side edge portion 24h1 of the curved surface 24a. The left edge portion of the anti-slip portion 28a is located in the vicinity of the second side edge portion 24h2 of the curved surface 24a. The lower right edge portion and the lower edge portion of the anti-slip portion 28a extend beyond the lower edge portion 24j and the curved edge portion 24r of the curved surface 24a.

In this manner, most of the palm that grips the gripping portion 24 comes into contact with the anti-slip portion 28a, so that it is possible to effectively prevent the palm from slipping to operate incorrectly during the operation of the operation switch or the like.

The anti-slip portion 28*b* is provided in the rear portion 26A and the side portion 26B of the extending portion 26. The anti-slip portion 28*b* extends to the surfaces of the rear portion 26A and the side portion 26B beyond the lower edge portion 24*j* of the curved surface 24*a*, the first side edge portion 24*h*1, and the curved edge portion 24*r*. The anti-slip portion 28*b* is provided over most of the area of the extending portion 26.

In particular, the anti-slip portion 28*b* extends to the vicinity of the rear edge portion of the rear portion 26A of the extending portion 26 and the side edge portion of the side portion 26B. In this manner, the anti-slip portion 28*a* can surely provide the function for supporting a palm so that the palm gripping the gripping portion 24 is prevented from slipping off downward and a side, that is, the function provided by the extending portion 26.

Next, the operation switches provided on the grip 23 will be described.

The grip 23 is provided with a plurality of operation switches. The plurality of operation switches are respectively arranged in the gripping portion 24 and the operating portion 25.

As shown in FIG. 23 and FIG. 25 to FIG. 27, the operating portion 25 is provided with a plurality of operation switches 130, 131, 132, 134, and 135. The plurality of operation switches 130, 131, 132, 134, and 135 are provided on the surface (the second surface) 25*a* of the operating portion 25. In particular, the operation switches 130, 131, and 132 are provided on the top portion of the surface (the second surface) 25*a* of the operating portion 25. The operation switches 134 and 135 are provided below the second surface 25*a*.

The plurality of operation switches 130, 131, 132, 134, and 135 are arranged in an area where an operator gripping the gripping portion 24 with the right to operate with the thumb stretched. The operation switches 130 and 131 are seesaw switches. The operation switches 132, 134, and 135 are constituted of push button switches.

In particular, the operation switch 130 is a shuttle switch (a changeover switch for a forward traveling/backward traveling of the traveling vehicle 1) for operating the transmission device. By pressing the upper portion (the "F" portion) of the operation switch 130, the operation switch 130 is switched to the forward traveling, and by pressing the lower portion (the "R" portion) of the operation switch 130, the operation switch 130 is switched to the backward traveling.

The operation switch 131 is a one-touch switch that drives the lifting device 4 to lift the working device. The pressing of the upper portion of the operation switch 131 lifts the working device, and the pressing of the lower portion of the operation switch 131 lowers the working device.

The operation switch 32 is a switch for switching between an automatic mode and a manual mode of the automatic shifting. By pressing the operation switch 32, the switching between the automatic transmission mode and the manual transmission mode are performed. In the automatic transmission mode, the optimum vehicle speed step is automatically selected under the electronic control within the range of the vehicle speed step set in advance by the operator. In the manual shift mode, the operator can manually change the vehicle speed step.

The operation switches 134 and 135 are engine revolving speed memory switches, and set the revolving speed of the engine 8 to the engine revolving speed preliminarily stored in the storage portion of the control device. When the operation switch 134 is pressed, the operation switch 134 is capable of setting the revolving speed of the engine 8 to a first revolving speed set in advance. By pressing the operation switch 135, the operation switch 135 is capable of setting the revolving speed of the engine 8 to a second rotation speed different from the first rotation speed set in advance.

As shown in FIG. 25 to FIG. 27, another operation switch 133 different from the operation switches 130, 131, 132, 134, and 135 provided on the operating portion 25 is arranged on the standing surface 24*e* of the gripping portion 24. The other operation switch 133 arranged on the standing surface 24*e* is a push button switch.

The operation switch 133 is a switch for switching between permission and inhibition of the swinging of swinging body 22, and in particular, is a sub-shifting check switch. By pushing the operation switch 133, the swing body 22 can be swung. When the swing body 22 is swung forward while pressing the operation switch 133, the sub-shifting step is shifted up, and when swung backward, the sub-shifting step is shifted down. In other words, the operation switch 133 is a switch for switching between permission and inhibition of the shifting operation with the swing body 22 swung.

As shown in FIG. 25 and the like, the anti-slip portion 28 is provided over the area which is overlapped with at least the operation switches 130, 131, 132, 133, 134, and 135 in the vertical direction. In this manner, when the operation switches 130 to 135 are operated with the thumb gripping the gripping portion 24 while applying the palm of the right hand to the gripping portion 24, the slipping of the palm is suppressed. In this manner, the operation switches 130 to 135 can be operated surely.

Figure 24:
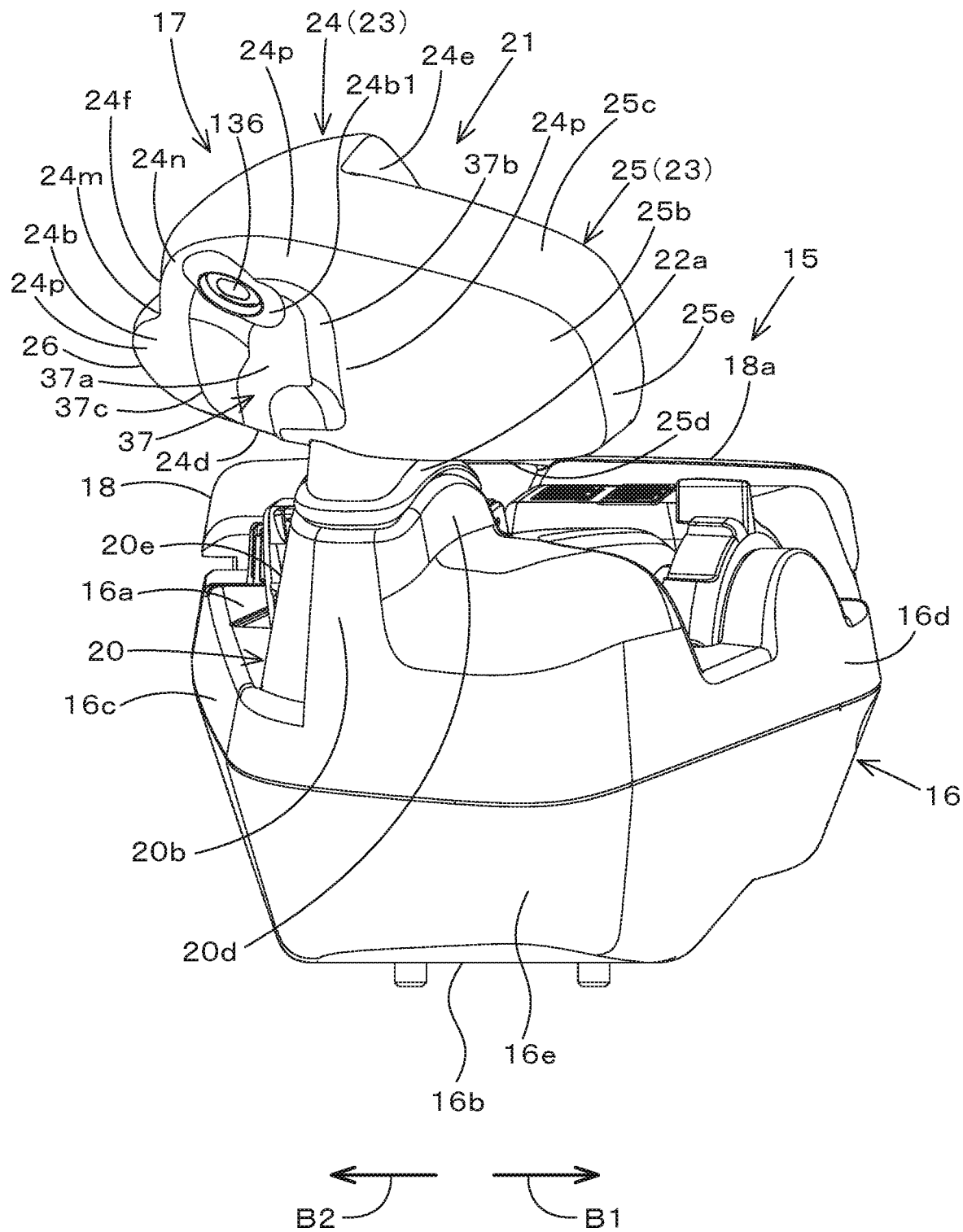
FIG. 24 is a front view of the armrest according to the second modification example.

As shown in FIG. 24 and FIG. 28, another operation switch 136 different from the operation switches 130, 131, 132, 134, and 135 provided on the operating portion 25 is also arranged on the back surface 24*b* of the gripping portion 24. The operation switch 136 provided on the back surface 24*b* of the gripping portion 24 is constituted of a push button switch.

The operation switch 136 is a shuttle check switch for switching between permission and inhibition of the operation of the operation switch 130 constituted of a shuttle switch. By operating the operation switch (the shuttle switch) 130 while pressing the operation switch (the shuttle check switch) 136, the switching between the forward traveling and the backward traveling is possible.

The operation switch 136 is arranged on the upper corner portion 24*n* on the side opposite to the operator seat 10 side (the right side) on the back surface 24*b* of the gripping portion 24. The upper corner portion 24*n* is located on the back side of the corner edge portion 24*k* of the curved surface 24*a* of the gripping portion 24, and is connected to the corner edge surface 24*g*.

As shown in FIG. 24 and FIG. 26, the operation switch 136 does not protrude from the back surface 24*b*. In this manner, it is possible to prevent the operation switch 136 from being unintentionally pushed when gripping the gripping portion 24 to operate the operation lever 21. In addition, it is possible to prevent the operation switch 136 from impairing the operational feeling when gripping the gripping portion 24 to operate the operation lever 21.

As shown in FIG. 24 and FIG. 28, a bulging portion 24*b*1 having an annular shape is formed on the back surface 24*b* around the operation switch 136. The surface of the operation switch 136 is arranged so as to be recessed with respect to the inner peripheral edge of the bulging portion 24b1. The bulging portion 24b1 is raised so as to gradually rise from the outer peripheral side toward the inner peripheral side (the operation switch 136 side). In this manner, the finger is naturally guided to the operation switch 136 when the finger is slid along the bulging of the bulging portion 24b1.

As shown in FIG. 24 and FIG. 28, a guide concave portion 37 that guides a finger toward the operation switch 136 is provided on the back surface 24b of the gripping portion 24. The operation switch 136 is operated by the index finger of the right hand under the state where the gripping portion 24 is gripped by the right hand. The guide concave portion 37 guides, toward the operation switch 136, the index finger of the right hand that grips the gripping portion 24.

The guide concave portion 37 is formed to be recessed from the back surface 24b of the gripping portion 24. The guide concave portion 37 has a deepest portion 37a that is most deeply recessed from the back surface 24b, and has an inclined portion 37b that is formed around the deepest portion 37a. The inclined portion 37b is inclined so as to gradually become deeper as it approaches the deepest portion 37a.

The inclined portion 37b is connected to the outer peripheral edge of the bulging portion 24b1 at the upper right portion. In this manner, by moving the finger along the inclined portion 37b, the finger is guided to the outer peripheral edge of the bulging portion 24b1, and is guided toward the operation switch 136 by the bulging portion 24b1.

The guide concave portion 37 extends in an elongated manner from the upper side (from the front) to the lower side (to the rear) on the back surface 24b of the gripping portion 24. The outer edge portion 37c of the guide recessed portion 37 forms a closed area on the back surface 24b of the gripping portion 24. Of the outer edge portion 37c of the guide concave portion 37, the lower edge portion reaches the lower edge portion of the back surface 24b, and extends to the back surface of the rear portion 26A of the extending portion 26.

Of the outer edge portion 37c of the guide concave portion 37, the upper edge portion, the left edge portion, and the right edge portion are positioned on an inner side from the upper edge portion, the left edge portion, and the right edge portion of the back surface 24b, respectively. In this manner, a non-recessed area 24p is formed on the back surface 24b of the gripping portion 24 outside the closed area formed by the outer edge portion 37c of the guide concave portion 37. The non-recessed area 24p is located around (outside) the outer edge portion 37c of the guide concave portion 37.

Effects

The working vehicle described above has the following effects.

The operation lever 21 for the working vehicle 1 is the operation lever 21 provided on one side of the operator seat 10 of the working vehicle 1, and includes the swing body 22 configured to be swingable and includes the grip 23 provided on an upper portion of the swing body 22. The grip 23 includes the gripping portion 24 arranged on the one side, the operating portion 25 arranged on the other side opposite to the one side and provided with the operation switches 30, 31, and 32 (or 130, 131, 132, 134, and 135), the extending portion 26 extending backward from the lower portion of the gripping portion 24, and the anti-slip portion 28 provided extending from the surface of the gripping portion 24 to the surface of the extending portion 26.

According to the above configuration, since the grip 23 is provided with the anti-slip portion 28, the holding force (the gripping force) acting on the hand during the operation is increased when the grip 23 is gripped to operate the operation lever 2, thereby improving the operability.

In addition, since the anti-slip portion 28 is provided from the surface of the gripping portion 24 of the grip 23 to the surface of the extending portion 26, the slipping of not only the portion (the palm) gripping the gripping portion 24 but also the portion (the hypothenar) placed on the extending portion 26 is prevented, and thus the holding force is surely increased, thereby improving the operability.

The extending portion 26 includes a rear portion 26A extending rearward from the lower portion of the gripping portion 24 and includes a side portion 26B extending from the edge portion of one side of the gripping portion 24 to one side.

According to this configuration, since the lower portion and the side portion of the palm gripping the gripping portion 24 can be received by the rear portion 26A and the side portion 26B, thereby preventing fatigue even when gripping the gripping portion 24 for a long time and thus reducing the fatigue of the operator.

In addition, the rear portion 26A and the side portion 26B are provided continuously from the lower portion of the gripping portion 24 to one side.

According to this configuration, since the lower portion and the side portion of the palm gripping the gripping portion 24 can be received by the continuous rear portion 26A and the side portion 26B, thereby stabilizing the position of the palm, preventing fatigue even when gripping the gripping portion 24 for a long time, and thus reducing the fatigue of the operator.

In addition, the side portion 26B is provided in an area from the lower end portion to the middle portion in the vertical direction on one side of the gripping portion 24.

According to this configuration, the position of the hand can be determined by applying a finger to the upper portion of the side portion 26B under the state where the gripping portion 24 is gripped. In this manner, the position of the hand gripping the gripping portion 24 is stabilized, thereby reducing the fatigue of the operator.

In addition, the anti-slip portion 28 is provided only on the portion of the surface of the extending portion 26 that is located on the one side.

According to this configuration, since the anti-slip portion 28 is provided on one side of the operator seat 10, the gripping portion 24 is prevented from slipping on the hypothenar side under the state where the gripping portion 24 is gripped. In this manner, the extending portion 26 can surely prevent the palm gripping the gripping portion 24 from slipping off and falling.

In addition, since the anti-slip portion 28 is not provided on the other side of the operator seat 10, it is possible to smoothly move the thumb ball side of the hand under the state where the gripping portion 24 is gripped. In this manner, the movement of the thumb that operates the operation switch provided at the operating portion 25 is not obstructed by the anti-slip portion 28. In addition, since the friction generated when the thumb ball side of the hand is moved becomes small, the load applied to the skin on the thumb ball side is small.

In addition, the anti-slip portion 28 is provided in both of the rear portion 26A and the side portion 26B.

According to this configuration, it is possible to prevent the palm gripping the gripping portion 24 from slipping off from both of the rear portion 26A and the side portion 26B.

In this manner, it is possible to prevent the palm gripping the gripping portion 24 from slipping off and falling from the rear and from the side.

In addition, the surface of the gripping portion 24 has an area 24a1 in which the anti-slip portion 28 is not provided on the extending portion 26 side and on the operating portion 25 side.

According to this configuration, since the vicinity of the root of the thumb hits the area 24a1 under the state where the gripping portion 24 is gripped, the thumb that operates the operation switch provided in the operating portion 25 can move smoothly, and thus the anti-slip portion 28 does not interfere the movement of the thumb.

In addition, the area 24a1 where the anti-slip portion 28b is not provided is arranged below the operation switches 30, 31, and 32 in the vertical direction.

According to this configuration, the bulge of the root of the thumb can be slid on the surface of the area 24a1 in selecting the operation switches 30, 31, and 32 are selected, and the bulge of the root of the thumb is gripped in operating the selected operation switch. In this manner, the operation switch can be easily and reliably operated.

In addition, the gripping portion 24 includes the curved surface 24a curved extending from the other side to the one side, and the standing surface 24e standing from the operating portion 25 toward the curved surface 24a. The anti-slip portion 28 is provided over from the curved surface 24a to the surface of the extending portion 26.

According to this configuration, when the gripping portion 24 is gripped, the palm is fitted to the curved surface 24a. In this manner, the curved surface 24a provides excellent fitting feel with respect to the gripping portion 24, and the palm is prevented from sliding off along the curved surface 24a.

In addition, other operation switches 33 and 34 (or 133) different from the operation switches 30, 31, and 32 (or 130, 131, 132, 134, and 135) are provided on the standing surface 24e. The anti-slip portion 28 is provided over an area overlapped with at least the other operation switches 33 and 34 (or 133) in the vertical direction.

According to this configuration, the anti-slip portion 28 prevents a portion other than the vicinity of the base of the thumb of the palm from slipping off in operating the operation switches 33 and 34 (or 133) provided on the standing surface 24e. Thus, it is possible to reliably operate the operation switches 33 and 34 (or 133) with the palm position firmly fixed.

In addition, the extending portion 26 extended from the lower portion of the gripping portion 24 has the extension width on the other side wider than the extension width on the one side.

According to this configuration, when the gripping portion 24 is gripped, the lower portion of the palm on the thumb side can be supported by the wide portion of the extending portion 26, so that the palm on the thumb side is prevented from slipping off under the state where the thumb is moving.

In addition, the extending portion 26 extended from the lower portion of the gripping portion 24 has the extension width on the one side wider than the extension width on the other side.

According to this configuration, in gripping the gripping portion 24, the lower portion of the palm on the little finger side can be supported by the wide portion of the extending portion 26, so that it is possible to effectively prevent the palm from slipping off downward or laterally from the little finger side.

The curved surface 24a includes the side edge portion 24h that constitutes the edge portion on the one side of the curved surface 24a, the upper edge portion 24i that constitutes an upper edge portion of the curved surface 24a, and the corner edge portion 24k that connects between the side edge portion 24h and the upper edge portion 24i. The corner edge portion 24k is curved with a radius of curvature smaller than that of the side edge portion 24h and the upper edge portion 24i.

According to this configuration, since the gripping portion 24 can be gripped by sandwiching the corner edge portion 24k with a plurality of fingers other than the thumb, the position of the palm is stable and difficult to slip, and the palm is easily kept at a constant position for a long time.

The working vehicle 1 includes the operator seat 10 mounted on the vehicle body 2, the armrest 15 provided on one side of the operator seat 10, and the operation lever 21 provided on the armrest 15. The operation lever 21 having the anti-slip portion 28 described above.

According to this configuration, in the working vehicle 1 provided with the operation lever 21 provided on the armrest 15, the holding force (the gripping force) acting on the hand during the operation is increased in operating the operation lever 21 by grasping the grip 23, thereby improving the operability.

In addition, the armrest 15 has the elbow rest portion 18 behind the operation lever 21, and the operation lever 21 is arranged within the width of the elbow rest portion 18 in the machine width direction.

According to this configuration, the operator seated on the operator seat 10 can operate the operation lever 21 without widely moving the elbow placed on the elbow rest portion 18 (with the elbow not separating away from the trunk), thereby providing the excellent operability.

The working vehicle 1 includes the operator seat 10, the armrest 15 arranged on a side of the operator seat 10 and including the swing operating portion 17, the elbow rest portion 18, and the operation tool arrangement portion 19 in which the plurality of operation tools are arranged. The elbow rest portion 18 is provided at the rear portion of the arm rest 15. The swing operating portion 17 includes the pedestal 20 provided at the front portion of the arm rest 15 so as to be bulged higher than the upper surface of the elbow rest portion 18, and, the control lever 21 that protrudes upward from the pedestal 20 and is configured to be swung.

According to this configuration, the swing fulcrum of the operation lever 21 can be provided at a high position within the bulging of the pedestal 20, and the stroke of the swing in the front-rear direction of the operation lever 21 protruding upward from the pedestal 20 can be reduced. In addition, the operation lever 21 can always be gripped and operated at a position higher than the elbow in operating the operation lever 21 with the elbow placed on the elbow rest portion 18.

That is, the operation lever 21 can be operated in an upward inclined posture in which the forearm (the portion in front of the arm elbow) is raised forward. As the result, even when the operation lever 21 is tilted forward, the elbow is not easily extended, thereby improving the operability and realizing the reliable operation.

In addition, the operation tool arrangement portion 19 is provided at a position lower than the upper surface of the pedestal 20 and the upper surface of the elbow rest portion 18 behind the swing operating portion 17 and in front of the elbow rest portion 18.

According to this configuration, since the position of the arm is sufficiently high with respect to the operation tool arrangement portion 19, it is ensured that the arm is surely prevented from unintentionally contacting the operation tool placed in the operation tool arrangement portion 19.

In addition, the plurality of operation tools are arranged below the imaginary straight line L1 that connects between the upper end portion of the pedestal 20 and the front end portion of the upper surface 18*a* of the elbow rest portion 18.

According to this structure, it can prevent more reliably that the arm unintentionally contacts with the operation tool arranged in the operation tool arrangement portion 19.

In addition, the plurality of operation tools are arranged below the extension line L2 that extends the upper surface 18*a* of the elbow rest portion 18 to the pedestal 20.

According to this structure, it can prevent further reliably that the arm unintentionally contacts with the operation tool arranged in the operation tool arrangement portion 19.

In addition, the imaginary straight line L1 is inclined shifting upward as it extends forward.

According to this configuration, in operating the operation lever 21 under the state where the elbow is placed on the elbow rest portion 18, the tilt direction of the arm and the tilt direction of the imaginary straight line L1 are the same, so that the arm can be surely prevented from unintentionally coming into contact with the operation tool arrangement portion 19.

In addition, the upper surface of the operation tool arrangement portion 19 inclines shifting downward as it extends forward.

According to this configuration, since the vertical distance between the upper surface of the operation tool arrangement portion 19 and the imaginary straight line L1 increases toward the front, so that the arm can be surely prevented from unintentionally coming into contact with the operation tool arrangement portion 19.

The plurality of operation tools include the operation tools 61 to 71 to be operated by being pressed, and include the operation tools 73 to 75 to be operated by being rotated or being swung around the horizontal axis. The operation tools 73 to 75 to be operated by being rotated or being swung around the lateral axis are arranged in front of the operation tools 61 to 71 to be operated by being pressed.

According to this configuration, under the condition that the imaginary straight line L1 is inclined shifting upward as it extends forward, the tall operation tools 73 to 75 that are operated by being rotated or being swung around the horizontal axis are arranged in front of the short operation tools 61 to 71 to be operated by being pressed. In this manner, it is hard for the tall operation tool to protrude upward from the imaginary straight line L1. Thus, it is possible to reliably prevent the arm from unintentionally contacting the operation tool arranged in the operation tool arrangement portion 19.

In addition, the lower surface of the armrest 15 has a rear portion that is recessed upward in comparison to the front portion.

According to this configuration, the lower surface 16*b* of the armrest 15 is prevented from coming into contact with the operator's knee seated on the operator seat 10.

In addition, the working vehicle 1 includes the operator seat 10 and the armrest 15 provided on the side of the operator seat 10 and having a plurality of operation tools arranged on the surface thereof. The plurality of operation tools include the traveling pressing operation tools 61 to 69 for performing the traveling operation by being pressed and include the working pressing operation tools 70 and 71 for performing the working operations by being pressed. The working system pressing operation tools 70 and 71 include a small operation tool 71 having the plurality of pressing operating portions 71*a* and 71*b* integrally arranged in an area smaller than the area of the traveling pressing operation tools 61 to 69.

According to this configuration, the working pressing operation tool includes the small operation tool 71 having the plurality of pressing operating portions 71*a* and 71*b* arranged in a concentrated manner in the area smaller than the area of the traveling pressing operation tool. Thus, the traveling pressing operation tool and the working pressing operation tool can be clearly and intuitively extinguished by the difference in size, and the working pressing operation tool can be easily found. In addition, the small operation tool 71 integrally arranges the plurality of pressing operating portions 71*a* and 71*b*, thereby providing excellent operability.

In addition, the traveling pressing operation tools 61 to 69 include the pressing operation portion 80 and the indicating portion 81 indicating whether the operation state is in the operation state or the non-operation state. The small operation tool 71 has the pressing operating portions 71*a* and 71*b* and does not have the display portion.

According to this configuration, it is possible to easily grasp visually whether the pressing operation portion 80 is in the operation state or the non-operation state due to the presence of the indicating portion 81. In addition, the small operation tool 71 does not have the display portion and is down-sized, so that the distinction from the traveling pressing operation tools 61 to 69 can be clarified and thus easily found.

In addition, the small operation tool 71 has a plurality of pressing operating portions 71*a* and 71*b* integrated therein.

According to this configuration, since the small operation tool 71 can be reduced in size as compared with the case where the plurality of pressing operating portions 71*a* and 71*b* are separated, the distinction from the traveling pressing operation tools 61 to 69 can be clarified.

In addition, the working vehicle 1 includes the rotary operation tool 72 that performs the operations related to the working by being rotated about the vertical axis, and the small operation tool 71 and the rotary operation tool 72 are arranged side by side at positions adjacent to each other in the width direction of the armrest 15.

According to this configuration, the small operation tool 71 and the rotary operation tool 72 that are working operation tools that perform the operations related to the working are arranged adjacent to each other in the width direction of the armrest 15, thereby providing the excellent tool operability in performing the operations related to the working.

In addition, the working vehicle 1 includes the lifting device 4 that lifts and lowers the working device. The small operation tool 71 and the rotary operation tool 72 are operation tools that operate the lifting device 4.

According to this configuration, the small operation tool 71 and the rotary operation tool 72 that are operation tools that operate the lifting device 4 are arranged adjacent to each other in the width direction of the armrest 15, thereby providing the excellent tool operability in performing the operations of the lifting device 4.

The surface of the armrest 15 includes the first area 15A provided on the operator seat 10 side, the second area 15B provided on the side opposite to the operator seat 10 side, and the third area 15C provided between the first area 15A and the second area 15B. The traveling pressing operation tools 61 to 69 are arranged in the first area 15A, the rotary operation tool 72 is arranged in the second area 15B, and the small operation tool 71 is arranged in the third area 15C.

According to this configuration, since the traveling pressing operation tools 61 to 69, the rotary operation tool 72 that is the working operation tool, and the small operation tool 71 are arranged in different areas of the armrest 15, the traveling operation tools and the working operation tools can be clearly extinguished, thereby preventing erroneous operation of the operation tools.

The operation lever 21 of the working vehicle 1 is the operation lever 21 provided on the side of the operator seat 10 of the working vehicle 1, and includes the swing body 22 configured to be swingable, and the grip 23 provided on the upper portion of the swing body, including the gripping portion 24 provided on the side opposite to the operator seat 10 side, including the operating portion 25 arranged on the operator seat 10 side and provided with the operation switches 30, 31, and 32 (or 130, 131, 132, 134, and 135) on the surface thereof. On the back surface 24b of the gripping portion 24, another operation switch 36 (or 136) other than the operation switches 30, 31, and 32 (or 130, 131, 132, 134, and 135), and the guide concave portion 37 that is formed to be recessed from the back surface 24b and guides the finger toward the other operation switch 36 are provided.

According to this configuration, since the guide concave portion 37 for guiding the finger toward the operation switch 36 (or 136) provided on the back surface 24b of the gripping portion 24 is provided, the position of the position of the operation switch 36 (or 136) provided on the back surface 24b of the gripping portion 24 can be easily grasped and operated quickly.

In particular, when a person with long fingers grips the gripping portion 24, the fingertip may greatly exceed the operation switch 36 (or 136) provided on the back surface 24b, making it difficult to find the operation switch 36 (or 136). However, since the finger is guided to the operation switch 36 (or 136) by the guide concave portion 37, the operation switch 36 (or 136) can be easily found and operated.

In addition, the guide recessed portion 37 has the inclined surface 37a from which the depth of recess changes as it approaches the other operation switch 36.

According to this configuration, since the finger is guided to the operation switch 36 by sliding the finger along the inclination of the guide concave portion 37, the operation switch 36 can be easily found and operated.

Preferably, in the inclined surface 37a, the depth of the recess gradually becomes deeper as it approaches the other operation switch 36.

According to this configuration, since the finger is naturally guided to the operation switch 36 by sliding the finger along the direction in which the depth of the recess of the guide concave portion 37 increases, the operation switch 36 can be easily found and operated.

The outer edge portion of the guide concave portion 37 forms a closed area on the back surface 24b of the gripping portion 24, and the back surface 24b of the gripping portion 24 has the area 24p around the closed area, the area 24p being not recessed.

According to this configuration, the area of the guide concave portion 37 and the area 24p that is not the guide concave portion 37 can be clearly recognized with the fingertips on the back surface 24b of the gripping portion 24, so the presence of the guide concave portion 37 on the back surface 24b can be easily and surely grasped.

In addition, the other operation switch 36 is arranged on the upper corner 24n opposite to the operator seat 10 side on the back surface 24b of the gripping portion 24, and the inclined surface 37a extends in a fan shape from the vicinity of the upper corner 24n.

According to this configuration, since the gripping portion 24 is arranged in the upper corner portion 24n, the fingertip does not immediately hit the operation switch 36 even when the gripping portion 24 is gripped, thereby preventing the operation switch 36 from being pushed unintentionally. In addition, since the inclined surface 37a expands in a fan shape from the vicinity of the upper corner portion 24n, the fingertip can be reliably guided toward the operation switch 36 arranged in the upper corner portion 24n.

Each of the operation switches 30, 31, and 32 includes a shuttle switch that operates the speed transmission of the working vehicle 1, and the other operation switch 36 is the shuttle check switch that switches between permission and inhibition of the operation of the shuttle switch.

According to this configuration, since the operation of the operation switch (the shuttle check switch) 36 is facilitated by the guide recess 38, the operation switch (the shuttle switch) 30 can be pressed while the operation switch (the shuttle check switch) 36 is being pressed, and thereby it is possible to easily perform the operation of switching between the forward traveling and the backward traveling.

In addition, the working vehicle 1 includes the operator seat 10, the armrest 15 provided on the side of the operator seat 10, and the operation lever 21 provided on the armrest 15. The operation lever 21 includes the operation switch 36 (or 136) described above, and the guide concave portion 37 or the like.

According to this configuration, the working vehicle 1 includes the operation lever 21 by which the position of the operation switch 36 (or 136) provided on the back surface 24b of the gripping portion 24 can be easily grasped and the operation switch 36 (or 136) can be quickly operated.

The operation lever 21 of the working vehicle 1 is an operation lever 21 provided on one side of the operator seat 10 of the working vehicle 1, and includes the grip 23 provided on the upper portion of the swing body 22, having the gripping portion 24 arranged on one side and the operating portion 25 arranged on the other side opposite to one side and provided with the operation switches 30, 31, and 32. The operation switch 35 different from the operation switches 30, 31, and 32 is arranged around the grip 23 on an area constituting a circumference of the gripping portion 24.

According to this configuration, the operability in swinging the operation lever while operating the operation switch is excellent. More in particular, another operation switch 35 different from the operation switches 30, 31, and 32 provided in the operating portion 25 is provided around the grip 23 on the surface constituting a circumference of the gripping portion 24. In this manner, the operation lever 21 can be easily operated pressing the other operation switch 35 under the state where the gripping portion 24 of the grip 23 is gripped, thereby providing the excellent operability.

In addition, the other operation switch 35 different from the operation switches 30, 31 and 32 is provided on the upper surface 24c of the gripping portion 24.

According to this configuration, since the other operation switch 35 other than the operation switches 30, 31, and 32 arranged on the operating portion 25 is provided on the upper surface 24c of the gripping portion 24, the operation lever 21 can be easily operated pressing the other operation switch 35 under the state where the gripping portion 24 is gripped, thereby providing the excellent operability.

The other operation switch 35 is a switch for switching whether or not the swing body 22 is allowed to swing.

According to this configuration, it is possible to smoothly perform a series of operations of pressing the operation switch 35 to allow the swing of the swing body 22, and then swinging the swing body 22 to operate the operation lever 21, thereby providing the excellent operability.

In addition, the other operation switch 35 is located on a position closer to the operating portion 25 from the middle position 24M between the side edge (the first side edge portion 24h1) on one side of the gripping portion 24 and the side edge (the second side edge portion 24h2) on the other side.

According to this configuration, the operation switch 35 is arranged at a position offset from the position of the finger (the index finger) gripping the gripping portion 24 toward the operating portion 25. Thus, it is possible to prevent the operation switch 35 from being unintentionally pressed when the gripping portion 24 is gripped. In addition, since the operation switch 35 is arranged near the position of the finger (the index finger) gripping the gripping portion 24, the operation switch 35 can be easily operated, thereby providing the excellent operability.

The gripping portion 24 includes the curved surface 24a curved extending from the other side to the one side, and the standing surface 24e standing from the operating portion 25 toward the curved surface 24a. The other operation switch 35 is provided above the curved surface 24a.

According to this configuration, when gripping the gripping portion 24 and placing the palm along the curved surface 24a, the finger (the index finger) naturally comes close to the operation switch 35, so that the operation switch 35 can be easily operated, thereby providing the excellent operability.

The upper surface 24c of the gripping portion 24 and the upper surface 25c of the operating portion 25 are connected in a mountain shape with a vertex 29 formed in the vicinity of the boundary between the gripping portion 24 and the operating portion 25. The other operation switches 35 are arranged on a position closer to the vertex 29 than the middle position 24M between the side edge on the one side of the gripping portion 24 (the first side edge portion 24h1) and the side edge on the other side of the gripping portion 24 (the second side edge portion 24h2).

According to this configuration, the position of the operation switch 35 is shifted closer to the operating portion 25 from the position of the finger (the index finger) when the gripping portion 24 is gripped. Thus, it is possible to prevent the operation switch 35 from being unintentionally pressed in gripping the gripping portion 24. In addition, the operation switch 35 can be easily accessed when the gripping portion 24 is gripped sliding the finger toward the apex 29.

The other operation switch 35 is a push button switch arranged protruding from the upper surface of the gripping portion 24.

According to this configuration, since the finger (the index finger) is likely to touch the operation switch 35 when the gripping portion 24 is gripped, the presence of the operation switch 35 can be easily and reliably recognized.

In addition, the swing body 22 is configured to swing to allow the speed-shifting operation, and the other operation switch 35 is a switch for switching between permission and inhibition of the speed-shifting operation performed by the swinging of the swing body 22.

According to this configuration, it is possible to smoothly perform a series of speed-changing operation where the operation switch 35 is pressed to allow the swinging body 22 to swing while swinging the swinging body 22.

In addition, the working vehicle 1 includes the operator seat 10, the armrest 15 arranged to the side of the operator seat 10, and the operation lever 21 provided on the armrest 15. The operation lever 21 is provided with the other operation switch 35 on the surface that forms the periphery of the gripping portion 24, that is, the periphery of the grip 23, the other operation switch 35 being different from the operation switches 30, 31, and 32.

According to this configuration, it is easy to operate the operation lever 21 while pressing the other operation switch 35 under the state where the gripping portion 24 is gripped, and thus provided is the working vehicle 1 having excellent operability with respect to the operation lever 21.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. An operation lever for a working vehicle, the operation lever being arranged to one side of an operator seat of the working vehicle, comprising:
    a swing body configured to be swingable; and
    a grip arranged on an upper portion of the swing body, wherein the grip includes:
        a gripping portion arranged to the one side;
        an operating portion arranged to an other side opposed to the one side and provided with an operation switch;
        an extending portion extending backward from a lower portion of the gripping portion; and
        an anti-slip portion arranged between a surface of the gripping portion and a surface of the extending portion,
    wherein the surface of the gripping portion includes a portion out of the anti-slip portion, and the anti-slip portion has a surface whose friction coefficient is larger than that of the portion of the surface of the gripping portion out of the anti-slip portion,
    wherein the extending portion has:
        a rear portion extending backward from a lower portion of the gripping portion; and
        a side portion extending from an edge portion arranged to the one side of the gripping portion toward the one side,
    wherein the anti-slip portion is arranged on both the rear portion and the side portion,
    wherein the extending portion extending from the lower portion of the gripping portion has an extending width on the one side broader than an extending width on the other side,
    and wherein the extending portion has a width being the widest at a boundary between the rear portion and the side portion.

2. The operation lever for the working vehicle according to claim 1,
    wherein the rear portion and the side portion are arranged continuously between the lower portion of the gripping portion and the one side.

3. The operation lever for the working vehicle according to claim 1, wherein the side portion is arranged on the one side of the gripping portion in an area from a lower end portion to a middle portion in a longitudinal direction.

4. The operation lever for the working vehicle according to claim 1,
wherein the surface of the gripping portion includes, on a lower portion of the surface near the operating portion, an area that does not have the anti-slip portion.

5. The operation lever for the working vehicle according to claim 4,
wherein the area that does not have the anti-slip portion is arranged downward from the operation switch in a longitudinal direction.

6. The operation lever for the working vehicle according to claim 1,
wherein the gripping portion includes:
a curved surface that is curved extending from the other side toward the one side; and
a standing surface that stands from the operating portion toward the curved surface,
and wherein the anti-slip portion is arranged between the curved surface and the surface of the extending portion.

7. The operation lever for the working vehicle according to claim 6,
wherein the standing surface is provided with another operation switch other than the operation switch, and wherein the anti-slip portion is arranged at least on an area overlapped with the other operation switch in the longitudinal direction.

8. The operation lever for the working machine according to claim 6,
wherein the curved surface includes:
a side edge portion constituting an edge portion of the curved surface on the one side;
an upper edge portion constituting an edge portion of an upper side of the curved surface; and
a corner edge portion connecting between the side edge portion and the upper edge portion,
and wherein the corner edge portion is curved at a curvature radius smaller than curvature radiuses of the side edge portion and the upper edge portion.

9. A working vehicle comprising:
an operator seat mounted on a vehicle body;
an arm rest arranged to one side of the operator seat; and
an operation lever arranged on the arm rest,
wherein the operation lever is the operation lever according to claim 1.

10. The working vehicle according to claim 9,
wherein the arm rest has an elbow-rest portion arranged behind the operation lever,
and wherein the operation lever is arranged within a width of the elbow-rest portion in a machine width direction.

* * * * *